(12) United States Patent
Jacobson et al.

(10) Patent No.: US 7,743,276 B2
(45) Date of Patent: Jun. 22, 2010

(54) SUFFICIENT FREE SPACE FOR REDUNDANCY RECOVERY WITHIN A DISTRIBUTED DATA-STORAGE SYSTEM

(75) Inventors: Michael B. Jacobson, Boise, ID (US); James P. Jackson, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 901 days.

(21) Appl. No.: 11/527,875

(22) Filed: Sep. 27, 2006

(65) Prior Publication Data

US 2008/0126842 A1 May 29, 2008

(51) Int. Cl.
*G06F 11/00* (2006.01)

(52) U.S. Cl. .............................. 714/7; 714/6
(58) Field of Classification Search ........................ None
See application file for complete search history.

(56) References Cited

U.S. PATENT DOCUMENTS

| | | | | |
|---|---|---|---|---|
| 5,542,065 A | * | 7/1996 | Burkes et al. | 711/114 |
| 5,666,512 A | * | 9/1997 | Nelson et al. | 711/114 |
| 5,790,886 A | * | 8/1998 | Allen | 710/5 |
| 6,820,182 B1 | * | 11/2004 | Bauman et al. | 711/170 |
| 6,880,101 B2 | * | 4/2005 | Golasky et al. | 714/4 |
| 7,386,666 B1 | * | 6/2008 | Beauchamp et al. | 711/114 |

OTHER PUBLICATIONS

Saito et al., "FAB: Building Distributed Enterprise Disk Arrays from Commodity Components," Oct. 9-13, 2004, ASPLOS '04, pp. 48-58.*

* cited by examiner

*Primary Examiner*—Gabriel L Chu

(57) ABSTRACT

Embodiments of the present invention are directed to methods, and distributed data-storage systems employing the methods, for recovering redundancy within a distributed data-storage system upon failure of one or more mass-storage devices within a component data-storage system of the distributed data-storage system. In certain embodiments, failure of a mass-storage device within a component data-storage system elicits a redundancy-recovery operation in which segments affected by the mass-storage-device failure or failures are moved, by a process referred to as "migration," to other component data-storage systems of the distributed data-storage system, and are recovered as a by-product of migration. Certain embodiments of the present invention more efficiently address redundancy recovery by moving only as many segments from the component data-storage system as needed to provide sufficient free space within the component data-storage system to recover the remaining segments affected by the mass-storage-device failure or failures within the component data-storage system.

17 Claims, 51 Drawing Sheets

| 302 | 304 | 305 | 306 |
|---|---|---|---|
| 1 | 6 | 5 | 4 |
| 2 | 1 | 2 | 10 |
| 3 | 2 | 9 | 3 |
| 4 | 4 | 1 | 8 |
| 5 | 3 | 7 | 2 |
| 6 | 9 | 10 | 6 |
| 7 | 5 | 3 | 11 |
| 8 | 8 | 4 | 1 |
| 9 | 7 | 6 | 12 |
| 10 | 10 | 8 | 7 |
| 11 | 15 | 11 | 5 |
| 12 | 11 | 13 | 9 |
| 13 | 12 | 12 | 13 |
| 14 | 13 | 15 | 14 |
| 15 | 14 | 14 | 15 |

*Figure 4*

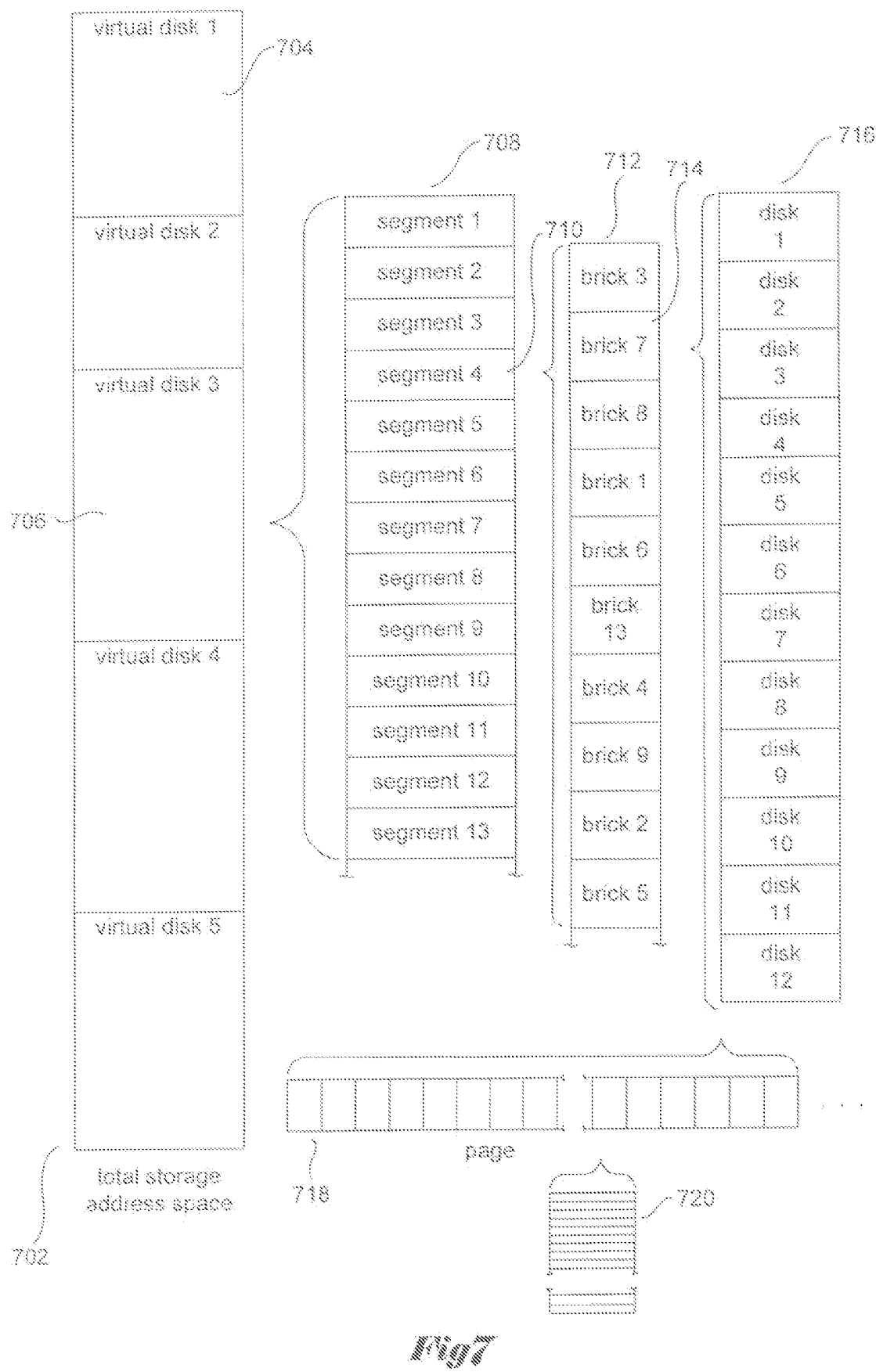

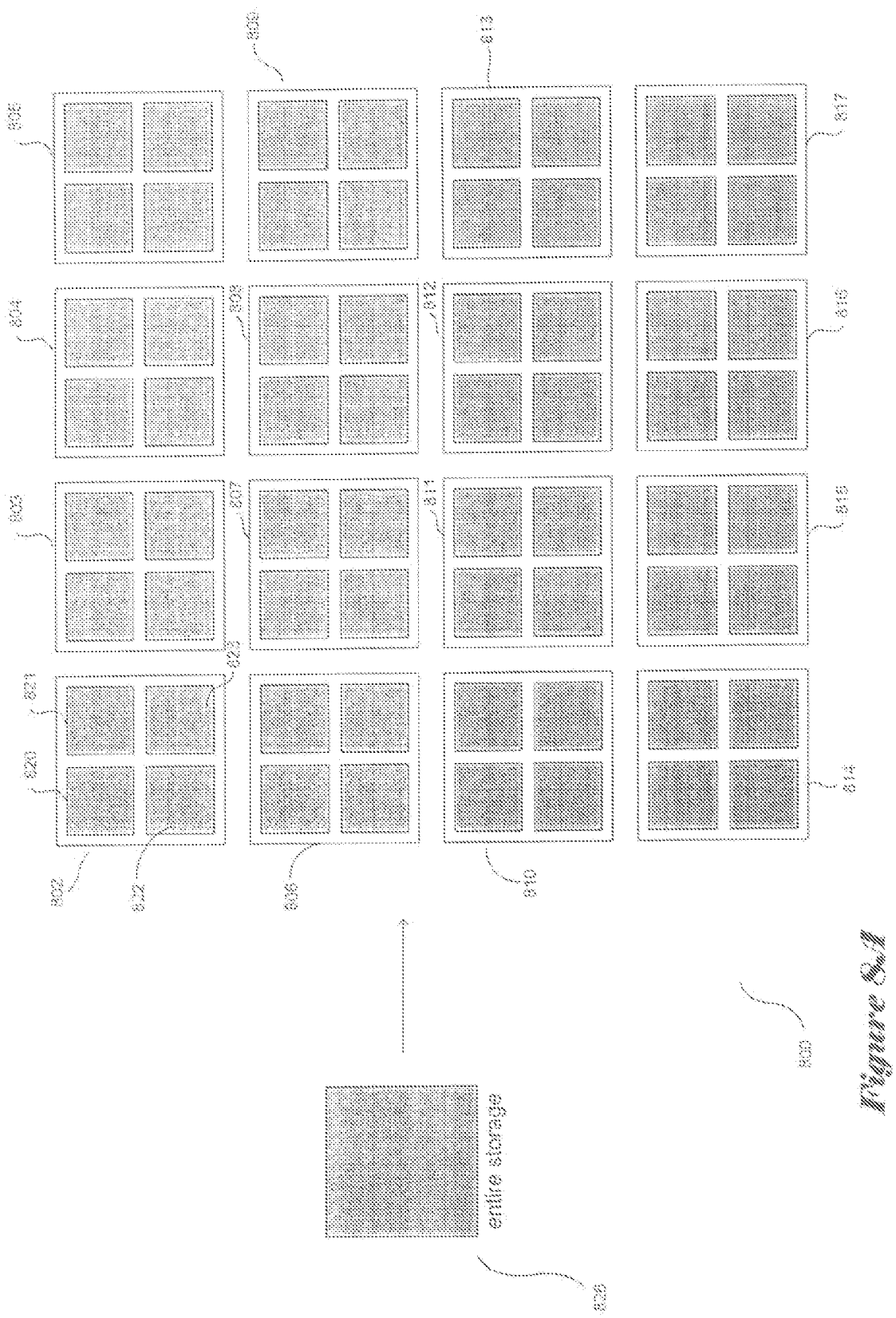

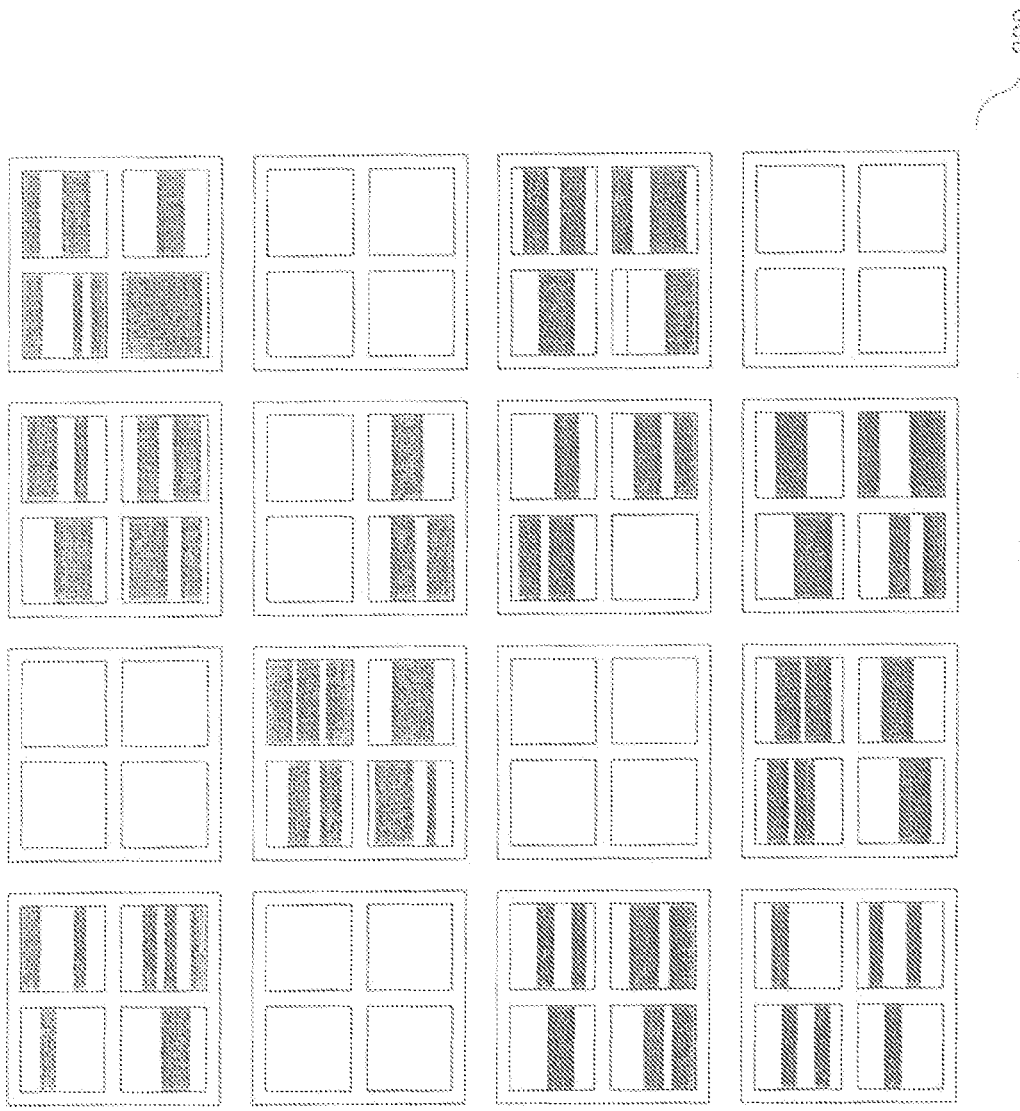
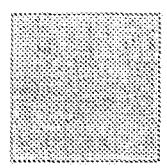
Figure 9B

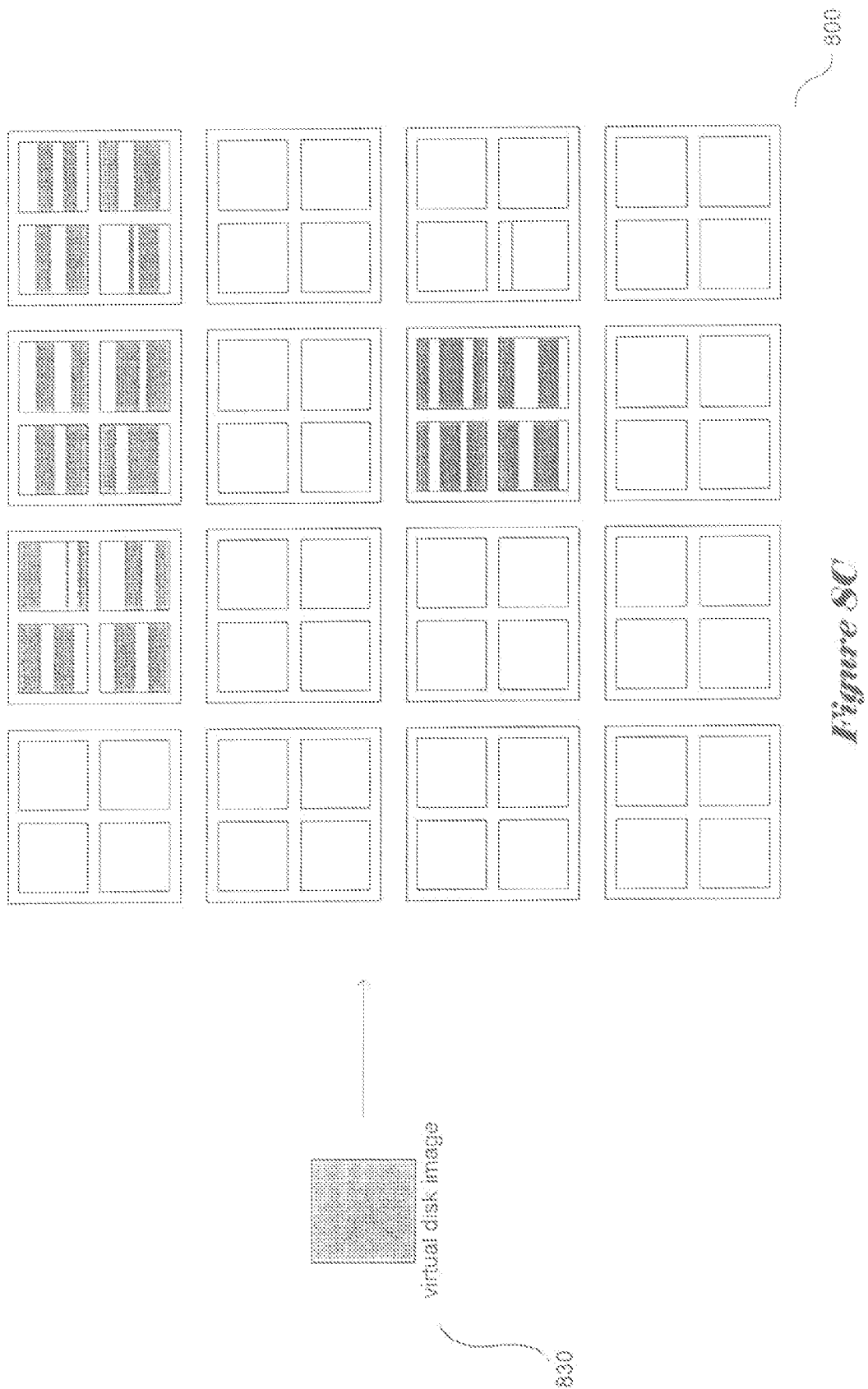

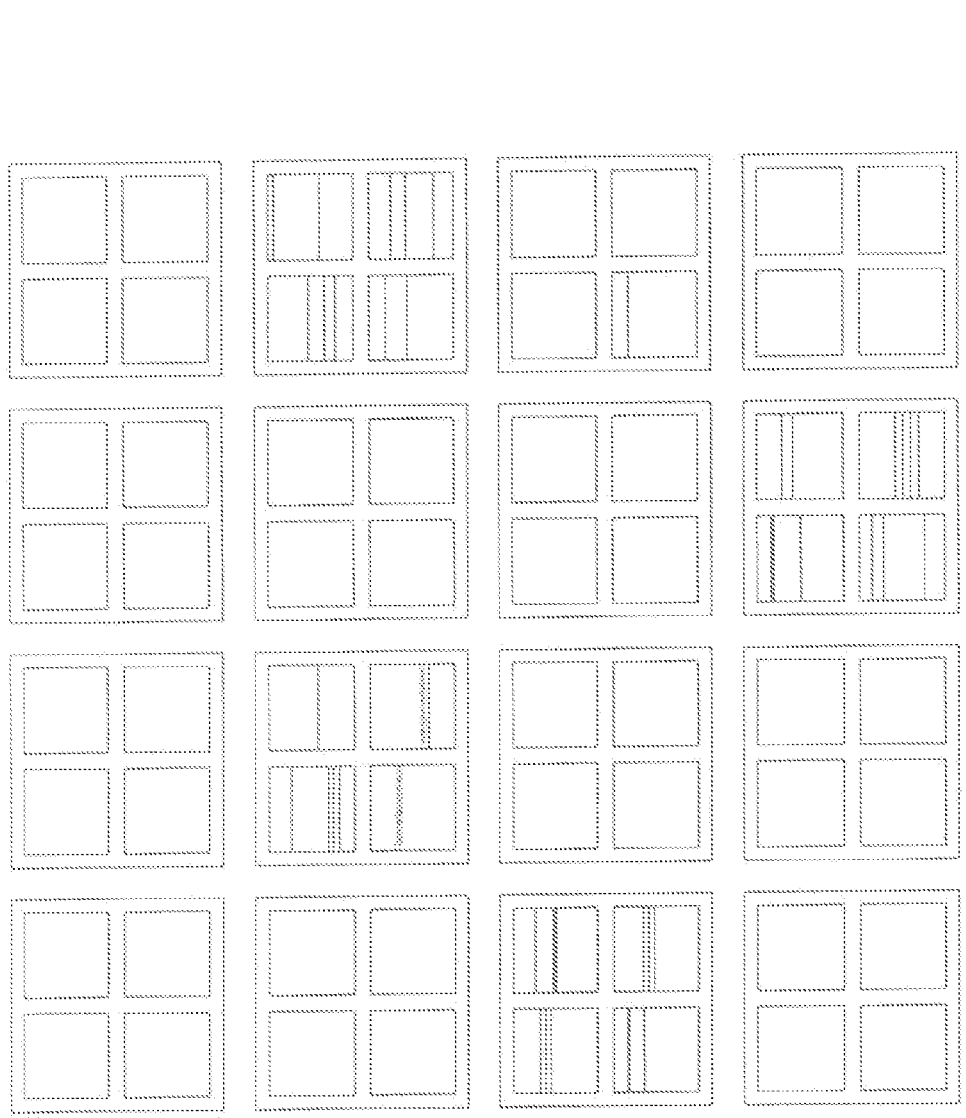
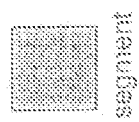
Figure 8D

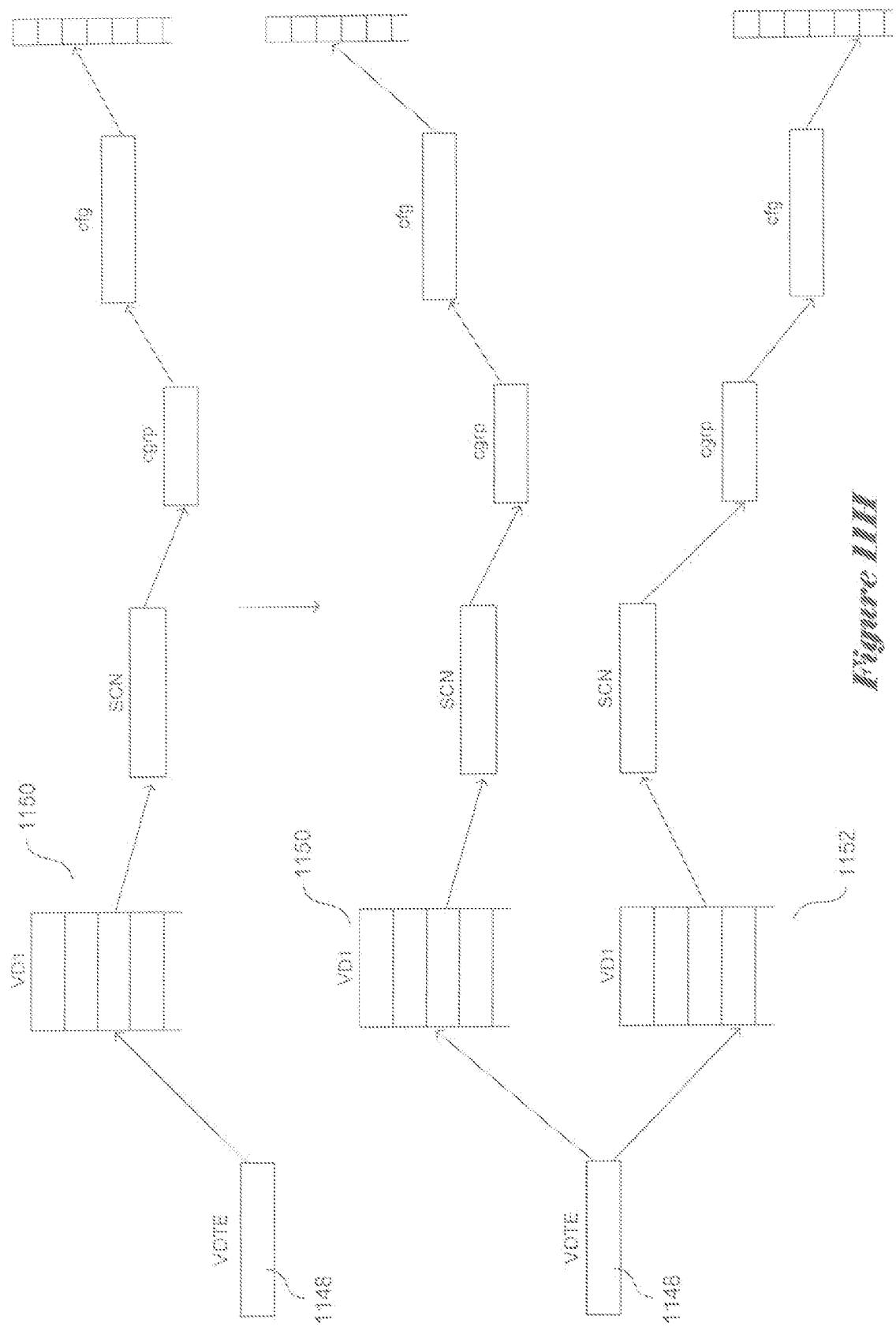

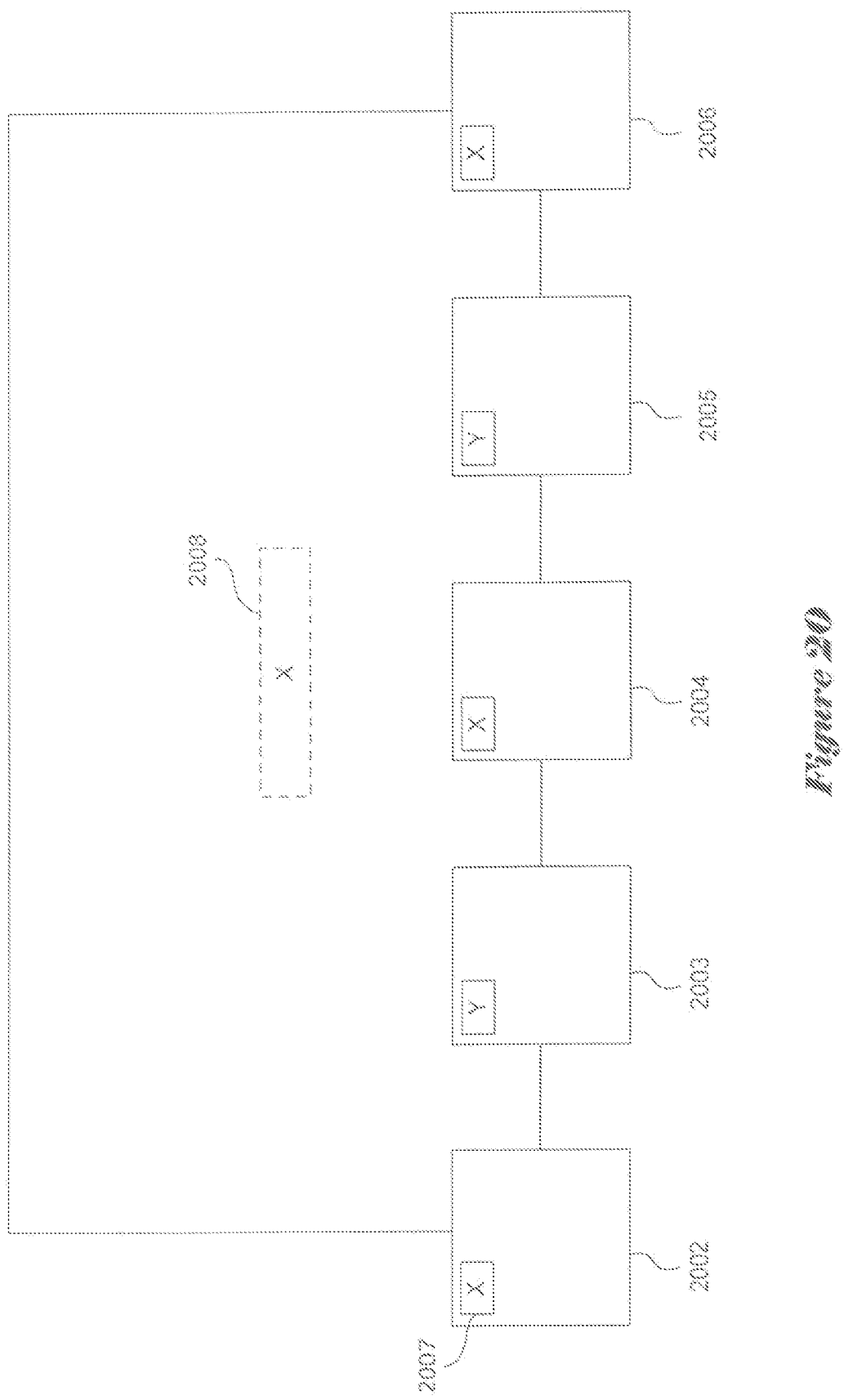

```
1:  procedure read()                                    ──2104
2:      replies ← majority([Read, val-ts])
3:      if the status in all replies is true then return val
4:      else return recover()

1:  procedure write(val)                                ──2108
2:      ts ← new TS()
3:      replies ← majority([Order, ts])
4:      if any status in a reply is false then return NOK
5:      replies ← majority([Write, val, ts])
6:      if the status in all replies is true then return OK
7:      else return NOK 1:  procedure recover()                                 ──2106
2:      ts ← new TS()
3:      replies ← majority([Order&Read, ts])
4:      if any status in a reply is false then return NIL
5:      val ← the value with highest val-ts from replies
6:      replies ← majority([Write, val, ts])
7:      if the status in all replies is true then return val
8:      else return NIL 1:  procedure majority(msg)                             ──2102
2:      Send msg to all, retransmitting periodically
3:      await receive(rep) from ⌈n/2⌉ processes
4:          such that rep matches msg
5:      return set of received replies read Handler()                                          ──2110
1:  when receive [Read, ts] from coordinator
2:      status ← (ts = val-ts and ts ≥ ord-ts)
3:      reply [Read-R, status] to coordinator write Handler ()                                        ──2112
1:  when receive [Write, new-val, ts] from coordinator
2:      status ← (ts > val-ts and ts ≥ ord-ts)
3:      if status then
4:          val ← new-val; store(val)
5:          val-ts ← ts; store(val-ts)
6:      reply [Write-R, status] to coordinator order & read Handler ()                                 ──2114
1:  when receive [Order&Read, ts] from coordinator
2:      status ← (ts > max(val-ts, ord-ts))
3:      if status then ord-ts ← ts; store(ord-ts)
4:      reply [Order&Read-R, val-ts, val, status]

order Handler()                                         ──2116
1:  when receive [Order, ts] from coordinator
2:      status ← (ts > max(val-ts, ord-ts))
3:      if status then ord-ts ← ts; store(ord-ts)
4:      reply [Order-R, status] to coordinator
```

*Figure 21*

```
// I/O coordinator code. "idx" is the block number within the strip.
proc write(val, idx)
    ts ← NewTimestamp()
    send [Order, (idx), ts] to bricks in the seggroup
    if an m-quorum reply "yes" and idx'th brick replies with oldval
        delta ← Delta(oldval, val, idx)
        send [Write-EC, val, ts] to the idx'th brick.
        send [Write-EC, NULL, ts] to other data bricks
        send [Write-EC, delta, ts] to parity bricks
        if an m-quorum reply "yes"
            send [Commit, ts] to bricks in the seggroup
            return OK
    return ABORTED
proc read(idx)
    send [Read] to bricks in the seggroup
    if an m-quorum and idx reply "yes" and all timestamps are equal
        return the val returned by idx'th brick.
    ts ← NewTimestamp() // Slow recovery path begins
    send [Order&ReadLog, ts] to bricks in the seggroup
    ts' ← Pick the largest timestamp that appears in at least m replies
    strip ← Reconstruct the original strip for ts'
    send [Write, strip[i], ts] to i'th brick, for each i in the seggroup
    if an m-quorum returns "yes"
        send [Commit, ts] to bricks in the seggroup
        return strip[idx]
    return ABORTED // Storage handler code
    when Receive [Write-EC, newval, ts]
        status ← (ts > valTs and ts ≥ ordTs)
        if status
            if this brick is for parity, add [xor(newval, val), ts] to the log.
            elseif newval ≠ NULL, add [newval, ts] to the log.
            else add [val, ts] to the log
        reply status
    when Receive [Order&ReadLog, ts]
        status ← (ts > max(valTs, ordTs))
        reply [status, all the log entries]
    when Receive [Commit, ts]
        Wait for a while to reject requests with stale timestamps.
        If there is a log entry for ts
            val ← the associated log value.
        Remove log entries with timestamps ts or smaller.
```

*Figure 22*

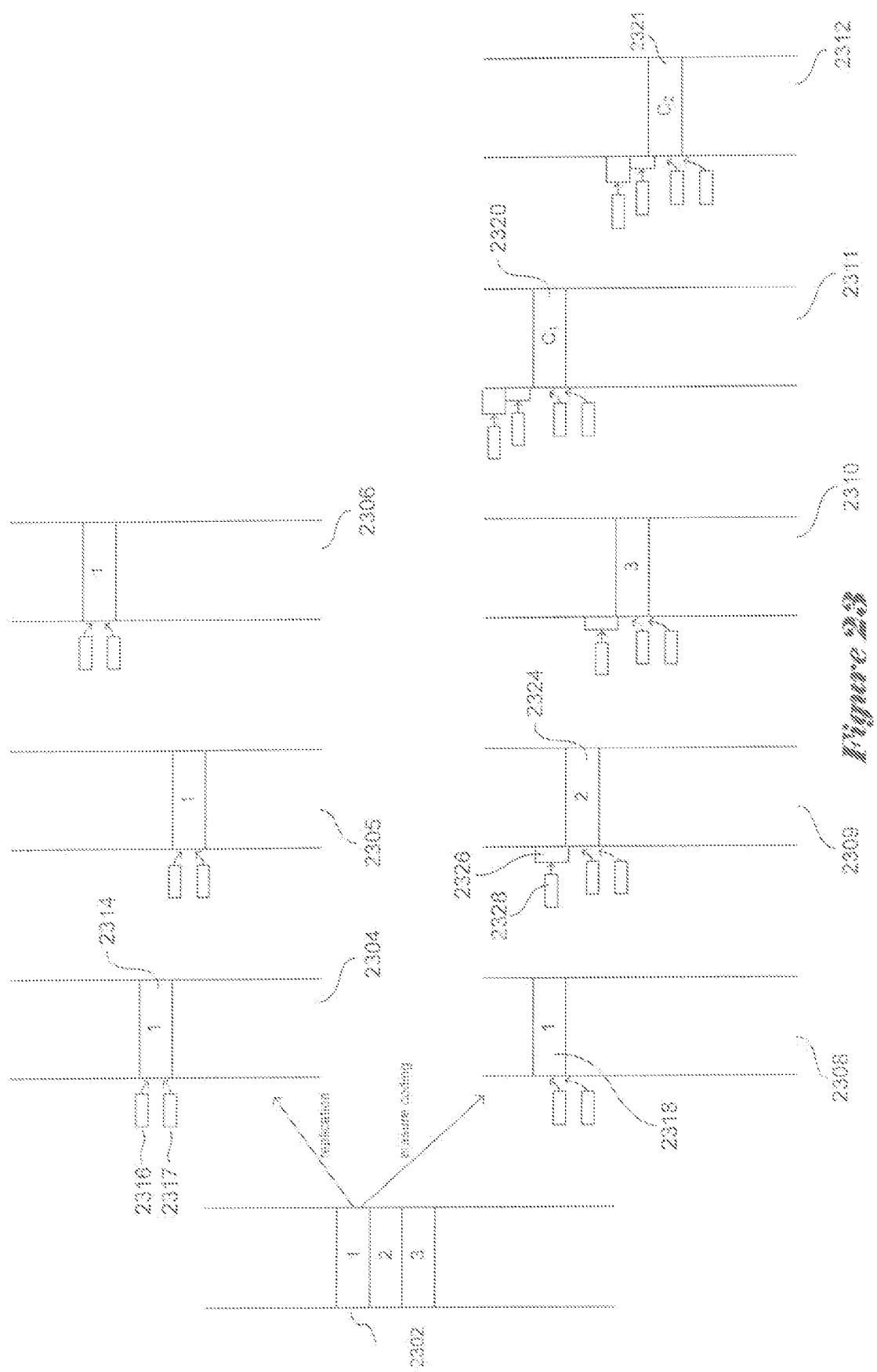

```
Sc_read( )
    Replies ← totality({Read, val-ts, activeConfs, gcConf})
    If the status in all replies is true then return val
    Else return sc_recover( )

Sc_write(v)
    Ts ← newts( )
    Replies ← totality({Order, ts, activeConfs, gcConf})
    If the status in any reply is false then return NOK
    Replies ← totality({Write, ts, v, activeConfs, gcConf})
    If the status in any reply is false then return NOK
    Return OK Sc_recover( )
    Ts ← newts( )
    Replies ← totality({Order&Read, ts, activeConfs, gcConf})
    If the status in any reply is false then return NIL
    Val ← the value with the highest val-ts from replies
    Replies ← totality({Write, val, ts, activeConfs, gcConf})
    If the status in any reply is false then return NIL
    Return val Totality(req)
    For every vdl in req.activeConfs
        Reply ← vdl.req-func(req)
        Update_confs(req.activeConfs, req.gcConf)
        Replies ← replies U reply
        Return replies
```

*Figure 27*

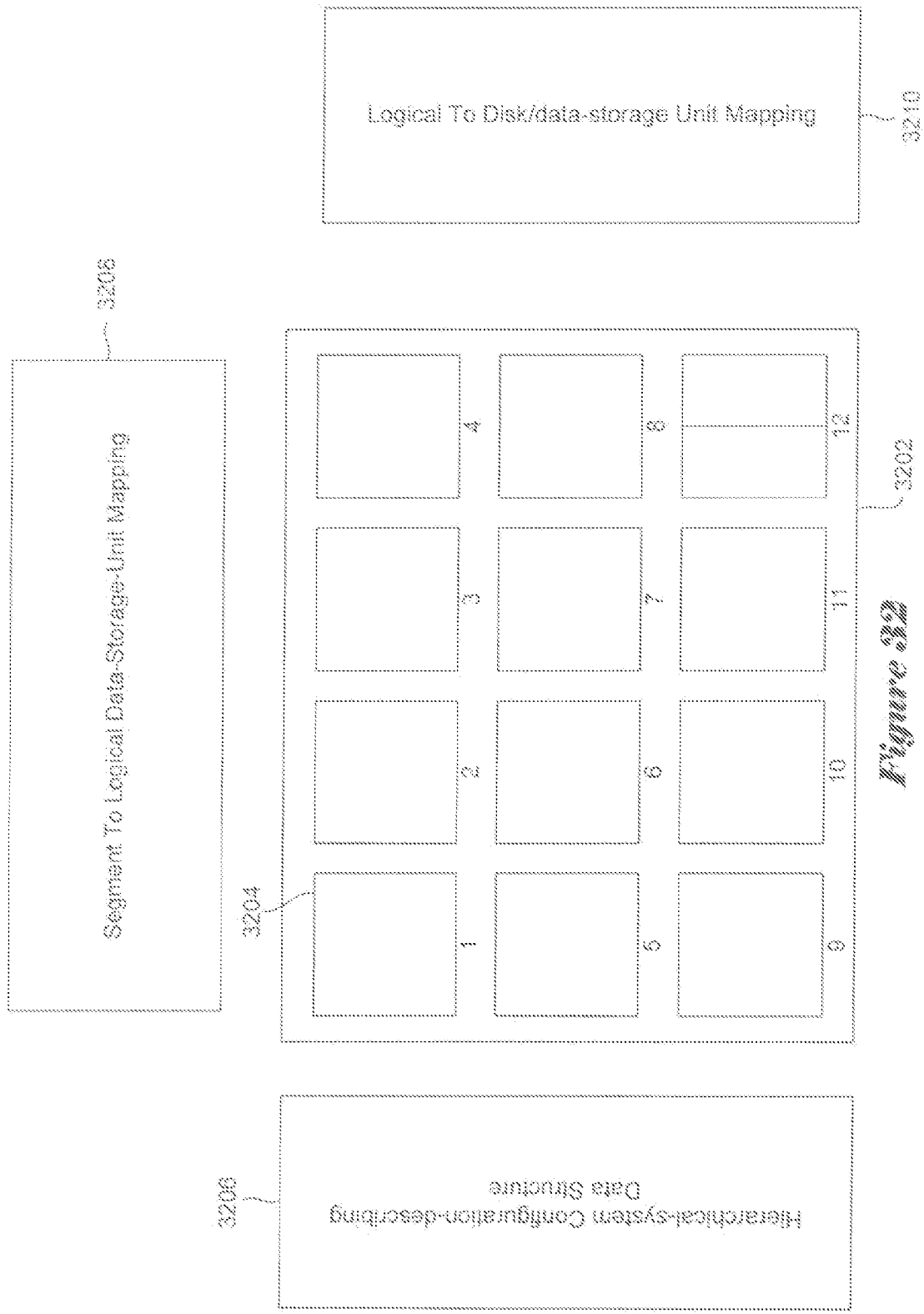

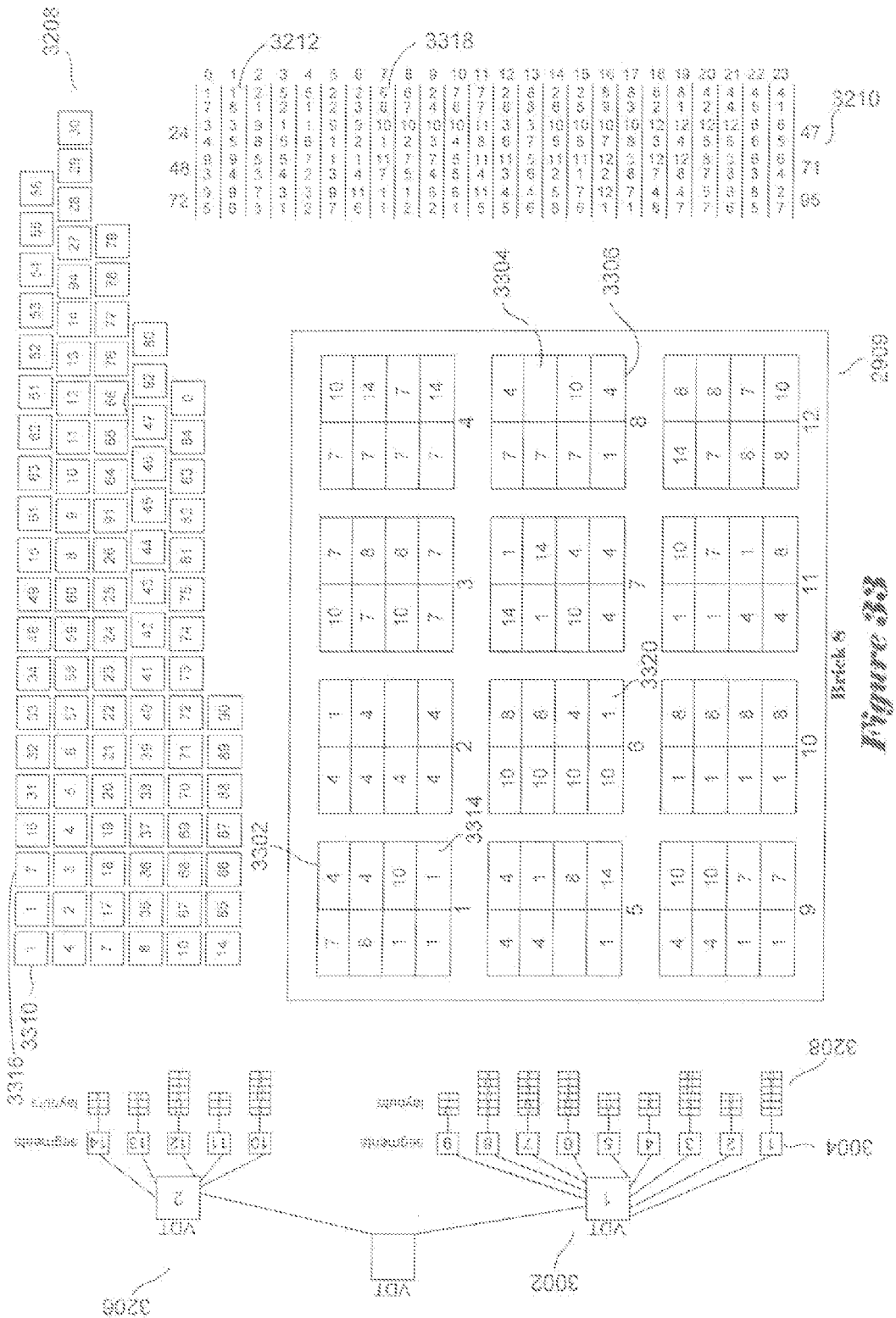

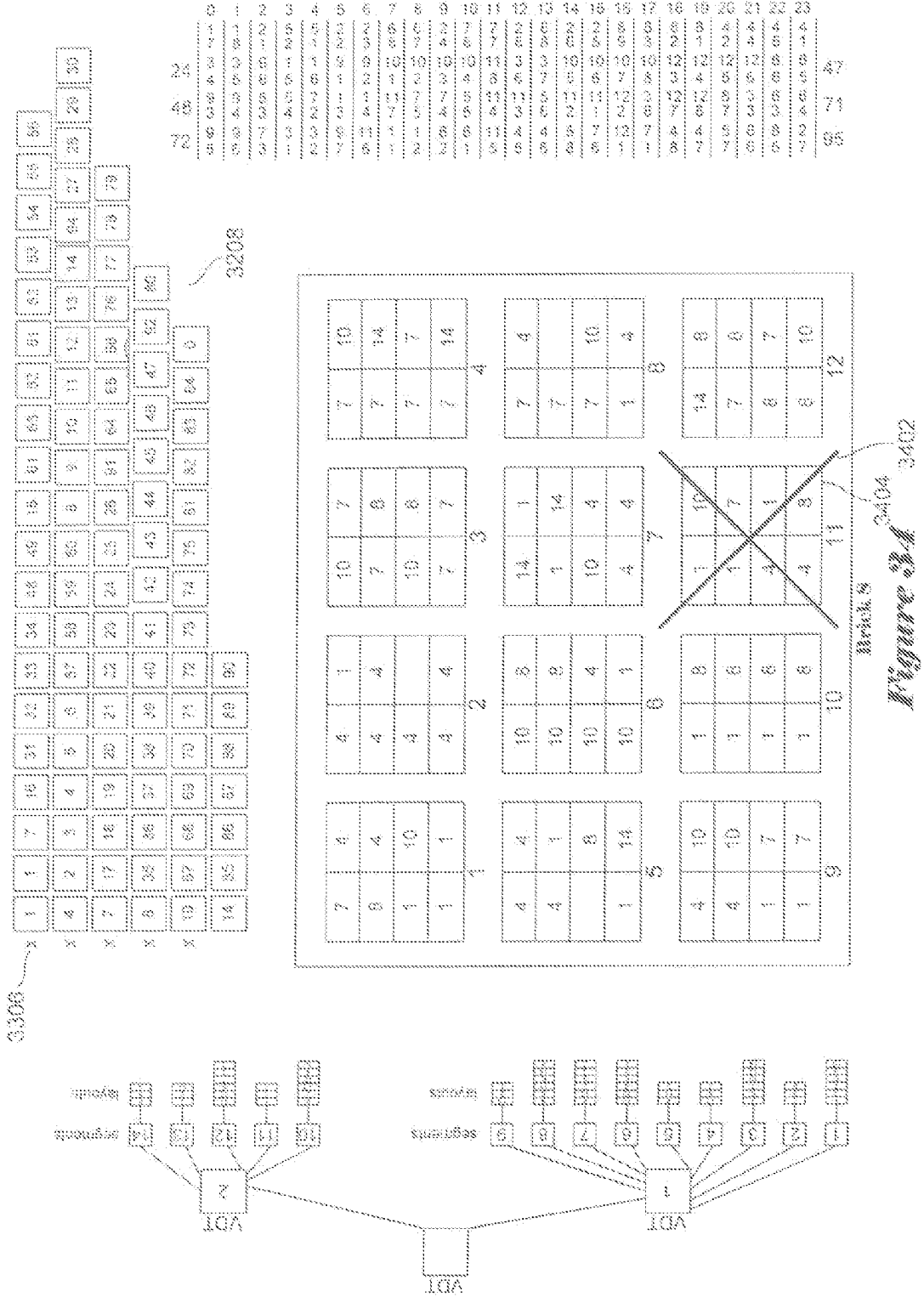

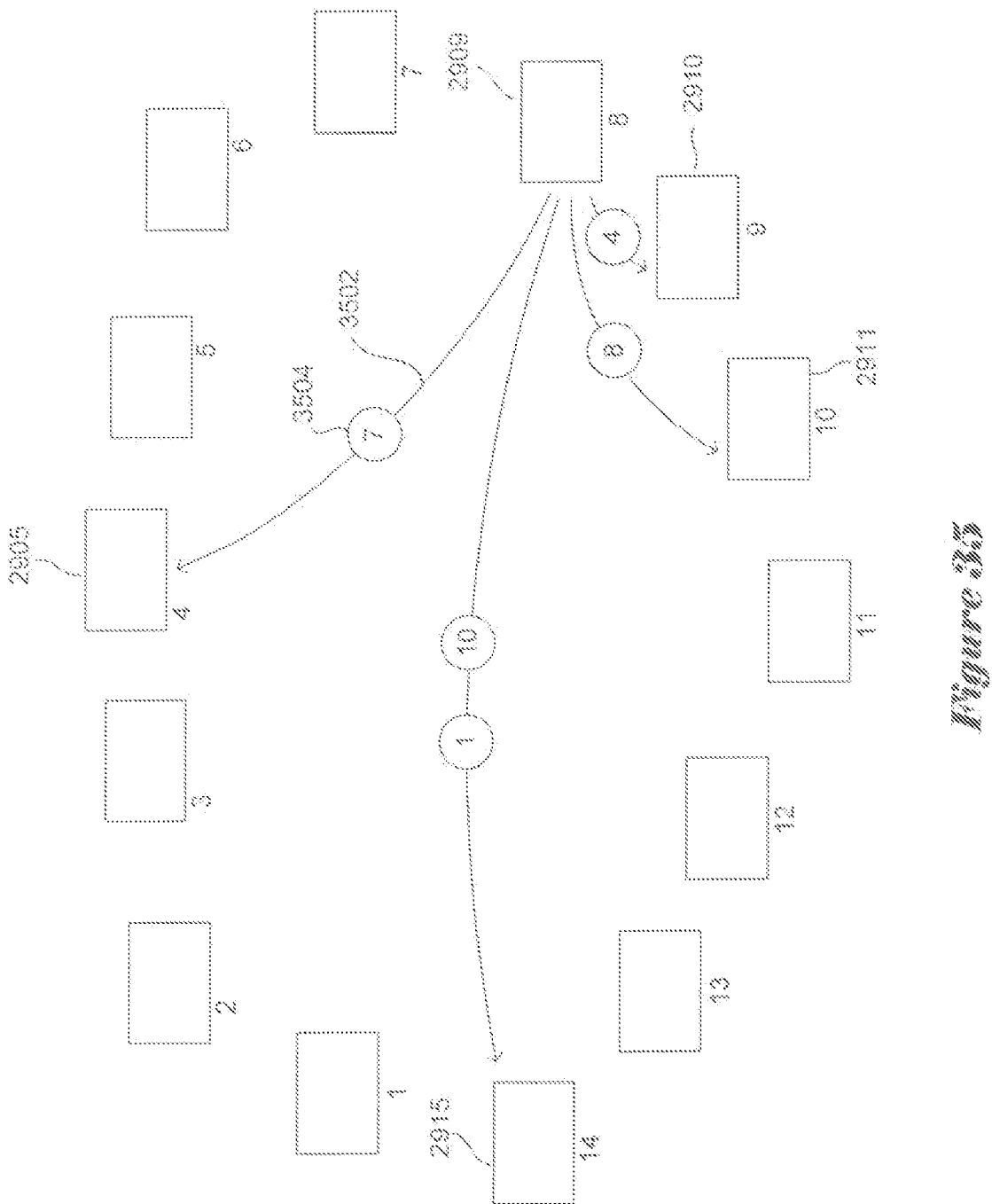

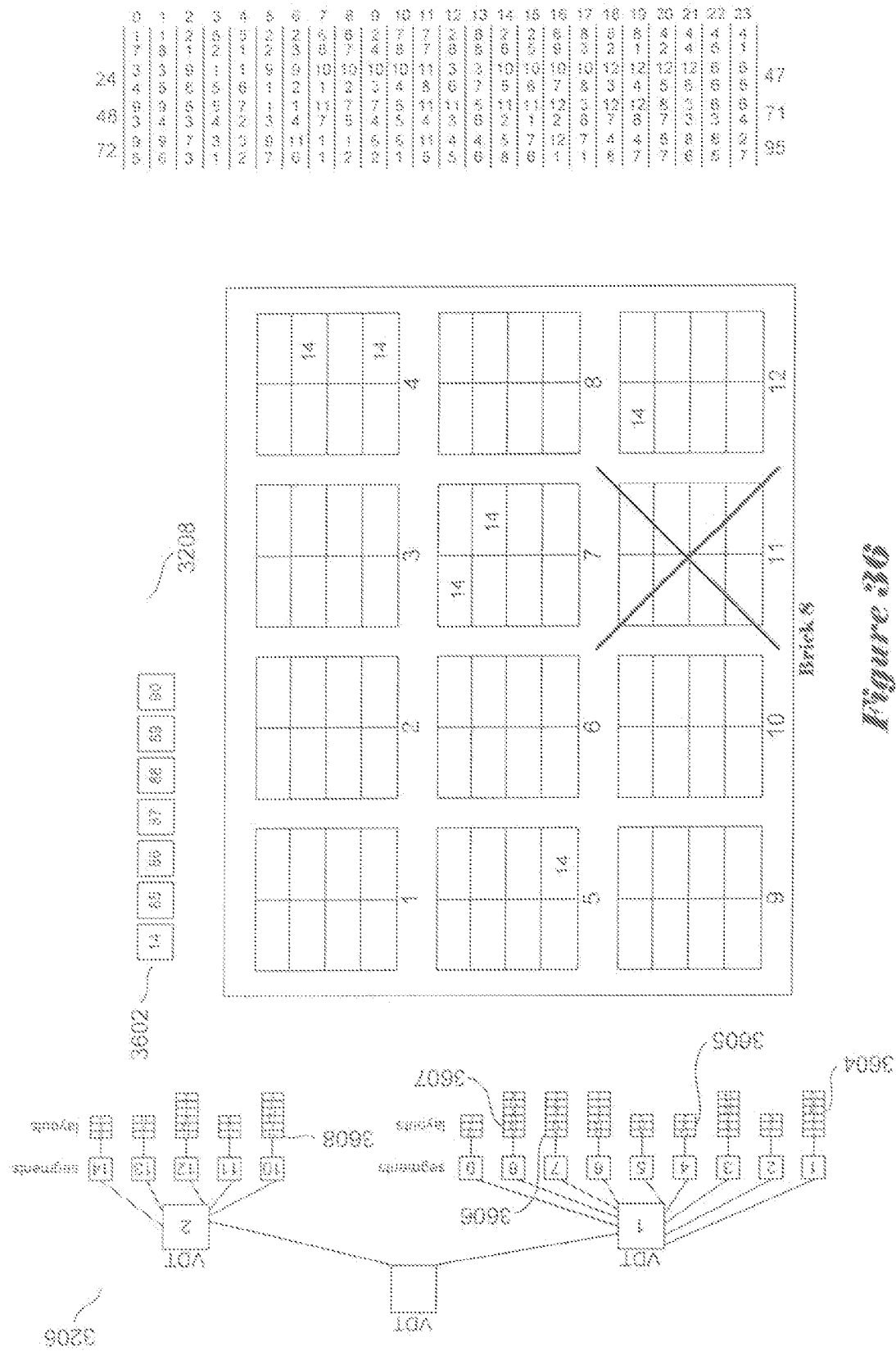

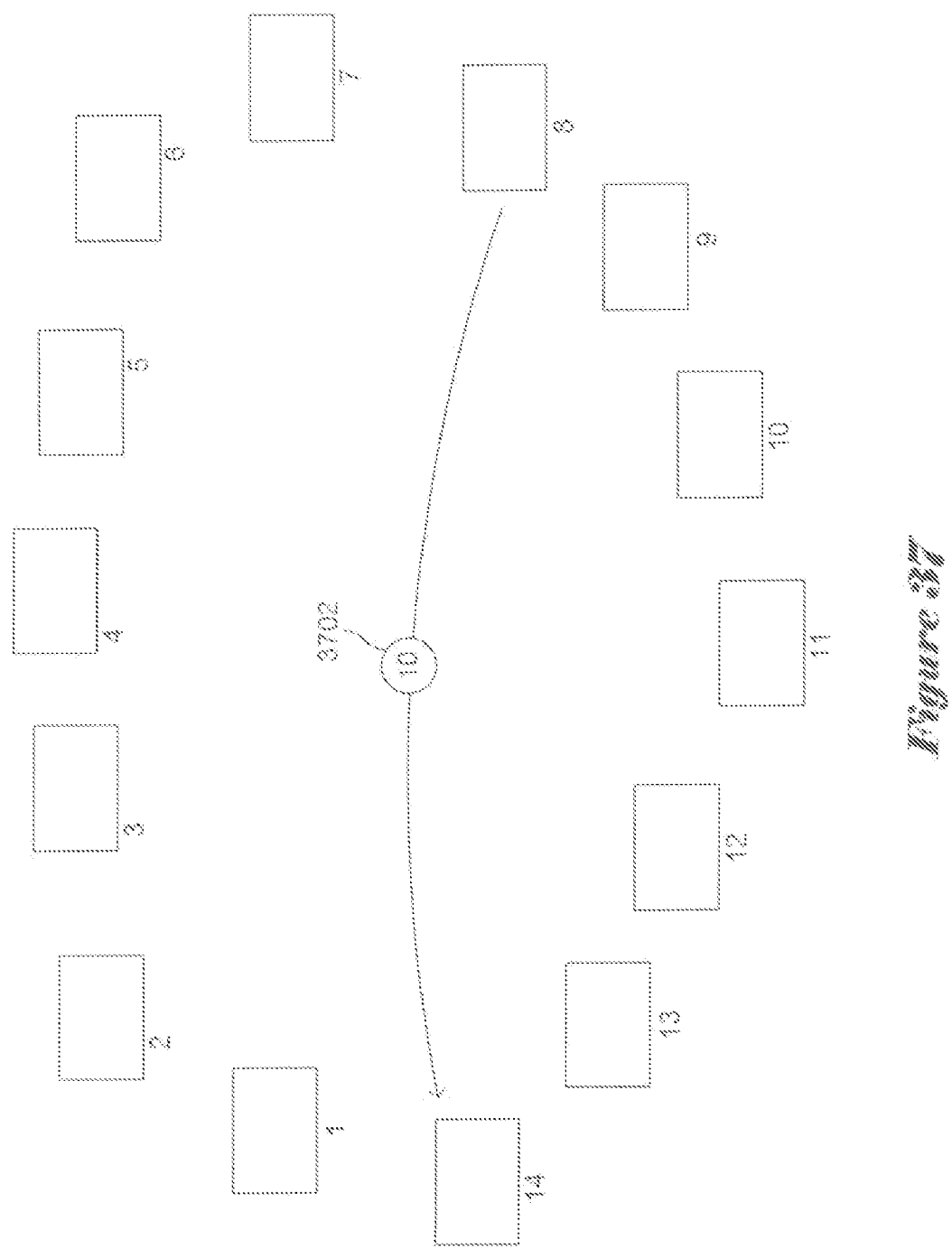

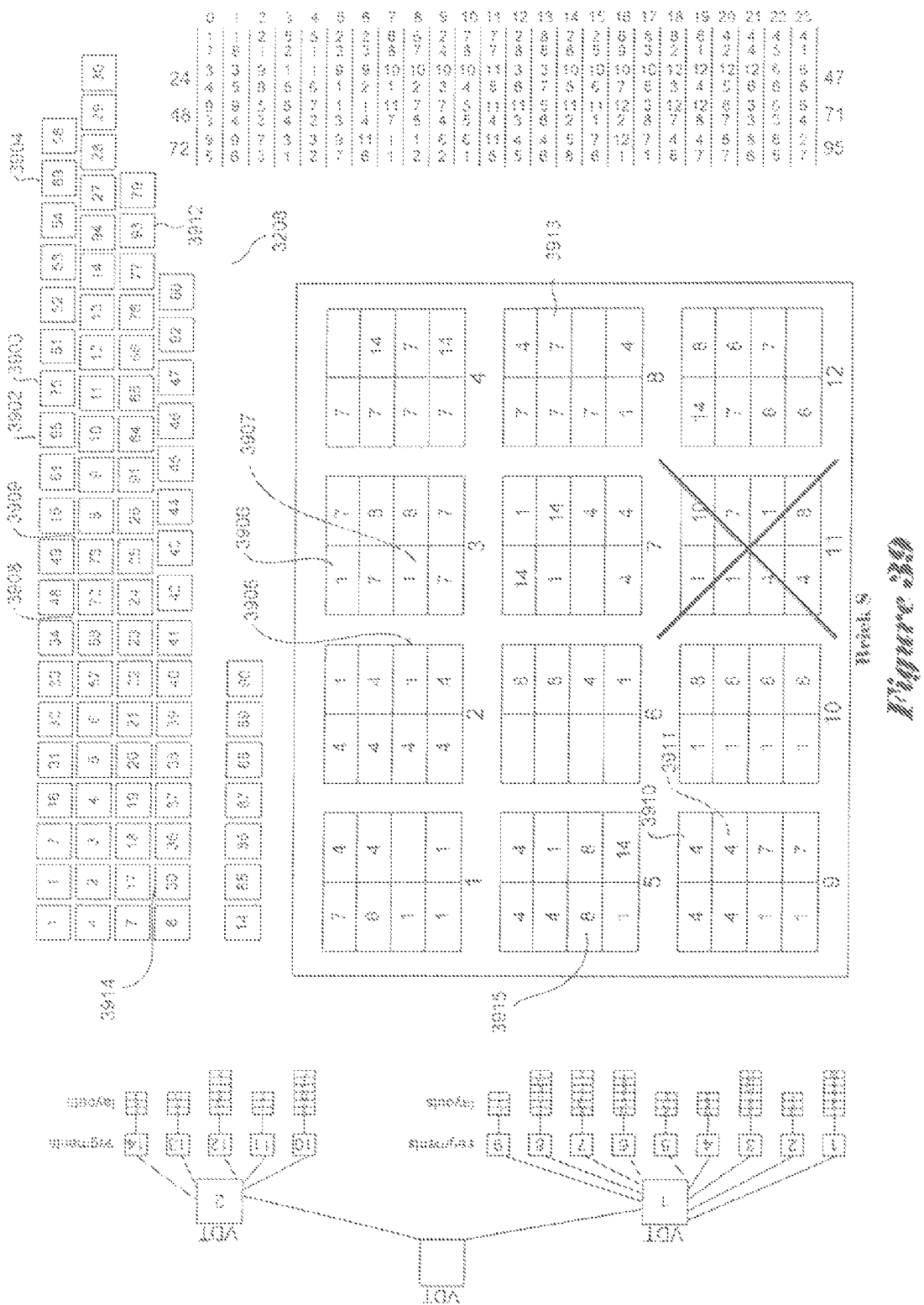

SUFFICIENT FREE SPACE FOR REDUNDANCY RECOVERY WITHIN A DISTRIBUTED DATA-STORAGE SYSTEM

TECHNICAL FIELD

The present invention is related to distributed computer systems and, in particular, to a method, and distributed-mass-storage system employing the method, for recovering redundancy following the failure of one or more disks within a component data-storage system of the distributed data-storage system.

BACKGROUND OF THE INVENTION

As computer networking and interconnection systems have steadily advanced in capabilities, reliability, and throughput, and as distributed computing systems based on networking and interconnection systems have correspondingly increased in size and capabilities, enormous progress has been made in developing theoretical understanding of distributed computing problems, in turn allowing for development and widespread dissemination of powerful and useful tools and approaches for distributing computing tasks within distributed systems. Early in the development of distributed systems, large mainframe computers and minicomputers, each with a multitude of peripheral devices, including mass-storage devices, were interconnected directly or through networks in order to distribute processing of large, computational tasks. As networking systems became more robust, capable, and economical, independent mass-storage devices, such as independent disk arrays, interconnected through one or more networks with remote host computers, were developed for storing large amounts of data shared by numerous computer systems, from mainframes to personal computers. Recently, as described below in greater detail, development efforts have begun to be directed towards distributing mass-storage systems across numerous mass-storage devices interconnected by one or more networks.

As mass-storage devices have evolved from peripheral devices separately attached to, and controlled by, a single computer system to independent devices shared by remote host computers, and finally to distributed systems composed of numerous, discrete, mass-storage units networked together, problems associated with sharing data and maintaining shared data in consistent and robust states have dramatically increased. Designers, developers, manufacturers, vendors, and, ultimately, users of distributed systems continue to recognize the need for extending already developed distributed-computing methods and routines, and for new methods and routines, that provide desired levels of data robustness and consistency in larger, more complex, and more highly distributed systems.

Recently, a new distributed data-storage system architecture, referred to as the "federated array of bricks" ("FAB") architecture has been developed. The FAB architecture, is described, in detail, below. The FAB architecture presents new problems with regard to managing and recovering redundancy under various failure conditions and failure modes. Designers, developers, manufacturers, and vendors of mass-storage systems developed according to this new architecture have recognized a need for efficient methods for redundancy recovery upon failure of individual mass-storage devices within component data-storage systems of the distributed data-storage system.

SUMMARY OF THE INVENTION

Embodiments of the present invention are directed to methods, and distributed data-storage systems employing the methods, for recovering redundancy within a distributed data-storage system upon failure of one or more mass-storage devices within a component data-storage system of the distributed data-storage system. In certain embodiments, failure of a mass-storage device within a component data-storage system elicits a redundancy-recovery operation in which segments affected by the mass-storage-device failure or failures are moved, by a process referred to as "migration," to other component data-storage systems of the distributed data-storage system, and are recovered as a by-product of migration. Certain embodiments of the present invention more efficiently address redundancy recovery by moving only as many segments from the component data-storage system as needed to provide sufficient free space within the component data-storage system to recover the remaining segments affected by the mass-storage-device failure or failures within the component data-storage system.

BRIEF DESCRIPTION OF THE DRAWINGS

FIGS. 3-4 illustrate the concept of data mirroring.

FIG. 7 illustrates the hierarchical data units employed in a current FAB implementation that represent one embodiment of the present invention.

FIGS. 8A-D illustrate a hypothetical mapping of logical data units to physical disks of a FAB system that represents one embodiment of the present invention.

FIGS. 11A-H illustrate various different types of configuration changes reflected in the data-description data structure shown in FIG. 10A within a FAB system that represent one embodiment of the present invention.

FIG. 20 illustrates determination of the current value of a distributed storage register by means of a quorum.

FIG. 21 shows pseudocode implementations for the routine handlers and operational routines shown diagrammatically in FIG. 19.

FIG. 22 shows modified pseudocode, similar to the pseudocode provided in FIG. 17, which includes extensions to the storage-register model that handle distribution of segments across bricks according to erasure coding redundancy schemes within a FAB system that represent one embodiment of the present invention.

FIG. 23 illustrates the large dependence on timestamps by the data consistency techniques based on the storage-register model within a FAB system that represent one embodiment of the present invention.

FIGS. 25-26 provide pseudocode for a further extended storage-register model that includes the concept of quorum-based writes to multiple, active configurations that may be present due to reconfiguration of a distributed segment within a FAB system that represent one embodiment of the present invention.

FIG. 27 shows high-level pseudocode for extension of the storage-register model to the migration level within a FAB system that represent one embodiment of the present invention.

FIGS. 29-33 illustrate a hypothetical distributed data-storage system used as a context for a detailed description of the redundancy-recovery methods that represent embodiments of the present invention.

FIG. 33 illustrates a hypothetical data-storage state of brick 8 in the hypothetical distributed data-storage system shown in FIGS. 29-31.

FIG. 34 illustrates failure of a mass-storage device within brick 8 of the hypothetical distributed data-storage system shown in FIGS. 29-31.

FIG. 35 illustrates one method by which redundancy can be recovered within a distributed data-storage system such as that illustrated in FIGS. 29-31.

FIG. 36 illustrates the data state of brick 8 following migration of affected segments from brick 8 to other bricks in the distributed data-storage system.

FIGS. 37-38 illustrate a second redundancy-restoring method that represents an embodiment of the present invention.

FIG. 39 illustrates the data state of brick 8 following recovery of the remaining segments 1, 4, 7, and 8 affected by failure of mass-storage device 11 following migration of segment 10 to brick 14.

DETAILED DESCRIPTION OF THE INVENTION

Various embodiments of the present invention are directed to redundancy-recovery methods, and distributed data-storage systems employing the redundancy-recovery methods, invoked upon detection of a failure or failures of one or more mass-storage devices within a component data-storage system of a distributed data-storage system. One embodiment of the present invention is described, below, within the context of a type of distributed mass-storage device currently under development. The context is somewhat complex. In following subsections, the distributed data-storage system and various methods employed by processing components of the distributed data-storage system are first discussed, in order to provide the context in which redundancy-recovery methods that represent embodiments of the present invention are subsequently described. In a final subsection, the redundancy-recovery methods that represent embodiments of the present invention are described, in detail, with reference to FIGS. 29-39 and with reference to a control-flow diagram provided in FIG. 40.

Introduction to FAB

Figure 1:
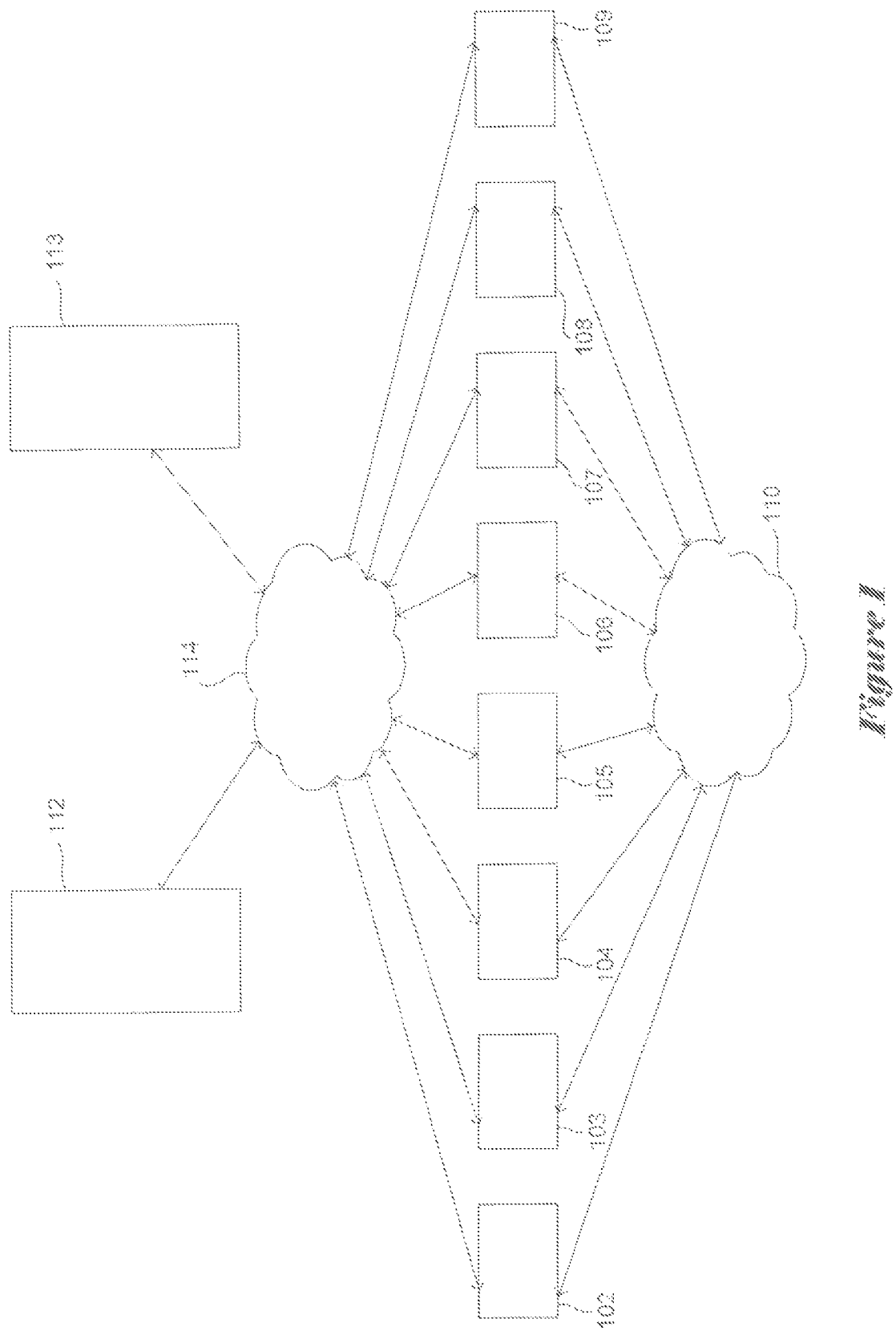
FIG. 1 shows a high level diagram of a FAB mass-storage system according to one embodiment of the present invention.

The federated array of bricks ("FAB") architecture represents a new, highly-distributed approach to mass storage. FIG. 1 shows a high level diagram of a FAB mass-storage system according to one embodiment of the present invention. A FAB mass-storage system, subsequently referred to as a "FAB system," comprises a number of small, discrete component data-storage systems, or mass-storage devices, 102-109 that intercommunicate with one another through a first communications medium 110 and that can receive requests from, and transmit replies to, a number of remote host computers 112-113 through a second communications medium 114. Each discrete, component-data-storage system 102-109 may be referred to as a "brick." A brick may include an interface through which requests can be received from remote host computers, and responses to the received requests transmitted back to the remote host computers. Any brick of a FAB system may receive requests, and respond to requests, from host computers. One brick of a FAB system assumes a coordinator role with respect to any particular request, and coordinates operations of all bricks involved in responding to the particular request, and any brick in the FAB system may assume a coordinator role with respect to a given request. A FAB system is therefore a type of largely software-implemented, symmetrical, distributed computing system. In certain alternative embodiments, a single network may be employed both for interconnecting bricks and interconnecting the FAB system to remote host computers. In other alternative embodiments, more than two networks may be employed.

Figure 2:
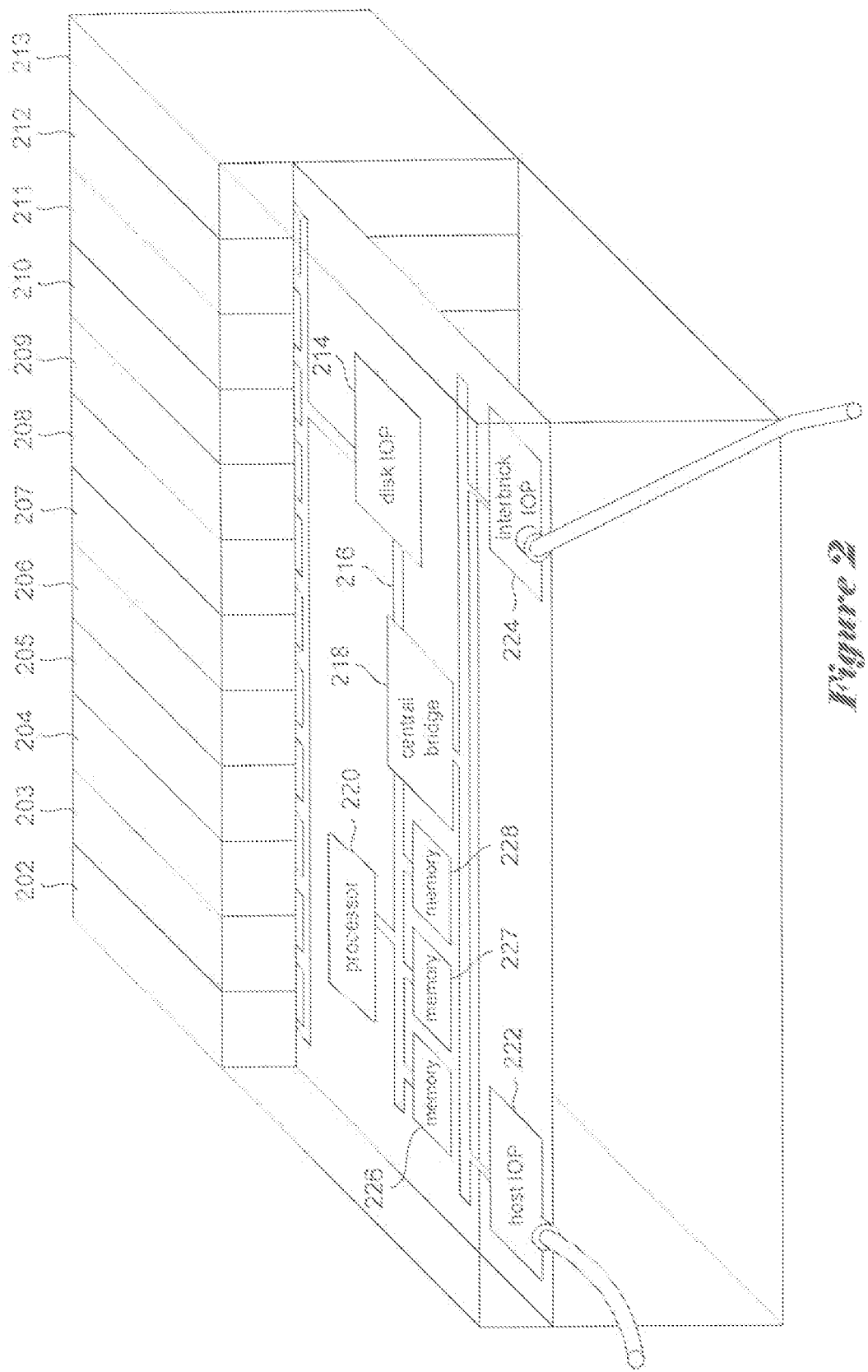
FIG. 2 shows a high-level diagram of an exemplary FAB brick according to one embodiment of the present invention.

FIG. 2 shows a high-level diagram of an exemplary FAB brick according to one embodiment of the present invention. The FAB brick illustrated in FIG. 2 includes 12 SATA disk drives 202-213 that interface to a disk I/O processor 214. The disk I/O processor 214 is interconnected through one or more high-speed busses 216 to a central bridge device 218. The central bridge 218 is, in turn, interconnected to one or more general processors 220, a host I/O processor 222, an interbrick I/O processor 22, and one or more memories 226-228. The host I/O processor 222 provides a communications interface to the second communications medium (114 in FIG. 1) through which the brick communicates with remote host computers. The interbrick I/O processor 224 provides a communications interface to the first communications medium (110 in FIG. 1) through which the brick communicates with other bricks of the FAB. The one or more general processors 220 execute a control program for, among many tasks and responsibilities, processing requests from remote host computers and remote bricks, managing state information stored in the one or more memories 226-228 and on storage devices 202-213, and managing data storage and data consistency within the brick. The one or more memories serve as a cache for data as well as a storage location for various entities, including timestamps and data structures, used by control processes that control access to data stored within the FAB system and that maintain data within the FAB system in a consistent state. The memories typically include both volatile and non-volatile memories. In the following discussion, the one or more general processors, the one or more memories, and other components, one or more of which are initially noted to be included, may be referred to in the singular to avoid repeating the phrase "1one or more."

In certain embodiments of the present invention, all the bricks in a FAB are essentially identical, running the same control programs, maintaining essentially the same data structures and control information within their memories 226 and mass-storage devices 202-213, and providing standard interfaces through the I/O processors to host computers, to other bricks within the FAB, and to the internal disk drives. In these embodiments of the present invention, bricks within the FAB may slightly differ from one another with respect to versions of the control programs, specific models and capabilities of internal disk drives, versions of the various hardware components, and other such variations. Interfaces and control programs are designed for both backwards and forwards compatibility to allow for such variations to be tolerated within the FAB.

Each brick may also contain numerous other components not shown in FIG. 2, including one or more power supplies, cooling systems, control panels or other external control interfaces, standard random-access memory, and other such components. Bricks are relatively straightforward devices, generally constructed from commodity components, including commodity I/O processors and disk drives. A brick employing 12 100-GB SATA disk drives provides 1.2 terabytes of storage capacity, only a fraction of which is needed for internal use. A FAB may comprise hundreds or thousands of bricks, with large FAB systems, currently envisioned to contain between 5,000 and 10,000 bricks, providing petabyte ("PB") storage capacities. Thus, FAB mass-storage systems provide a huge increase in storage capacity and cost efficiency over current disk arrays and network attached storage devices.

Redundancy

Large mass-storage systems, such as FAB systems, not only provide massive storage capacities, but also provide and manage redundant storage, so that if portions of stored data are lost, due to brick failure, disk-drive failure, failure of particular cylinders, tracks, sectors, or blocks on disk drives, failures of electronic components, or other failures, the lost data can be seamlessly and automatically recovered from redundant data stored and managed by the large scale mass-storage systems, without intervention by host computers or manual intervention by users. For important data storage applications, including database systems and enterprise-critical data, two or more large scale mass-storage systems are often used to store and maintain multiple, geographically dispersed instances of the data, providing a higher-level redundancy so that even catastrophic events do not lead to unrecoverable data loss.

Figure 3:
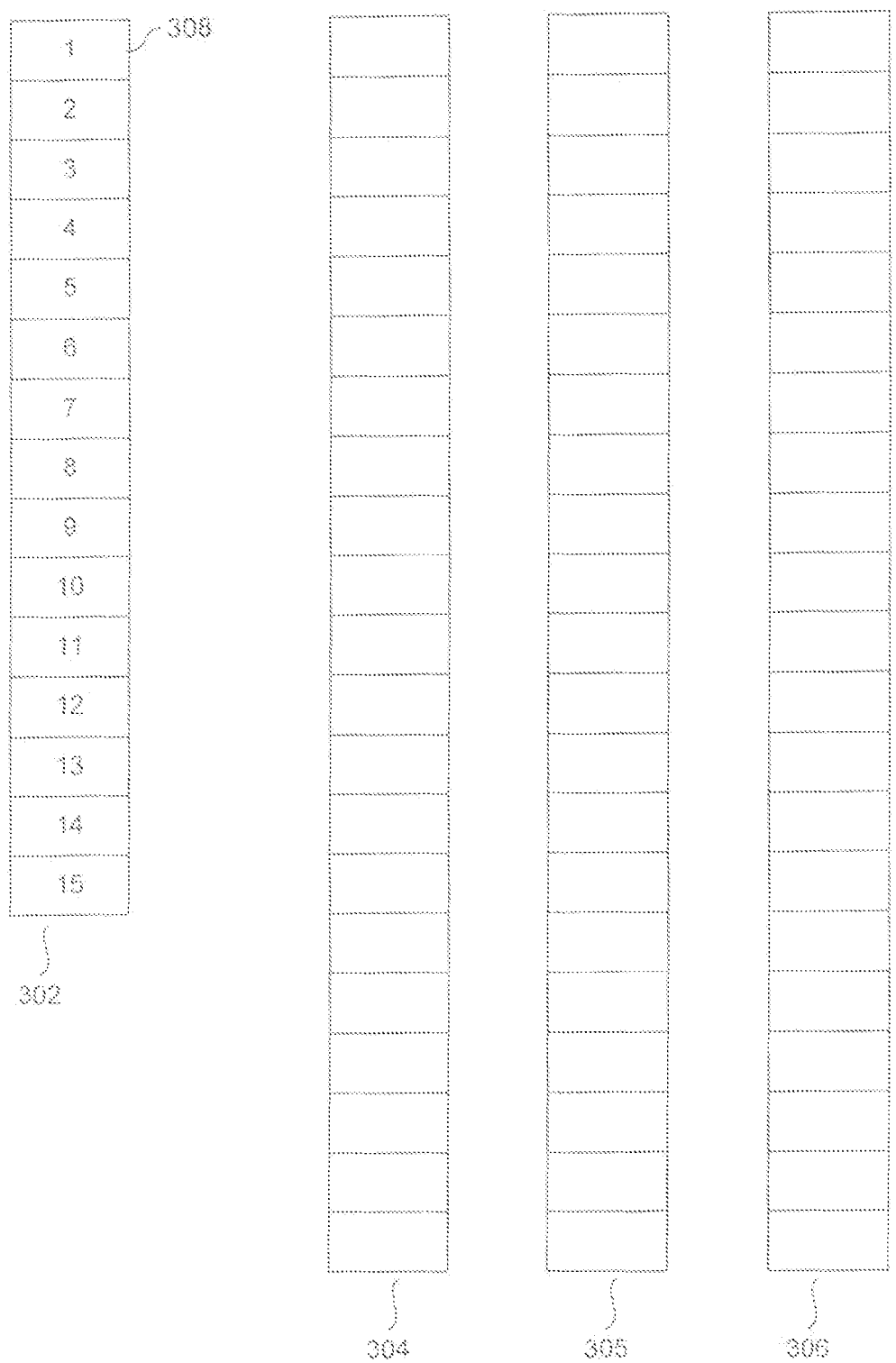

In certain embodiments of the present invention, FAB systems automatically support at least two different classes of lower-level redundancy. The first class of redundancy involves brick-level mirroring, or, in other words, storing multiple, discrete copies of data objects on two or more bricks, so that failure of one brick does not lead to unrecoverable data loss. FIGS. 3-4 illustrate the concept of data mirroring. FIG. 3 shows a data object 302 and logical representation of the contents of three bricks 304-306 according to an embodiment of the present invention. The data object 302 comprises 15 sequential data units, such as data unit 308, numbered "1" through "15" in FIG. 3. A data object may be a volume, a file, a data base, or another type of data object, and data units may be blocks, pages, or other such groups of consecutively addressed storage locations. FIG. 4 shows triple-mirroring redundant storage of the data object 302 on the three bricks 304-306 according to an embodiment of the present invention. Each of the three bricks contains copies of all 15 of the data units within the data object 302. In many illustrations of mirroring, the layout of the data units is shown to be identical in all mirror copies of the data object. However, in reality, a brick may choose to store data units anywhere on its internal disk drives. In FIG. 4, the copies of the data units within the data object 302 are shown in different orders and positions within the three different bricks. Because each of the three bricks 304-306 stores a complete copy of the data object, the data object is recoverable even when two of the three bricks fail. The probability of failure of a single brick is generally relatively slight, and the combined probability of failure of all three bricks of a three-brick mirror is generally extremely small. In general, a FAB system may store millions, billions, trillions, or more different data objects, and each different data object may be separately mirrored over a different number of bricks within the FAB system. For example, one data object may be mirrored over bricks 1, 7, 8, and 10, while another data object may be mirrored over bricks 4, 8, 13, 17, and 20.

A second redundancy class is referred to as "erasure coding" redundancy. Erasure coding redundancy is somewhat more complicated than mirror redundancy. Erasure coding redundancy often employs Reed-Solomon encoding techniques used for error control coding of communications messages and other digital data transferred through noisy channels. These error-control-coding techniques are specific examples of binary linear codes.

Figure 5:
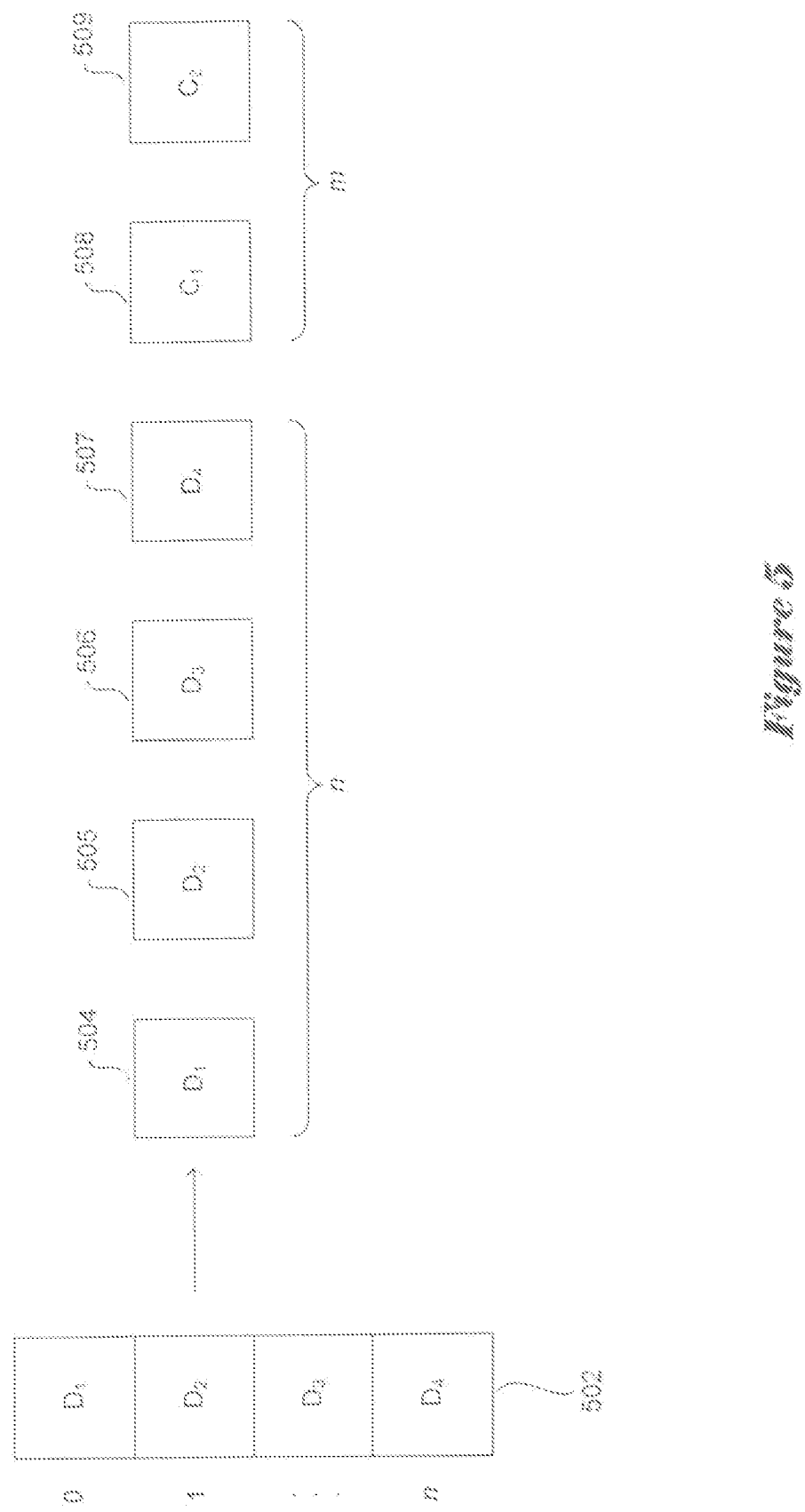
FIG. 5 shows a high-level diagram depicting erasure coding redundancy.

FIG. 5 shows a high-level diagram depicting erasure coding redundancy. In FIG. 5, a data object 502 comprising n=4 data units is distributed across a number of bricks 504-509 greater than n. The first n bricks 504-506 each stores one of the n data units. The final m=2 bricks 508-509 store checksum, or parity, data computed from the data object. The erasure coding redundancy scheme shown in FIG. 5 is an example of an m+n erasure coding redundancy scheme. Because n=4 and m=2, the specific m+n erasure coding redundancy scheme illustrated in FIG. 5 is referred to as a "4+2" redundancy scheme. Many other erasure coding redundancy schemes are possible, including 8+2, 3+3, and other schemes. In general, m is less than or equal to n. As long as m or less of the m+n bricks fail, regardless of whether the failed bricks contain data or parity values, the entire data object can be restored. For example, in the erasure coding scheme shown in FIG. 5, the data object 502 can be entirely recovered despite failures of any pair of bricks, such as bricks 505 and 508.

Figure 6:
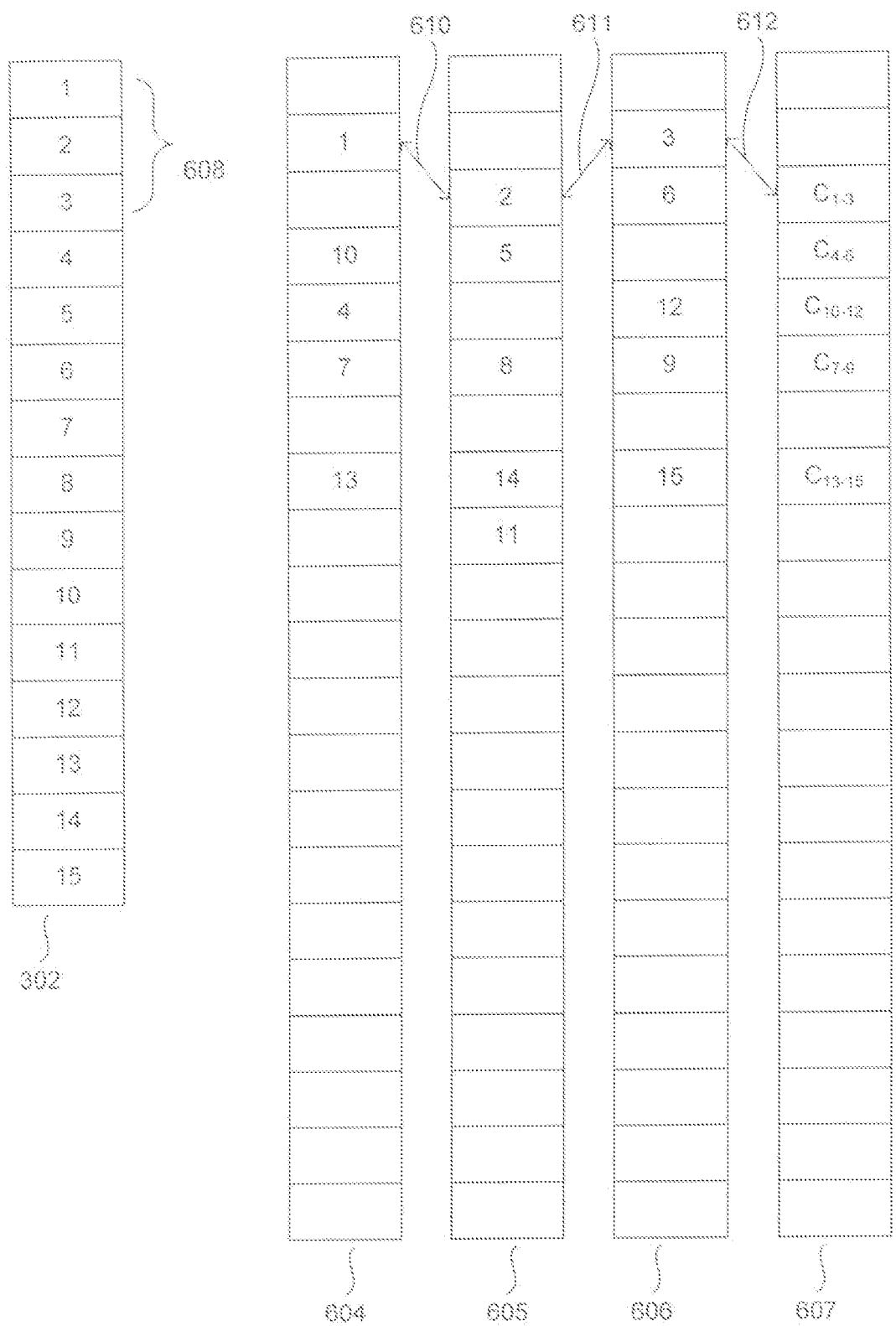
FIG. 6 shows a 3+1 erasure coding redundancy scheme using the same illustration conventions as used in FIGS. 3 and 4.

FIG. 6 shows an exemplary 3+1 erasure coding redundancy scheme using the same illustration conventions as used in FIGS. 3 and 4. In FIG. 6, the 15-data-unit data object 302 is distributed across four bricks 604-607. The data units are striped across the four disks, with each three-data-unit of the data object sequentially distributed across bricks 604-606, and a check sum, or parity data unit for the stripe placed on brick 607. The first stripe, consisting of the three data units 608, is indicated in FIG. 6 by arrows 610-612. Although, in FIG. 6, checksum data units are all located on a single brick 607, the stripes may be differently aligned with respect to the bricks, with each brick containing some portion of the checksum or parity data units.

Erasure coding redundancy is generally carried out by mathematically computing checksum or parity bits for each byte, word, or long word of a data unit. Thus, m parity bits are computed from n data bits, where n=8, 16, or 32, or a higher power of two. For example, in an 8+2 erasure coding redundancy scheme, two parity check bits are generated for each byte of data. Thus, in an 8+2 erasure coding redundancy scheme, eight data units of data generate two data units of checksum, or parity bits, all of which can be included in a ten-data-unit stripe. In the following discussion, the term "word" refers to a data-unit granularity at which encoding occurs, and may vary from bits to longwords or data units of greater length. In data-storage applications, the data-unit granularity may typically be 512 bytes or greater.

The $i^{th}$ checksum word $c_i$ may be computed as a function of all n data words by a function $F_i(d_1, d_2, \ldots, d_n)$ which is a linear combination of each of the data words $d_j$ multiplied by a coefficient $f_{i,j}$, as follows:

$$c_i = F_i(d_1, d_2, \ldots, d_n) = \sum_{j=1}^{n} d_j f_{i,j}$$

In matrix notation, the equation becomes:

$$\begin{bmatrix} c_1 \\ c_2 \\ \vdots \\ c_m \end{bmatrix} = \begin{bmatrix} f_{1,1} & f_{1,2} & \cdots & f_{1,n} \\ f_{2,1} & f_{2,2} & \cdots & f_{2,n} \\ \vdots & \vdots & & \vdots \\ f_{m,1} & f_{m,2} & \cdots & f_{m,n} \end{bmatrix} \begin{bmatrix} d_1 \\ d_2 \\ \vdots \\ d_n \end{bmatrix}$$

or:

C=FD

In the Reed-Solomon technique, the function F is chose to be an m×n Vandermonde matrix with elements $f_{i,j}$ equal to $j^{i-1}$, or:

$$F = \begin{bmatrix} 1 & 1 & \cdots & 1 \\ 1 & 2 & \cdots & n \\ \vdots & \vdots & & \vdots \\ 1 & 2^{m-1} & \cdots & n^{m-1} \end{bmatrix}$$

If a particular word $d_j$ is modified to have a new value $d'_j$, then a new $i^{th}$ check sum word $c'_i$ can be computed as:

$c'_i = c_i + f_{i,j}(d'_j - d_j)$ or:

$c' = C + FD' - FD = C + F(D' - D)$

Thus, new checksum words are easily computed from the previous checksum words and a single column of the matrix F.

Lost words from a stripe are recovered by matrix inversion. A matrix A and a column vector E are constructed, as follows:

$$A = \begin{bmatrix} I \\ F \end{bmatrix} = \begin{bmatrix} 1 & 0 & 0 & \cdots & 0 \\ 0 & 1 & 0 & \cdots & 0 \\ 0 & 0 & 1 & \cdots & 0 \\ \vdots & \vdots & \vdots & & \vdots \\ 0 & 0 & 0 & \cdots & 1 \\ 1 & 1 & 1 & \cdots & 1 \\ 1 & 2 & 3 & \cdots & n \\ \vdots & \vdots & \vdots & & \vdots \\ 1 & 2^{m-1} & 3^{m-1} & \cdots & n^{n-1} \end{bmatrix}$$

$$E = \begin{bmatrix} D \\ C \end{bmatrix} = \begin{bmatrix} d_1 \\ d_2 \\ \vdots \\ d_n \\ c_1 \\ c_2 \\ \vdots \\ c^m \end{bmatrix}$$

It is readily seen that:

AD=E or:

$$\begin{bmatrix} 1 & 0 & 0 & \cdots & 0 \\ 0 & 1 & 0 & \cdots & 0 \\ 0 & 0 & 1 & \cdots & 0 \\ \vdots & \vdots & \vdots & & \vdots \\ 0 & 0 & 0 & \cdots & 1 \\ 1 & 1 & 1 & \cdots & n \\ 1 & 2 & 3 & \cdots & n \\ \vdots & \vdots & \vdots & & \vdots \\ 1 & 2^{m-1} & 3^{m-1} & \cdots & n^{m-1} \end{bmatrix} \begin{bmatrix} d_1 \\ d_2 \\ \vdots \\ d_n \end{bmatrix} = \begin{bmatrix} d_1 \\ d_2 \\ d_3 \\ \vdots \\ d_n \\ c_1 \\ c_2 \\ \vdots \\ c_m \end{bmatrix}$$

One can remove any m rows of the matrix A and corresponding rows of the vector E in order to produce modified matrices A' and E', where A' is a square matrix. Then, the vector D representing the original data words can be recovered by matrix inversion as follows:

A'D=E'

$D = A'^{-1} E'$

Thus, when m or fewer data or checksum words are erased, or lost, m data or checksum words including the m or fewer lost data or checksum words can be removed from the vector E, and corresponding rows removed from the matrix A, and the original data or checksum words can be recovered by matrix inversion, as shown above.

While matrix inversion is readily carried out for real numbers using familiar real-number arithmetic operations of addition, subtraction, multiplication, and division, discrete-valued matrix and column elements used for digital error control encoding are suitable for matrix multiplication only when the discrete values form an arithmetic field that is closed under the corresponding discrete arithmetic operations. In general, checksum bits are computed for words of length w:

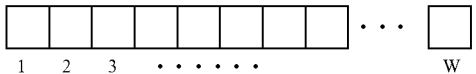

A w-bit word can have any of $2^w$ different values. A mathematical field known as a Galois field can be constructed to have $2^w$ elements. The arithmetic operations for elements of the Galois field are, conveniently:

$a \pm b = a \oplus b$ $a * b = \text{anti log } [\log(a) + \log(b)]$ $a \div b = \text{anti log } [\log(a) - \log(b)]$ where tables of logs and anti logs for the Galois field elements can be computed using a propagation method involving a primitive polynomial of degree w.

Mirror-redundancy schemes are conceptually more simple, and easily lend themselves to various reconfiguration operations. For example, if one brick of a 3-brick, triple-mirror-redundancy scheme fails, the remaining two bricks can be reconfigured as a 2-brick mirror pair under a double-mirroring-redundancy scheme. Alternatively, a new brick can be selected for replacing the failed brick, and data copied from one of the surviving bricks to the new brick to restore the 3-brick, triple-mirror-redundancy scheme. By contrast, reconfiguration of erasure coding redundancy schemes is not as straightforward. For example, each checksum word within a stripe depends on all data words of the stripe. If it is desired to transform a 4+2 erasure-coding-redundancy scheme to an 8+2 erasure-coding-redundancy scheme, then all of the checksum bits may be recomputed, and the data may be redistributed over the 10 bricks used for the new, 8+2 scheme, rather than copying the relevant contents of the 6 bricks of the 4+2 scheme to new locations. Moreover, even a change of stripe size for the same erasure coding scheme may involve recomputing all of the checksum data units and redistributing the data across new brick locations. In most cases, change to an erasure-coding scheme involves a complete construction of a new configuration based on data retrieved from the old configuration rather than, in the case of mirroring-redundancy schemes, deleting one of multiple bricks or adding a brick, with copying of data from an original brick to the new brick. Mirroring is generally less efficient in space than erasure coding, but is more efficient in time and expenditure of processing cycles.

FAB Storage Units

As discussed above, a FAB system may provide for an enormous amount of data-storage space. The overall storage space may be logically partitioned into hierarchical data units, a data unit at each non-lowest hierarchical level logically composed of data units of a next-lowest hierarchical level. The logical data units may be mapped to physical storage space within one or more bricks.

FIG. 7 illustrates the hierarchical data units employed in a current FAB implementation that represent one embodiment of the present invention. The highest-level data unit is referred to as a "virtual disk," and the total available storage space within a FAB system can be considered to be partitioned into one or more virtual disks. In FIG. 7, the total storage space 702 is shown partitioned into five virtual disks, including a first virtual disk 704. A virtual disk can be configured to be of arbitrary size greater than or equal to the size of the next-lowest hierarchical data unit, referred to as a "segment." In FIG. 7, the third virtual disk 706 is shown to be logically partitioned into a number of segments 708. The segments may be consecutively ordered, and together compose a linear, logical storage space corresponding to a virtual disk. As shown in FIG. 7 each segment, such as segment 4 (710 in FIG. 7) may be distributed over a number of bricks 712 according to a particular redundancy scheme. The segment represents the granularity of data distribution across bricks. For example, in FIG. 7, segment 4 (710 in FIG. 7) may be distributed over bricks 1-9 and 13 according to an 8+2 erasure coding redundancy scheme. Thus, brick 3 may store one-eighth of the segment data, and brick 2 may store one-half of the parity data for the segment under the 8+2 erasure coding redundancy scheme, if parity data is stored separately from the segment data. Each brick, such as brick 7 (714 in FIG. 7) may choose to distribute a segment or segment portion over any of the internal disks of the brick 716 or in cache memory. When stored on an internal disk, or in cache memory, a segment or segment portion is logically considered to comprise a number of pages, such as page 718 shown in FIG. 7, each page, in turn, comprising a consecutive sequence of blocks, such as block 720 shown in FIG. 7. The block (e.g. 720 in FIG. 7) is the data unit level with which timestamps are associated, and which are managed according to a storage-register data-consistency regime discussed below. In one FAB system under development, segments comprise 256 consecutive megabytes, pages comprise eight megabytes, and blocks comprise 512 bytes.

FIGS. 8A-D illustrate a hypothetical mapping of logical data units to bricks and internal disks of a FAB system that represents one embodiment of the present invention. FIGS. 8A-D all employ the same illustration conventions, discussed next with reference to FIG. 8A. The FAB system is represented as 16 bricks 802-817. Each brick is shown as containing four internal disk drives, such as internal disk drives 820-823 within brick 802. In FIGS. 8A-D, the logical data unit being illustrated is shown on the left-hand side of the figure. The logical data unit illustrated in FIG. 8A is the entire available storage space 826. Shading within the square representations of internal disk drives indicates regions of the internal disk drives to which the logical data unit illustrated in the figure is mapped. For example, in FIG. 8A, the entire storage space 826 is shown to be mapped across the entire space available on all internal disk drives of all bricks. It should be noted that a certain, small amount of internal storage space may be reserved for control and management purposes by the control logic of each brick, but that internal space is not shown in FIG. 8A. Also, data may reside in cache in random-access memory, prior to being written to disk, but the storage space is, for the purposes of FIGS. 8A-D, considered to comprise only 4 internal disks for each brick, for simplicity of illustration.

FIG. 8B shows an exemplary mapping of a virtual-disk logical data unit 828 to the storage space of the FAB system 800. FIG. 8B illustrates that a virtual disk may be mapped to portions of many, or even all, internal disks within bricks of the FAB system 800. FIG. 8C illustrates an exemplary mapping of a virtual-disk-image logical data unit 830 to the internal storage space of the FAB system 800. A virtual-diskimage logical data unit may be mapped to a large portion of the internal storage space of a significant number of bricks within a FAB system. The virtual-disk-image logical data unit represents a copy, or image, of a virtual disk. Virtual disks may be replicated as two or more virtual disk images, each virtual disk image in discrete partition of bricks within a FAB system, in order to provide a high-level of redundancy. Virtual-disk replication allows, for example, virtual disks to be replicated over geographically distinct, discrete partitions of the bricks within a FAB system, so that a large scale catastrophe at one geographical location does not result in unrecoverable loss of virtual disk data.

FIG. 8D illustrates an exemplary mapping of a segment 832 to the internal storage space within bricks of a FAB system 800. As can be seen in FIG. 8D, a segment may be mapped to many small portions of the internal disks of a relatively small subset of the bricks within a FAB system. As discussed above, a segment is, in many embodiments of the present invention, the logical data unit level for distribution of data according to lower-level redundancy schemes, including erasure coding schemes and mirroring schemes. Thus, if no data redundancy is desired, a segment can be mapped to a single disk drive of a single brick. However, for most purposes, segments will be at least mirrored to two bricks. As discussed above, a brick distributes the pages of a segment or portion of a segment among its internal disks according to various considerations, including available space, and including optimal distributions to take advantage of various characteristics of internal disk drives, including head movement delays, rotational delays, access frequency, and other considerations.

Figure 9:
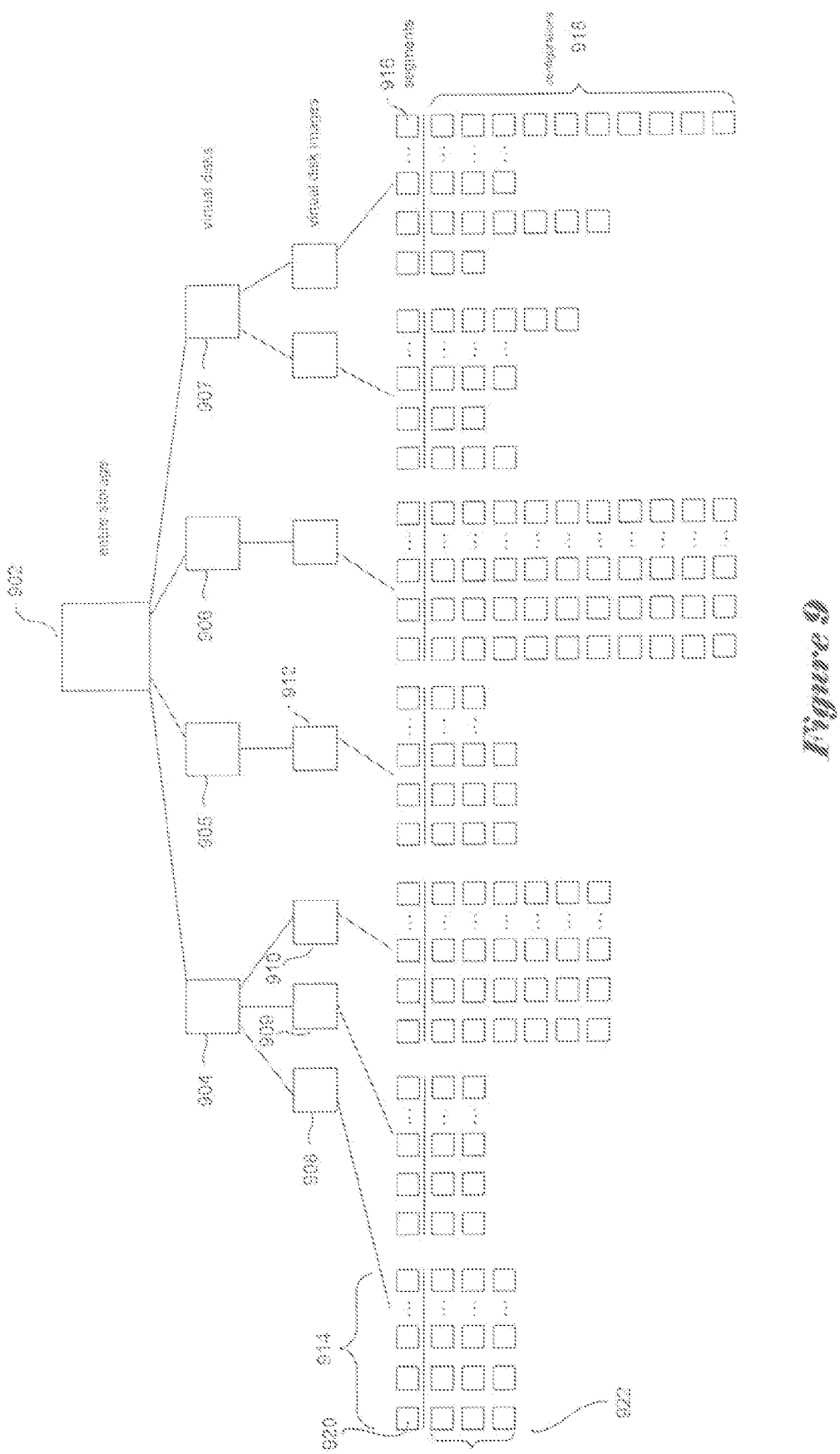
FIG. 9 illustrates, using a different illustration convention, the logical data units employed within a FAB system that represent one embodiment of the present invention.

FIG. 9 illustrates the logical data units employed within a FAB system that represent one embodiment of the present invention. The entire available data-storage space 902 may be partitioned into virtual disks 904-907. The virtual disks are, in turn, replicated, when desired, into multiple virtual disk images. For example, virtual disk 904 is replicated into virtual disk images 908-910. If the virtual disk is not replicated, the virtual disk may be considered to comprise a single virtual disk image. For example, virtual disk 905 corresponds to the single virtual disk image 912. Each virtual disk image comprises an ordered sequence of segments. For example, virtual disk image 908 comprises an ordered list of segments 914. Each segment is distributed across one or more bricks according to a redundancy scheme. For example, in FIG. 9, segment 916 is distributed across 10 bricks 918 according to an 8+2 erasure coding redundancy scheme. As another example, segment 920 is shown in FIG. 9 as distributed across three bricks 922 according to a triple-mirroring redundancy scheme.

FAB Data-State-Describing Data Structure

As discussed above, each brick within a FAB system may execute essentially the same control program, and each brick can receive and respond to requests from remote host computers. Therefore, each brick contains data structures that represent the overall data state of the FAB system, down to, but generally not including, brick-specific state information appropriately managed by individual bricks, in internal, volatile random access memory, non-volatile memory, and/or internal disk space, much as each cell of the human body contains the entire DNA-encoded architecture for the entire organism. The overall data state includes the sizes and locations of the hierarchical data units shown in FIG. 9, along with information concerning the operational states, or health, of bricks and the redundancy schemes under which segments are stored. In general, brick-specific data-state information, including the internal page and block addresses of data stored within a brick, is not considered to be part of the overall data state of the FAB system.

Figure 10A:
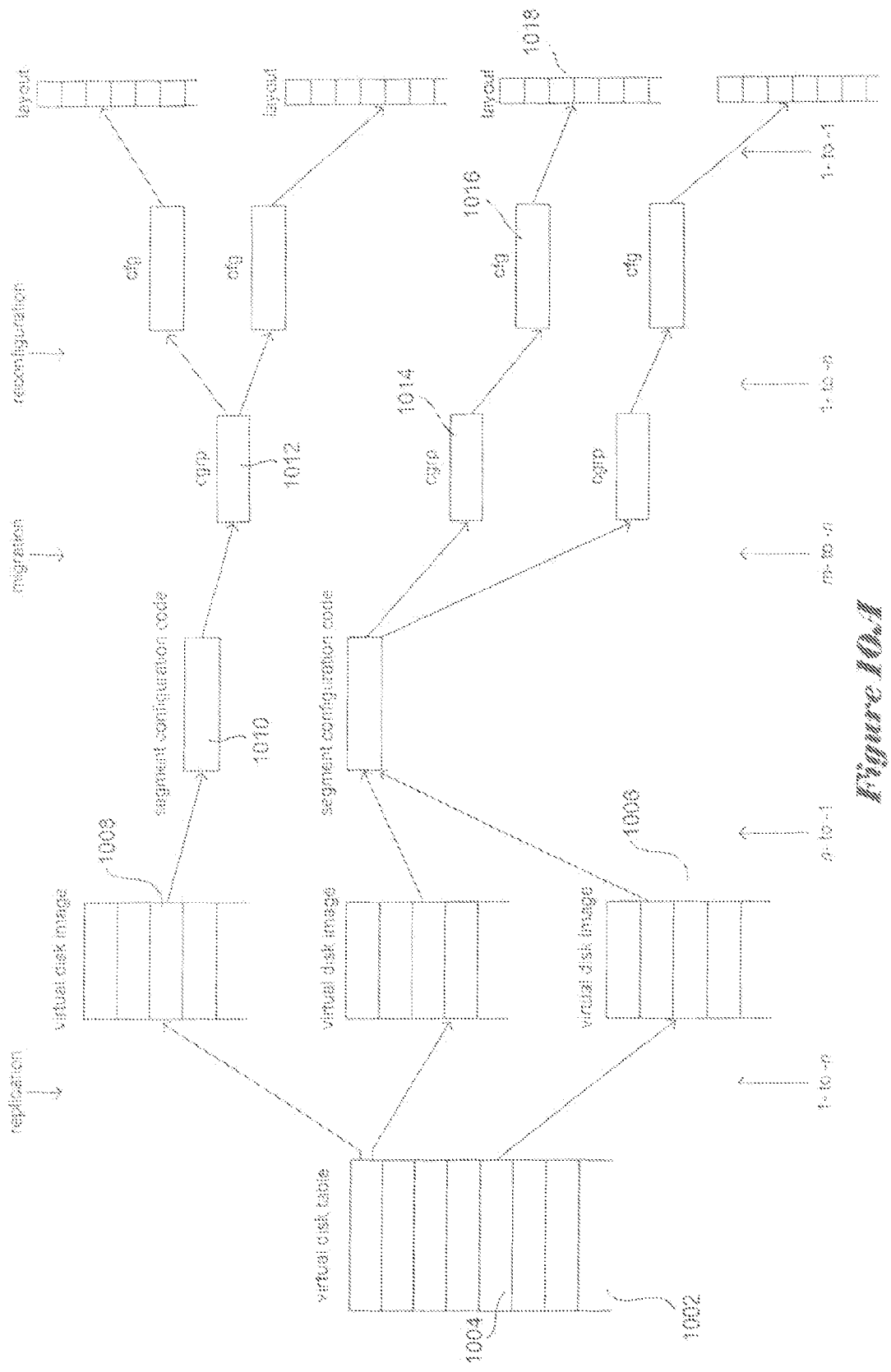
FIG. 10A illustrates the data structure maintained by each brick that describes the overall data state of the FAB system and that represents one embodiment of the present invention.

FIG. 10A illustrates the data structure maintained by each brick that describes the overall data state of the FAB system and that represents one embodiment of the present invention. The data structure is generally hierarchical, in order to mirror the hierarchical logical data units described in the previous subsection. At the highest level, the data structure may include a virtual disk table 1002, each entry of which describes a virtual disk. Each virtual disk table entry ("VDTE") may reference one or more virtual-disk-image ("VDI") tables. For example, VDTE 1004 references VDI table 1006 in FIG. 10A. A VDI table may include a reference to a segment configuration node ("SCN") for each segment of the virtual disk image. Multiple VDI-table entries may reference a single SCN, in order to conserve memory and storage space devoted to the data structure. In FIG. 10A, the VDI-table entry 1008 references SCN 1010. Each SCN may represent one or two configuration groups ("cgrp"). For example, in FIG. 10A, SCN 1010 references cgrp 1012. Each cgrp may reference one or more configurations ("cfg"). For example, in FIG. 10A, cgrp 1014 references cfg 1016. Finally, each cfg may be associated with a single layout data-structure element. For example, in FIG. 10A, cfg 1016 is associated with layout data-structure element 1018. The layout data-structure element may be contained within the cfg with which it is associated, or may be distinct from the cfg, and may contain indications of the bricks within the associated cfg. The VDI table may be quite large, and efficient storage schemes may be employed to efficiently store the VDI table, or portions of the VDI table, in memory and in a non-volatile storage medium. For example, a UNIX-like i-node structure, with a root node directly containing references to segments, and with additional nodes with indirect references or doubly indirect references through nodes containing i-node references to additional segment-reference-containing nodes. Other efficient storage schemes are possible.

For both the VDI table, and all other data-structure elements of the data structure maintained by each brick that describes the overall data state of the FAB system, a wide variety of physical representations and storage techniques may be used. As one example, variable length data-structure elements can be allocated as fixed-length data-structure elements of sufficient size to contain a maximum possible or maximum expected number of data entries, or may be represented as linked-lists, trees, or other such dynamic data-structure elements which can be, in real time, resized, as needed, to accommodate new data or for removal of no-longer-needed data. Nodes represented as being separate and distinct in the tree-like representations shown in FIGS. 10A and 11A-H may, in practical implementations, be stored together in tables, while data-structure elements shown as being stored in nodes or tables may alternatively be stored in linked lists, trees, or other more complex data-structure implementations.

As discussed above, VDIs may be used to represent replication of virtual disks. Therefore, the hierarchical fan-out from VDTEs to VDIs can be considered to represent replication of virtual disks. SCNs may be employed to allow for migration of a segment from one redundancy scheme to another. It may be desirable or necessary to transfer a segment distributed according to a 4+2 erasure coding redundancy scheme to an 8+2 erasure coding redundancy scheme. Migration of the segment involves creating a space for the new redundancy scheme distributed across a potentially new group of bricks, synchronizing the new configuration with the existing configuration, and, once the new configuration is synchronized with the existing configuration, removing the existing configuration. Thus, for a period of time during which migration occurs, an SCN may concurrently reference two different cgrps representing a transient state comprising an existing configuration under one redundancy scheme and a new configuration under a different redundancy scheme. Data-altering and data-state-altering operations carried out with respect to a segment under migration are carried out with respect to both configurations of the transient state, until full synchronization is achieved, and the old configuration can be removed. Synchronization involves establishing quorums, discussed below, for all blocks in the new configuration, copying of data from the old configuration to the new configuration, as needed, and carrying out all data updates needed to carry out operations directed to the segment during migration. In certain cases, the transient state is maintained until the new configuration is entirely built, since a failure during building of the new configuration would leave the configuration unrecoverably damaged. In other cases, including cases discussed below, only minimal synchronization is needed, since all existing quorums in the old configuration remain valid in the new configuration.

Figure 10B:
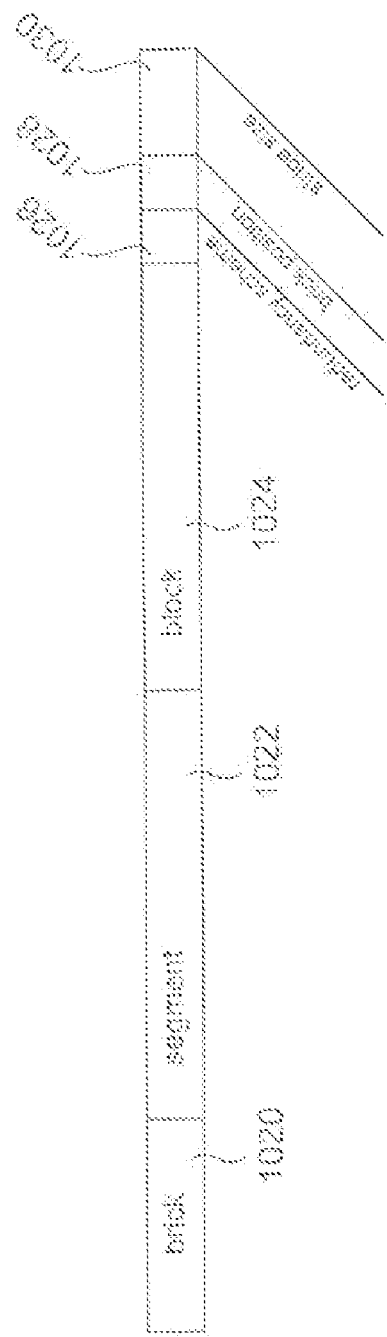
FIG. 10B illustrates a brick segment address that incorporates a brick role according to one embodiment of the present invention.

The set of bricks across which the segment is distributed according to the existing redundancy scheme may intersect with the set of bricks across which the segment is distributed according to the new redundancy scheme. Therefore, block addresses within the FAB system may include an additional field or object describing the particular redundancy scheme, or role of the block, in the case that the segment is currently under migration. The block addresses therefore distinguish between two blocks of the same segment stored under two different redundancy schemes in a single brick. FIG. 10B illustrates a brick segment address that incorporates a brick role according to one embodiment of the present invention. The block address shown in FIG. 10B includes the following fields: (1) a brick field 1020 that contains the identity of the brick containing the block referenced by the block address; (2) a segment field 1022 that contains the identity of the segment containing the block referenced by the block address; (3) a block field 1024 that contains the identity of the block within the segment identified in the segment field; (4) a field 1026 containing an indication of the redundancy scheme under which the segment is stored; (5) a field 1028 containing an indication of the brick position of the brick identified by the brick field within an erasure coding redundancy scheme, in the case that the segment is stored under an erasure coding redundancy scheme; and (6) a field 1030 containing an indication of the stripe size of the erasure coding redundancy scheme, in the case that the segment is stored under an erasure coding redundancy scheme. The block address may contain additional fields, as needed to fully describe the position of a block in a given FAB implementation. In general, fields 1026, 1028, and 1030 together compose a brick role that defines the role played by the brick storing the referenced block. Any of various numerical encodings of the redundancy scheme, brick position, and stripe size may be employed to minimize the number of bits devoted to the brick-role encoding. For example, in the case that the FAB implementation employs only a handful of different stripe sizes for various erasure coding redundancy schemes, stripe sizes may be represented by various values of an enumeration, or, in other words, by a relatively small bit field adequate to contain numerical representations of the handful of different stripe sizes.

A cgrp may reference multiple cfg data-structure elements when the cgrp is undergoing reconfiguration. Reconfiguration may involve change in the bricks across which a segment is distributed, but not a change from a mirroring redundancy scheme to an erasure-coding redundancy scheme, from one erasure-coding redundancy scheme, such as 4+3, to another erasure-coding redundancy scheme, such as 8+2, or other such changes that involve reconstructing or changing the contents of multiple bricks. For example, reconfiguration may involve reconfiguring a triple mirror stored on bricks 1, 2, and 3 to a double mirror stored on bricks 2 and 3.

A cfg data-structure element generally describes a set of one or more bricks that together store a particular segment under a particular redundancy scheme. A cfg data-structure element generally contains information about the health, or operational state, of the bricks within the configuration represented by the cfg data-structure element.

A layout data-structure element, such as layout 1018 in FIG. 10A, includes identifiers of all bricks to which a particular segment is distributed under a particular redundancy scheme. A layout data-structure element may include one or more fields that describe the particular redundancy scheme under which the represented segment is stored, and may include additional fields. All other elements of the data structure shown in FIG. 10A may include additional fields and descriptive sub-elements, as necessary, to facilitate data storage and maintenance according to the data-distribution scheme represented by the data structure. At the bottom of FIG. 10A, indications are provided for the mapping relationship between data-structure elements at successive levels. It should be noted that multiple, different segment entries within one or more VDI tables may reference a single SCN node, representing distribution of the different segments across an identical set of bricks according to the same redundancy scheme.

The data structure maintained by each brick that describes the overall data state of the FAB system, and that represents one embodiment of the present invention, is a dynamic representation that constantly changes, and that induces various control routines to make additional state changes, as blocks are stored, accessed, and removed, bricks are added and removed, bricks and interconnections fail, redundancy schemes and other parameters and characteristics of the FAB system are changed through management interfaces, and other events occur. In order to avoid large overheads for locking schemes to control and serialize operations directed to portions of the data structure, all data-structure elements from the cgrp level down to the layout level may be considered to be immutable. When their contents or interconnections need to be changed, new data-structure elements with the new contents and/or interconnections are added, and references to the previous versions eventually deleted, rather than the data-structure elements at the cgrp level down to the layout level being locked, altered, and unlocked. Data-structure elements replaced in this fashion eventually become orphaned, after the data represented by the old and new data-structure elements has been synchronized by establishing new quorums and carrying out any needed updates, and the orphaned data-structure elements are then garbage collected. This approach can be summarized by referring to the data-structure elements from the cgrp level down to the layout level as being "immutable."

Another aspect of the data structure maintained by each brick that describes the overall data state of the FAB system, and that represents one embodiment of the present invention, is that each brick may maintain both an in-memory, or partially in-memory version of the data structure, for rapid access to the most frequently and most recently accessed levels and data-structure elements, as well as a persistent version stored on a non-volatile data-storage medium. The data-elements of the in-memory version of the data-structure may include additional fields not included in the persistent version of the data structure, and generally not shown in FIGS. 10A, 11A-H, and subsequent figures. For example, the in-memory version may contain reverse mapping elements, such as pointers, that allow for efficient traversal of the data structure in bottom-up, lateral, and more complex directions, in addition to the top-down traversal indicated by the downward directions of the pointers shown in the figures. Certain of the data-structure elements of the in-memory version of the data structure may also include reference count fields to facilitate garbage collection and coordination of control-routine-executed operations that alter the state of the brick containing the data structure.

Figure 11A:
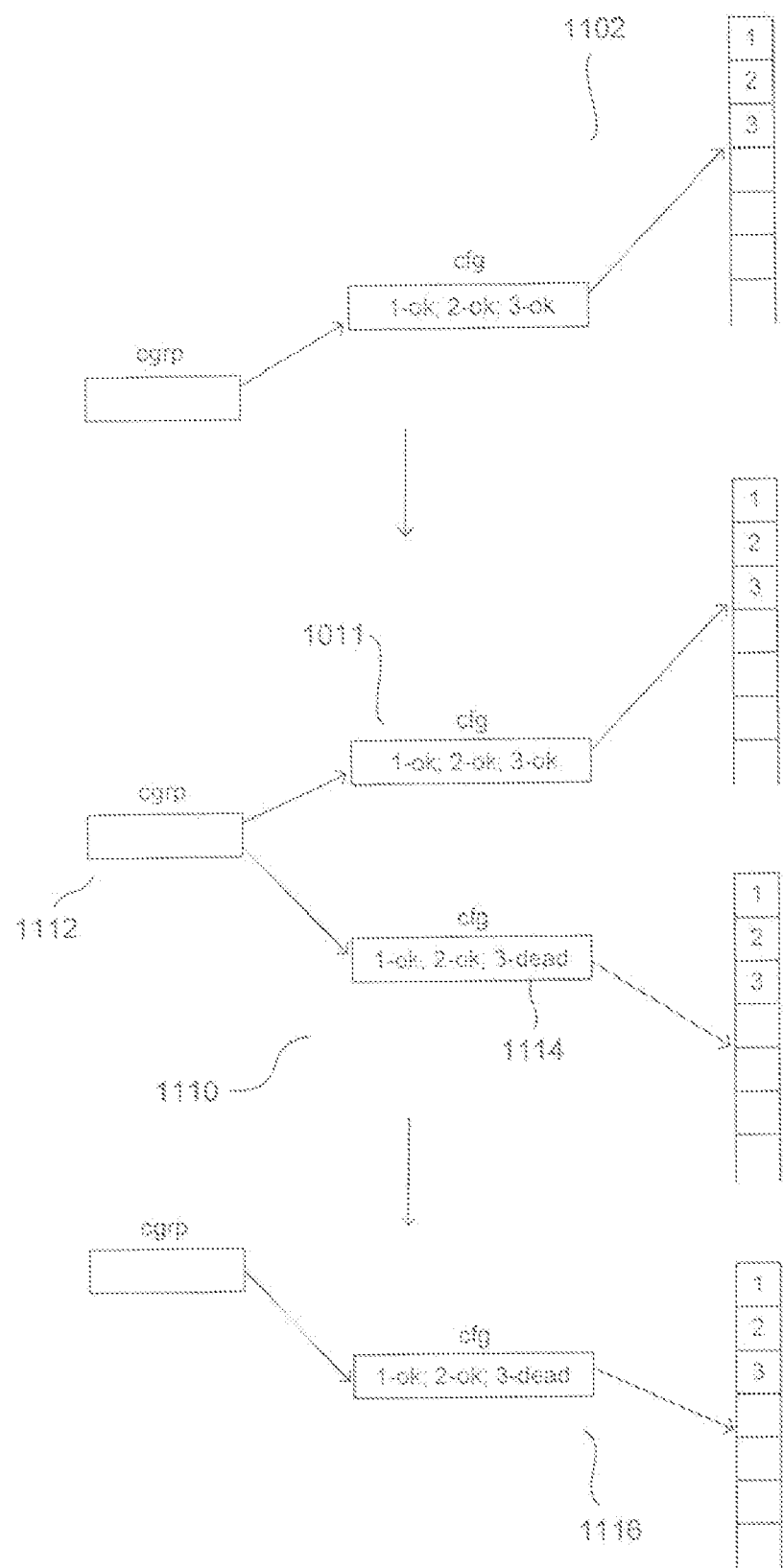

FIGS. 11A-H illustrate various different types of configuration changes reflected in the data-description data structure shown in FIG. 10A within a FAB system that represents one embodiment of the present invention. FIGS. 11A-D illustrate a simple configuration change involving a change in the health status of a brick. In this case, a segment distributed over bricks 1, 2, and 3 according to a triple mirroring redundancy scheme (1102 in FIG. 11A) is either reconfigured to being distributed over: (1) bricks 1, 2, and 3 according to a triple mirroring scheme (1104 in FIG. 11B), due to repair of brick 3; (2) bricks 1, 2, and 4 according to a triple mirroring scheme (1106 in FIG. 11C), due to failure of brick 3 and replacement of brick 3 by spare storage space within brick 4; or (3) bricks 1 and 2 according to a double mirroring scheme (1108 in FIG. 11D), due to failure of brick 3. When the failure of brick 3 is first detected, a new cgrp 1112 that includes a new cfg 1110 with the brick-health indication for brick 3 1114 indicating that brick 3 is dead, as well as a copy of the initial cfg 1011, is added to the data structure, replacing the initial cgrp, cfg, and layout representation of the distributed segment (1102 in FIG. 11). The "dead brick" indication stored for the health status of brick 3 is an important feature of the overall data structure shown in FIG. 10A. The "dead brick" status allows a record of a previous participation of a subsequently failed brick to be preserved in the data structure, to allow for subsequent synchronization and other operations that may need to be aware of the failed brick's former participation. Once any synchronization between the initial configuration and new configuration is completed, including establishing new quorums for blocks without current quorums due to the failure of brick 3, and a new representation of the distributed segment 1116 is added to the data structure, the transient, 2-cfg representation of the distributed segment comprising data-structure elements 1110-1112 can be deleted and garbage collected, leaving the final description of the distributed segment 1116 with a single cfg data structure indicating that brick 3 has failed. In FIGS. 11A-D, and in subsequent figures, only the relevant portion of the data structure is shown, assuming an understanding that, for example, the cgrps shown in FIG. 11A are referenced by one or more SCN nodes.

Figure 11B:
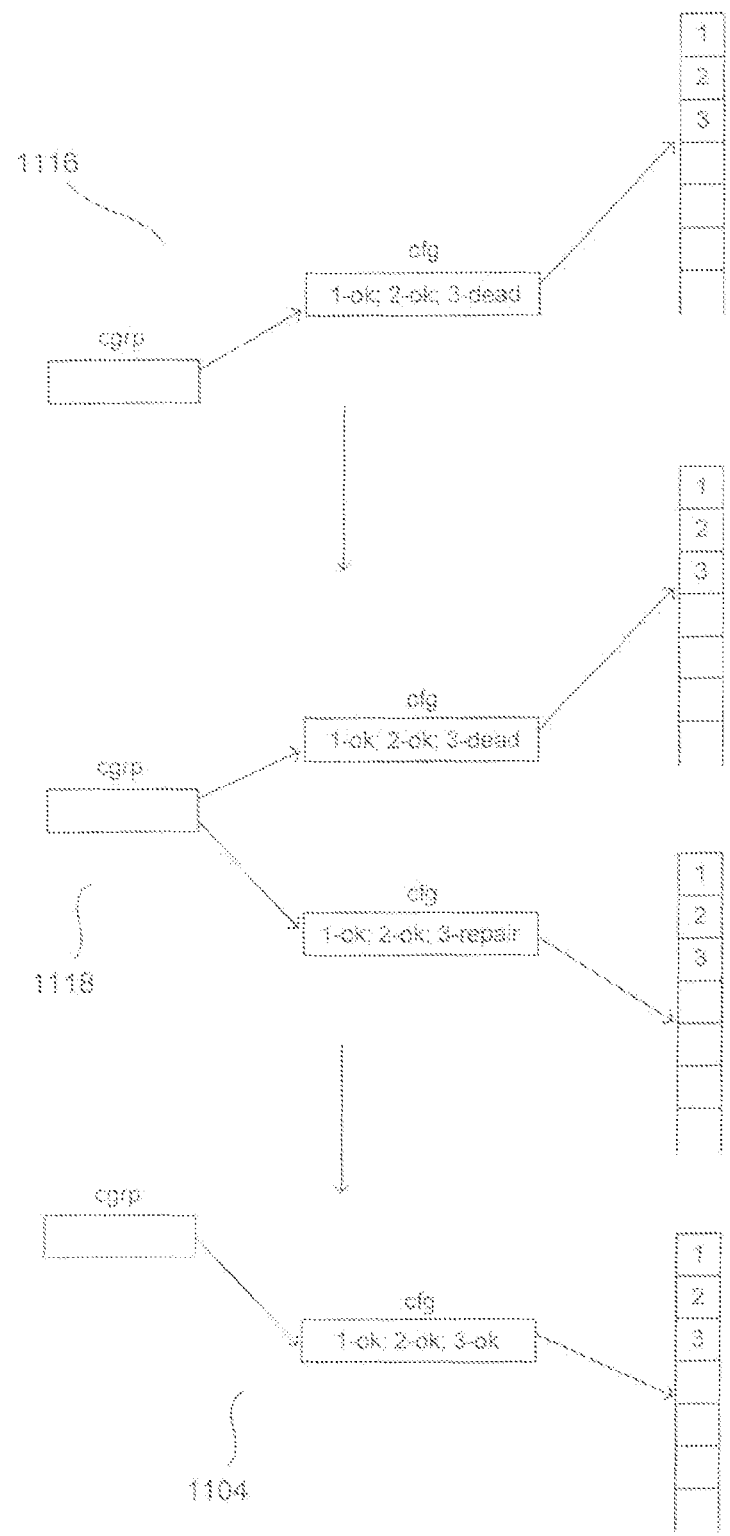
Figure 11C:
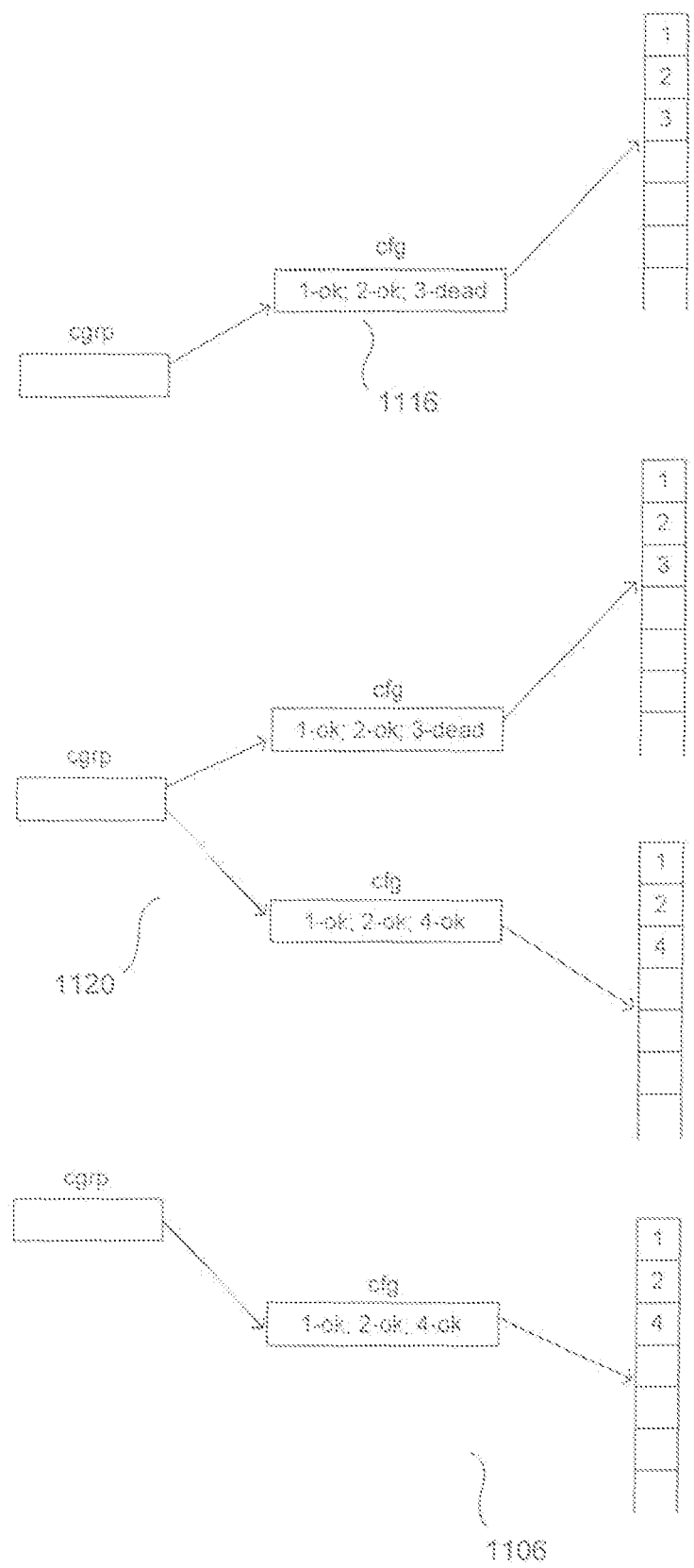
Figure 11D:
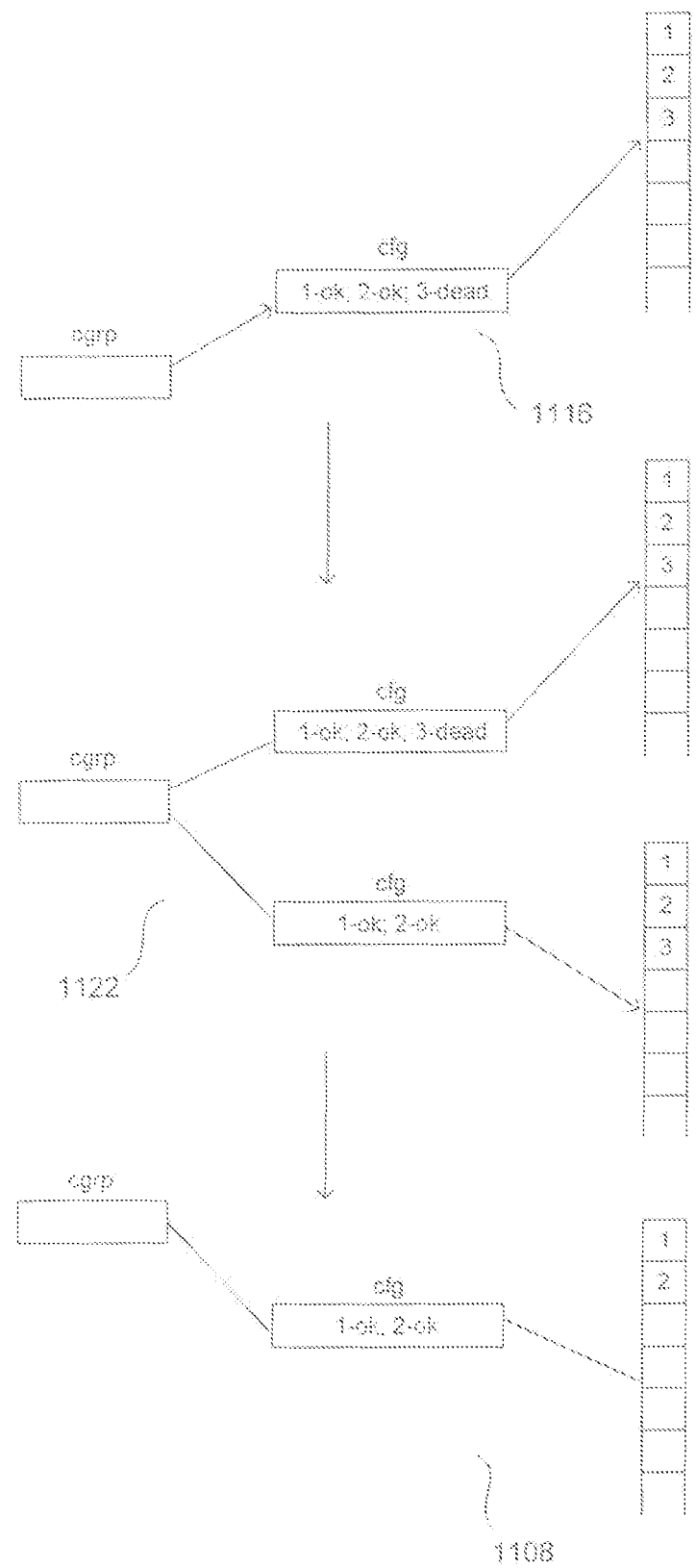

FIGS. 11B-D describe three different outcomes for the failure of brick 3, each starting with the representation of the distributed segment 1116 shown at the bottom of FIG. 11A. All three outcomes involve a transient, 2-cfg state, shown as the middle state of the data structure, composed of yet another new cgrp referencing two new cfg data-structure elements, one containing a copy of the cfg from the representation of the distributed segment 1116 shown at the bottom of FIG. 11A, and the other containing new brick-health information. In FIG. 11B, brick 3 is repaired, with the transient 2-cfg state 1118 includes both descriptions of the failed state of brick 3 and a repaired state of brick 3. In FIG. 11C, brick 3 is replaced by spare storage space on brick 4, with the transient 2-cfg state 1120 including both descriptions of the failed state of brick 3 and a new configuration with brick 3 replaced by brick 4. In FIG. 11D, brick 3 is completely failed, and the segment reconfigured to distribution over 2 bricks rather than 3, with the transient 2-cfg state 1122 including both descriptions of the failed state of brick 3 and a double-mirroring configuration in which the data is distributed over bricks 1 and 2.

Figure 11E:
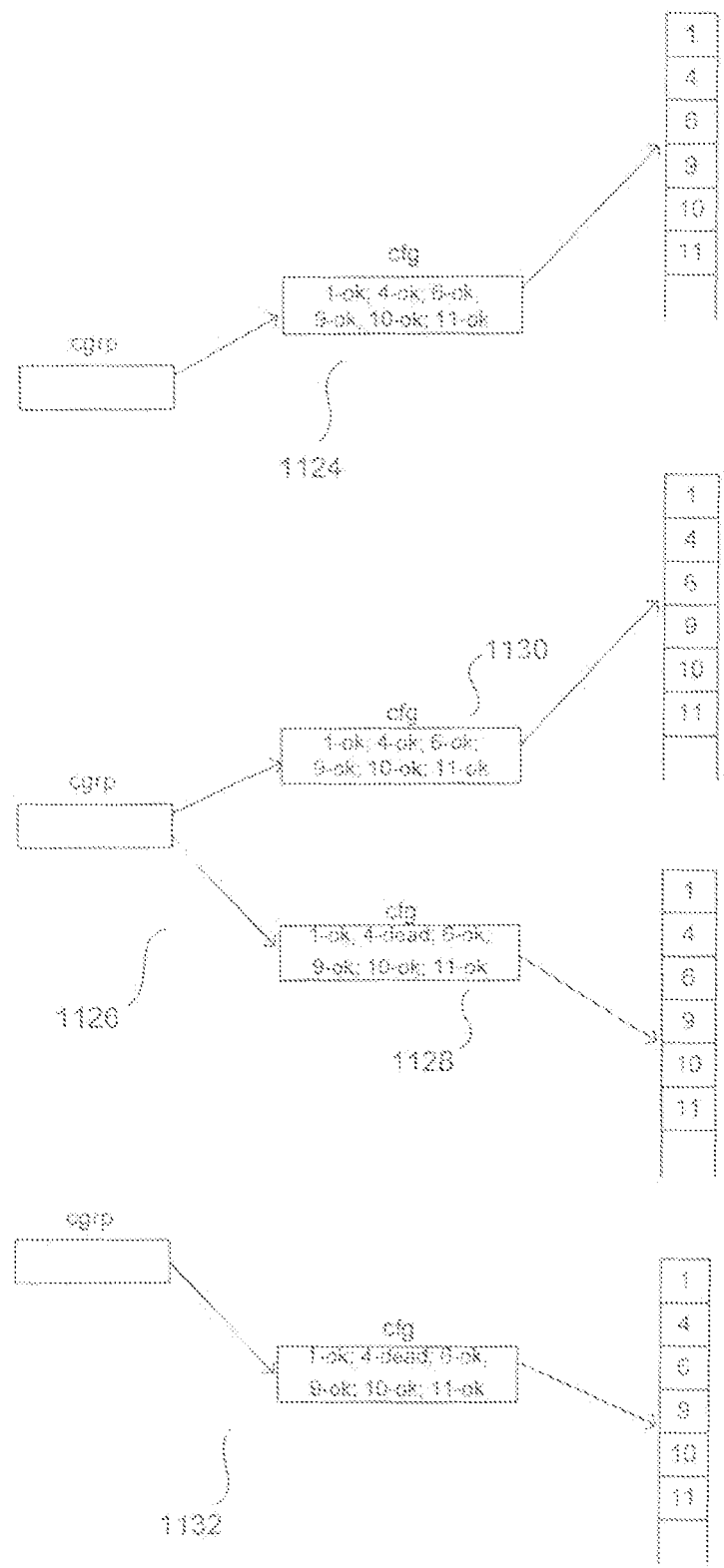
Figure 11F:
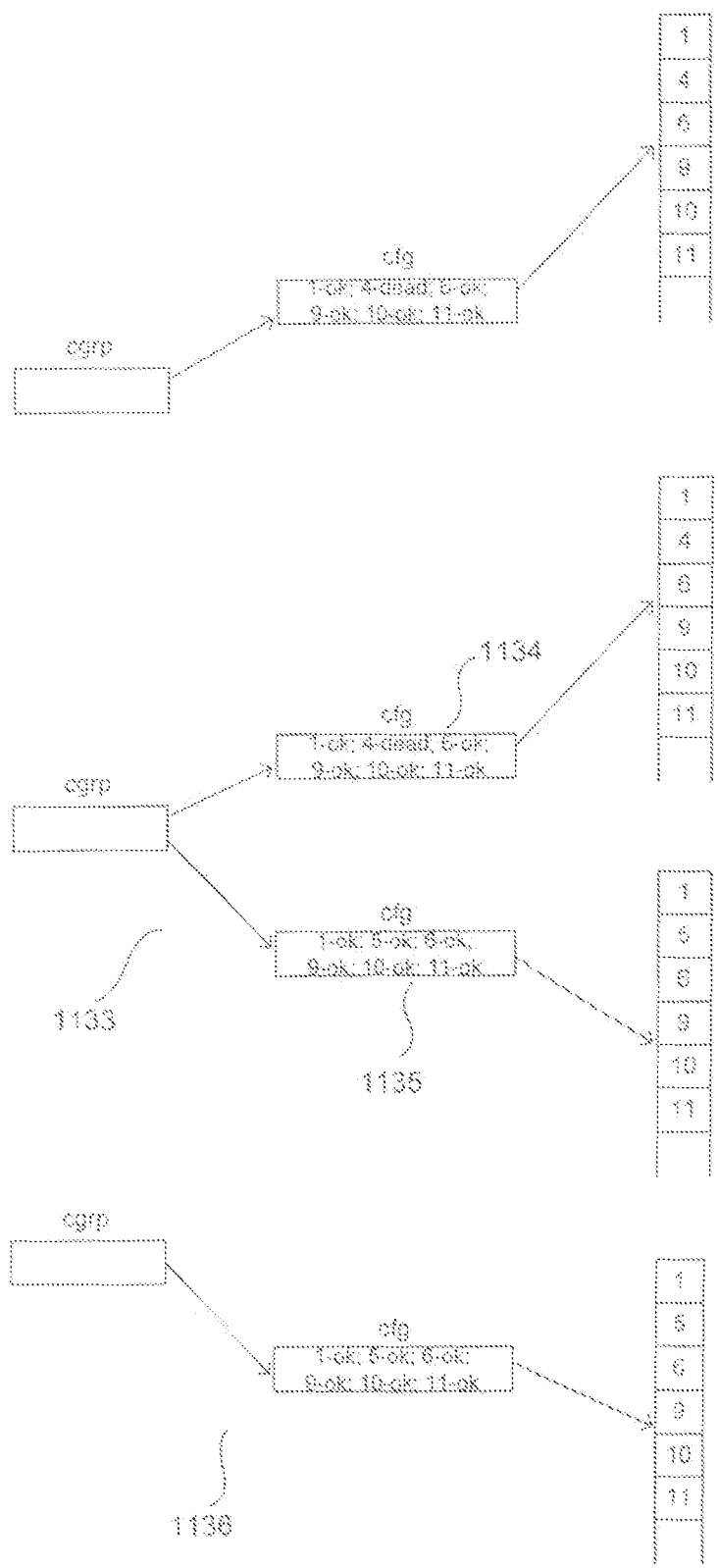

FIGS. 11E-F illustrate loss of a brick across which a segment is distributed according to a 4+2 erasure coding redundancy scheme, and substitution of a new brick for the lost brick. Initially, the segment is distributed over bricks 1, 4, 6, 9, 10, and 11 (1124 in FIG. 11E). When a failure at brick 4 is detected, a transient 2-cfg state 1126 obtains, including a new cgrp that references two new cfg data-structure elements, the new cfg 1128 indicating that brick 4 has failed. The initial representation of the distributed segment 1124 can then be garbage collected. Once synchronization of the new configuration, with a failed brick 4, is carried out with respect to the old configuration, and a description of the distributed segment 1132 with a new cgrp referencing a single cfg data-structure element indicating that brick 4 has failed has been added, the transient 2-cfg representation 1126 can be garbage collected. Next, a new configuration, with spare storage space on brick 5 replacing the storage space previously provided by brick 4, is added to create a transient 2-cfg state 1133, with the previous representation 1132 then garbage collected. Once synchronization of the new configuration, with brick 5 replacing brick 4, is completed, and a final, new representation 1136 of the distributed segment is added, the transient 2-cfg representation 1134 can be garbage collected.

The two alternative configurations in 2-cfg transient states, such as cfgs 1134 and 1135 in FIG. 11F, are concurrently maintained in the transient 2-cfg representations shown in FIGS. 11A-F during the time that the new configuration, such as cfg 1135 in FIG. 11F, is synchronized with the old configuration, such as cfg 1134 in FIG. 11F. For example, while the contents of brick 5 are being reconstructed according to the matrix inversion method discussed in a previous subsection, new WRITE operations issued to the segment are issued to both configurations, to be sure that the WRITE operations successfully complete on a quorum of bricks in each configuration. Quorums and other consistency mechanisms are discussed below. Finally, when the new configuration 1135 is fully reconstructed, and the data state of the new configuration is fully synchronized to the data state of the old configuration 1114, the old configuration can be removed by replacing the entire representation 1133 with a new representation 1136 that includes only the final configuration, with the transient 2-cfg representation then garbage collected. By not changing existing data-structure elements at the cgrp and lower levels, but by instead adding new data-structure elements through the 2-cfg transient states, the appropriate synchronization can be completed, and no locking or other serialization techniques need be employed to control access to the data structure. WRITE operations are illustrative of operations on data that alter the data state within one or more bricks, and therefore, in this discussion, are used to represent the class of operations or tasks during the execution of which data consistency issues arise due to changes in the data state of the FAB system. However, other operations and tasks may also change the data state, and the above-described techniques allow for proper transition between configurations when such other operations and tasks are carried out in a FAB implementation. In still other cases, the 2-cfg transient representations may not be needed, or may not be needed to be maintained for significant periods, when all quorums for blocks under an initial configuration remain essentially unchanged and valid in the new configuration. For example, when a doubly mirrored segment is reconfigured to a non-redundant configuration, due to failure of one of two bricks, all quorums remain valid, since a majority of bricks in the doubly mirrored configuration needed to agree on the value of each block, meaning that all bricks therefore agreed in the previous configuration, and no ambiguities or broken quorums result from loss of one of the two bricks.

Figure 11G:
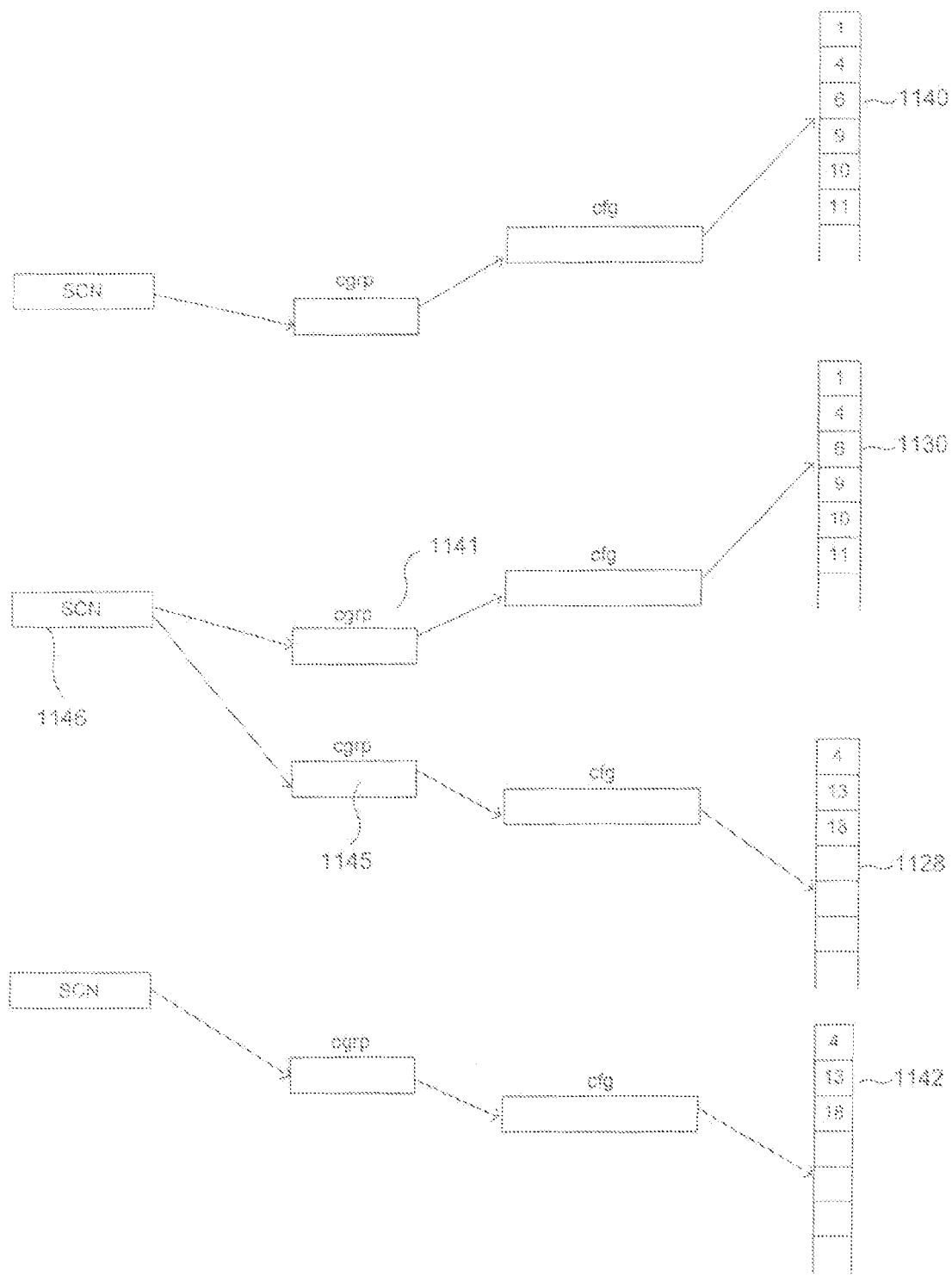

FIG. 11G illustrates a still more complex configuration change, involving a change in the redundancy scheme by which a segment is distributed over bricks of a FAB system. In the case shown in FIG. 11G, a segment initially distributed according to a 4+2 erasure coding redundancy over bricks 1, 4, 6, 9, 10, and 11 (1140 in FIG. 11G) migrates to a triple mirroring redundancy scheme over bricks 4, 13, and 18 (1142 in FIG. 11G). Changing the redundancy scheme involves maintaining two different cgrp data-structure elements 1144-1145 referenced from an SCN node 1146 while the new configuration 1128 is being synchronized with the previous configuration 1140. Control logic at the SCN level coordinates direction of WRITE operations to the two different configurations while the new configuration is synchronized with the old configuration, since the techniques for ensuring consistent execution of WRITE operations differ in the two different redundancy schemes. Because SCN nodes may be locked, or access to SCN nodes may be otherwise operationally controlled, the state of an SCN node may be altered during a migration. However, because SCN nodes may be referenced by multiple VDI-table entries, a new SCN node 1146 is generally allocated for the migration operation.

Finally, FIG. 11H illustrates an exemplary replication of a virtual disk within a FAB system. The virtual disk is represented by a VDTE entry 1148 that references a single VDI table 1150. Replication of the virtual disk involves creating a new VDI table 1152 that is concurrently referenced from the VDTE 1132 along with the original VDI table 1150. Control logic at the virtual-disk level within the hierarchy of control logic coordinates synchronization of the new VDI with the previous VDI, continuing to field WRITE operations directed to the virtual disk during the synchronization process.

The hierarchical levels within the data description data structure shown in FIG. 10A reflect control logic levels within the control logic executed by each brick in the FAB system. The control-logic levels manipulate the data-structure elements at corresponding levels in the data-state-description data structure, and data-structure elements below that level. A request received from a host computer is initially received at a top processing level and directed, as one or more operations for execution, by the top processing level to an appropriate virtual disk. Control logic at the virtual-disk level then directs the operation to one or more VDIs representing one or more replicates of the virtual disk. Control logic at the VDI level determines the segments in the one or more VDIs to which the operation is directed, and directs the operation to the appropriate segments. Control logic at the SCN level directs the operation to appropriate configuration groups, and control logic at the configuration-group level directs the operations to appropriate configurations. Control logic at the configuration level directs the requests to bricks of the configuration, and internal-brick-level control logic within bricks maps the requests to particular pages and blocks within the internal disk drives and coordinates local, physical access operations.

Storage Register Model

The FAB system may employ a storage-register model for quorum-based, distributed READ and WRITE operations. A storage-register is a distributed unit of data. In current FAB systems, blocks are treated as storage registers.

Figure 12:
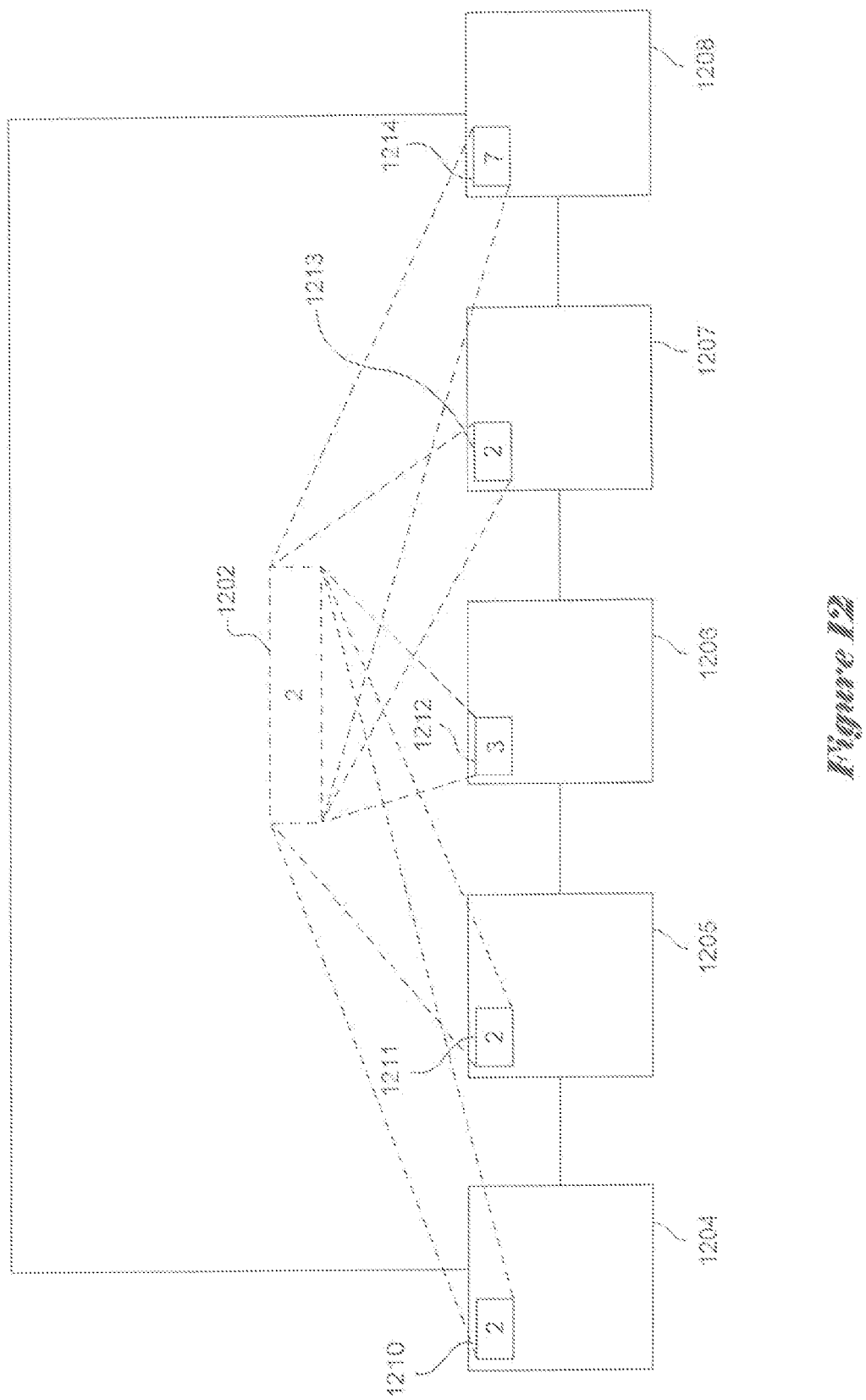
FIGS. 12-18 illustrate the basic operation of a distributed storage register.

FIGS. 12-18 illustrate the basic operation of a distributed storage register. As shown in FIG. 12, the distributed storage register 1202 is preferably an abstract, or virtual, register, rather than a physical register implemented in the hardware of one particular electronic device. Each process running on a processor or computer system 1204-1208 employs a small number of values stored in dynamic memory, and optionally backed up in non-volatile memory, along with a small number of distributed-storage-register-related routines, to collectively implement the distributed storage register 1202. At the very least, one set of stored values and routines is associated with each processing entity that accesses the distributed storage register. In some implementations, each process running on a physical processor or multi-processor system may manage its own stored values and routines and, in other implementations, processes running on a particular processor or multi-processor system may share the stored values and routines, providing that the sharing is locally coordinated to prevent concurrent access problems by multiple processes running on the processor.

In FIG. 12, each computer system maintains a local value 1210-1214 for the distributed storage register. In general, the local values stored by the different computer systems are normally identical, and equal to the value of the distributed storage register 1202. However, occasionally the local values may not all be identical, as in the example shown in FIG. 12, in which case, if a majority of the computer systems currently maintain a single locally stored value, then the value of the distributed storage register is the majority-held value.

Figure 13:
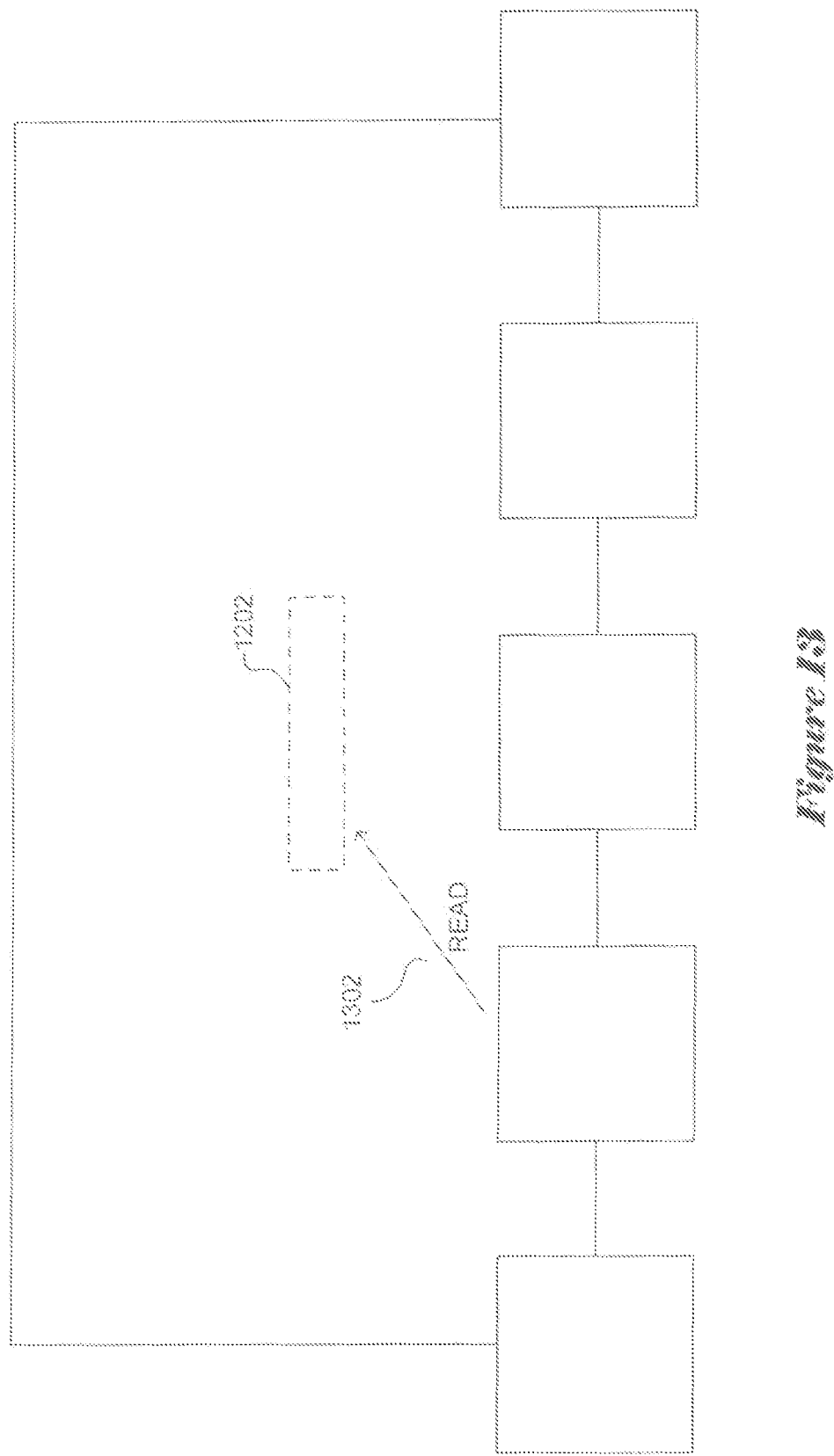
Figure 14:
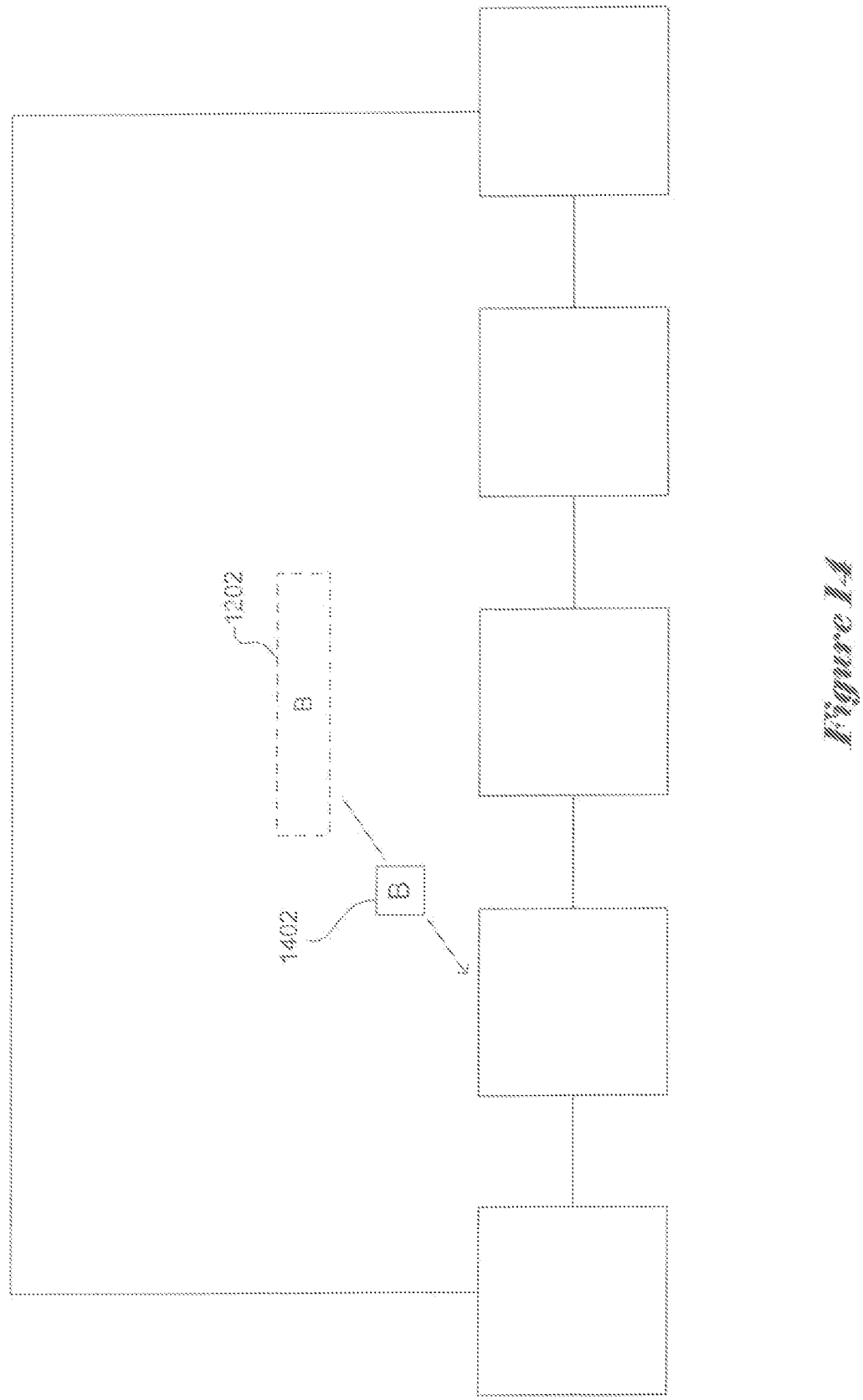
Figure 15:
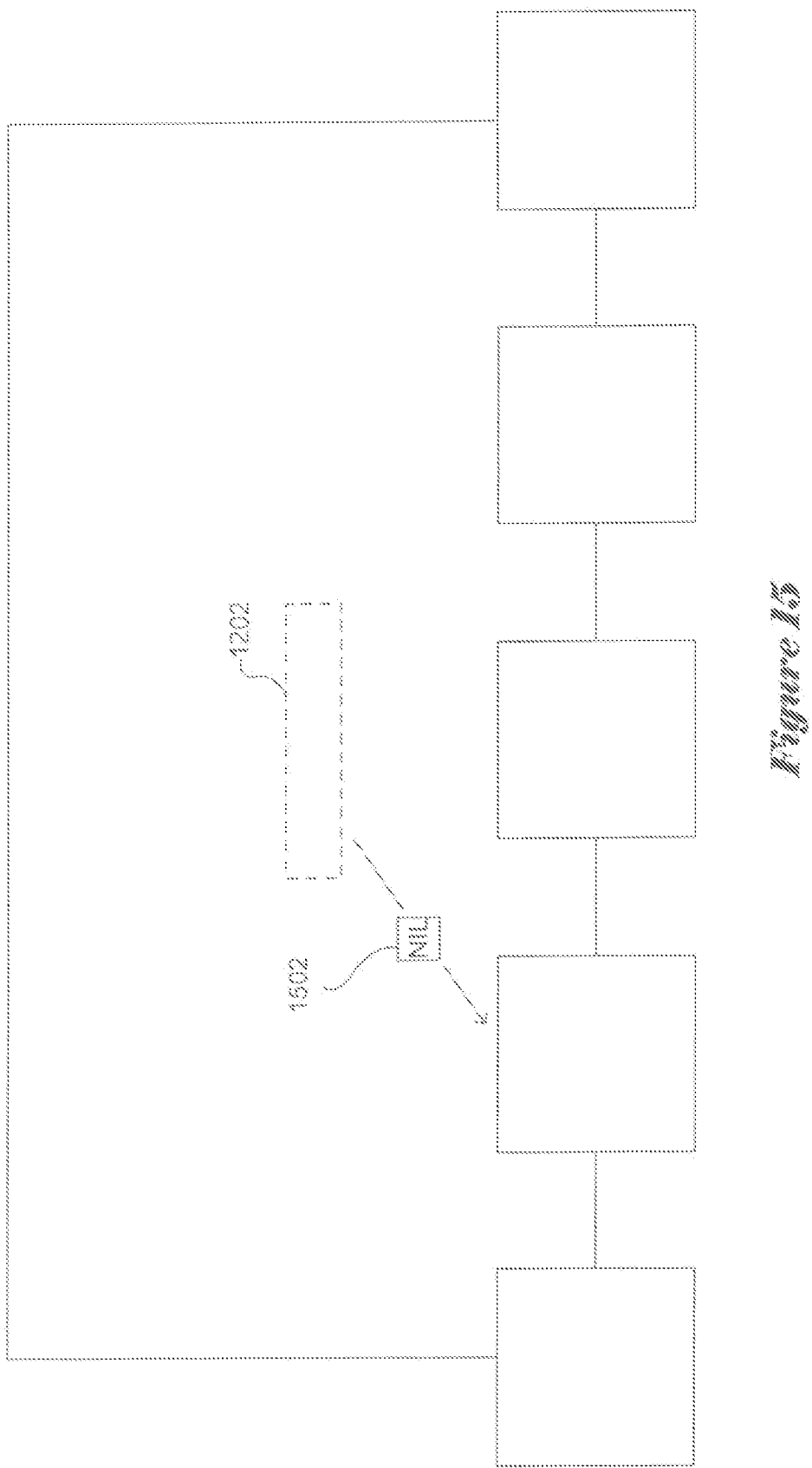

A distributed storage register provides two fundamental high-level functions to a number of intercommunicating processes that collectively implement the distributed storage register. As shown in FIG. 13, a process can direct a READ request 1302 to the distributed storage register 1202. If the distributed storage register currently holds a valid value, as shown in FIG. 14 by the value "B" within the distributed storage register 1202, the current, valid value is returned 1402 to the requesting process. However, as shown in FIG. 15, if the distributed storage register 1202 does not currently contain a valid value, then the value NIL 1502 is returned to the requesting process. The value NIL is a value that cannot be a valid value stored within the distributed storage register.

Figure 16:
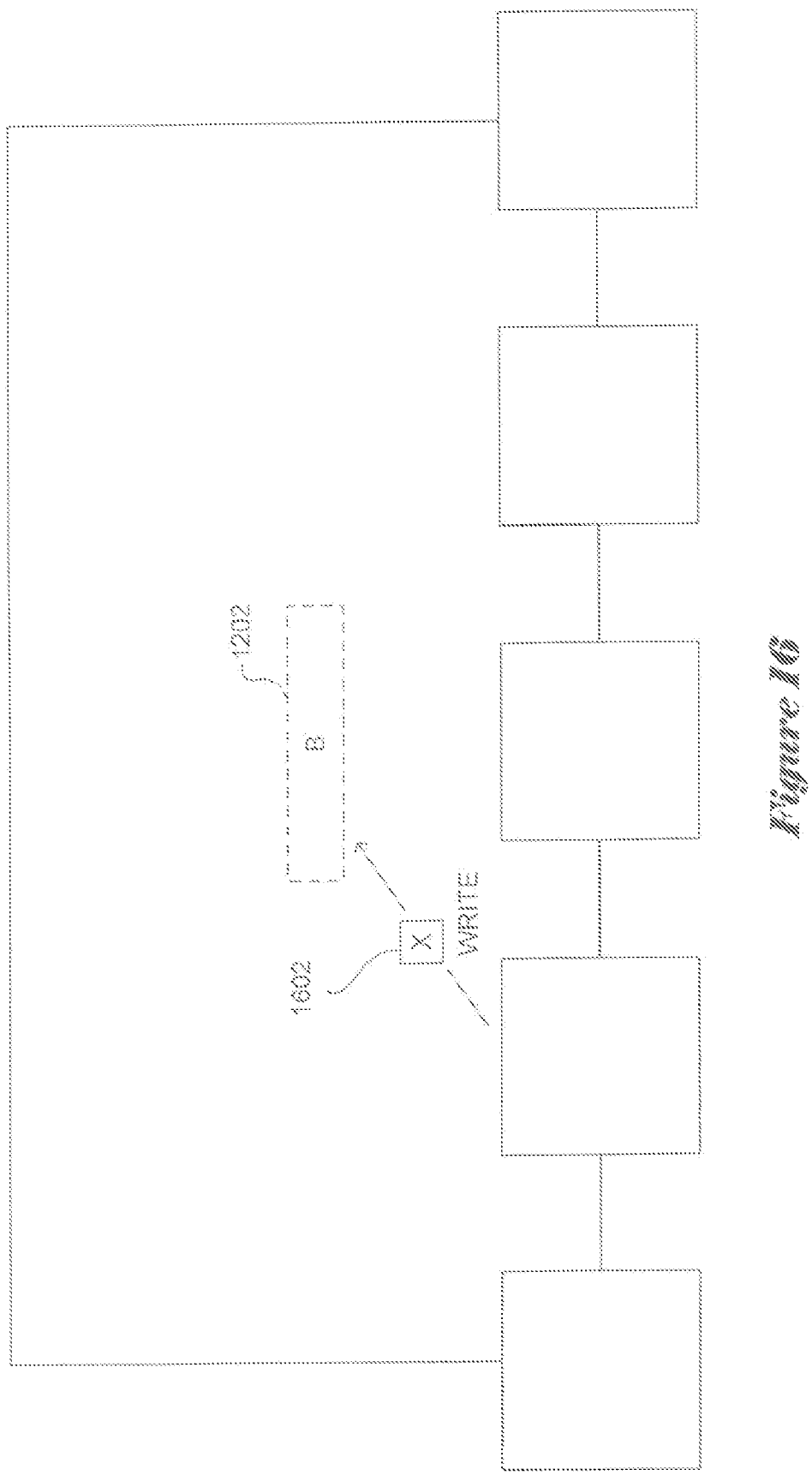
Figure 17:
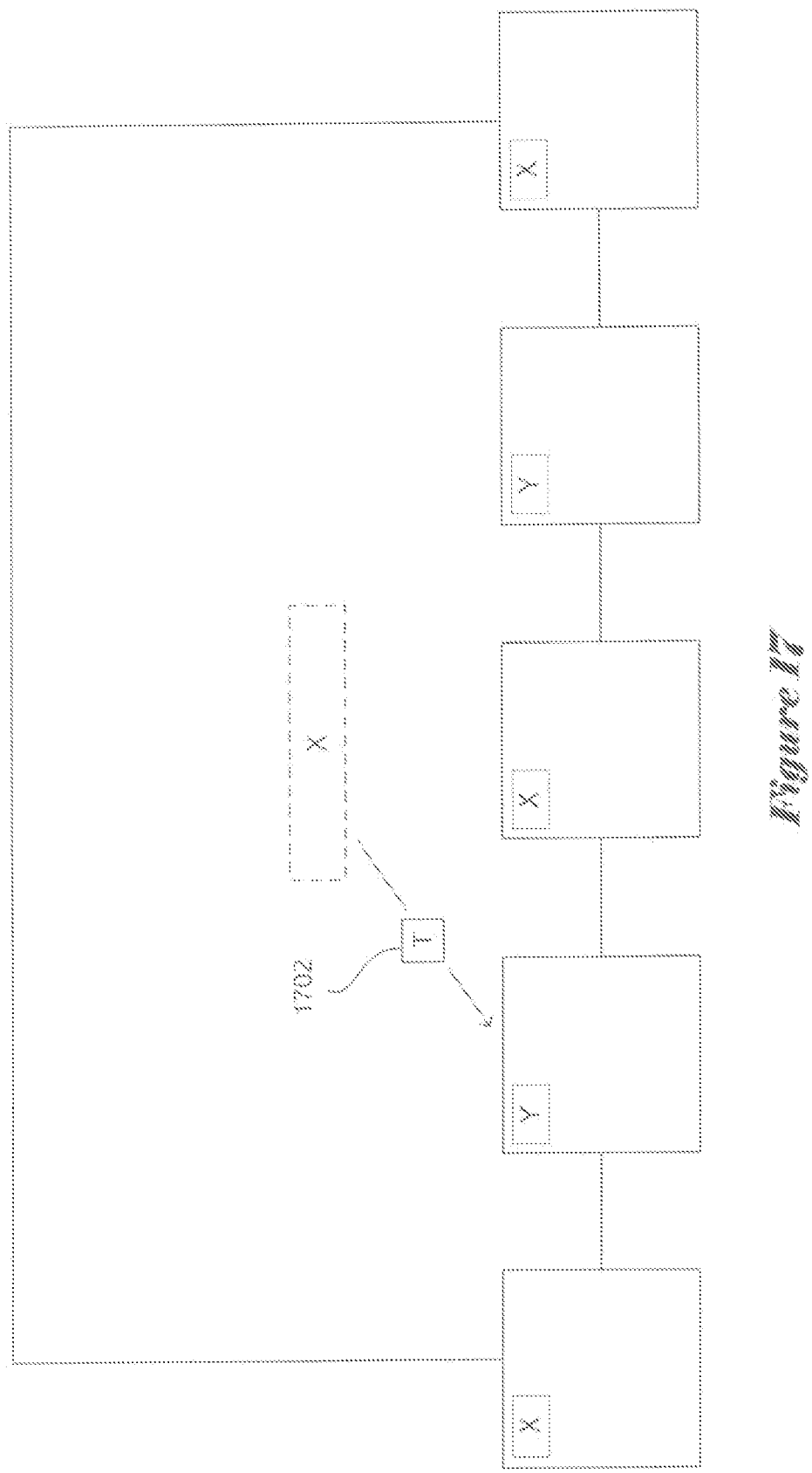
Figure 18:
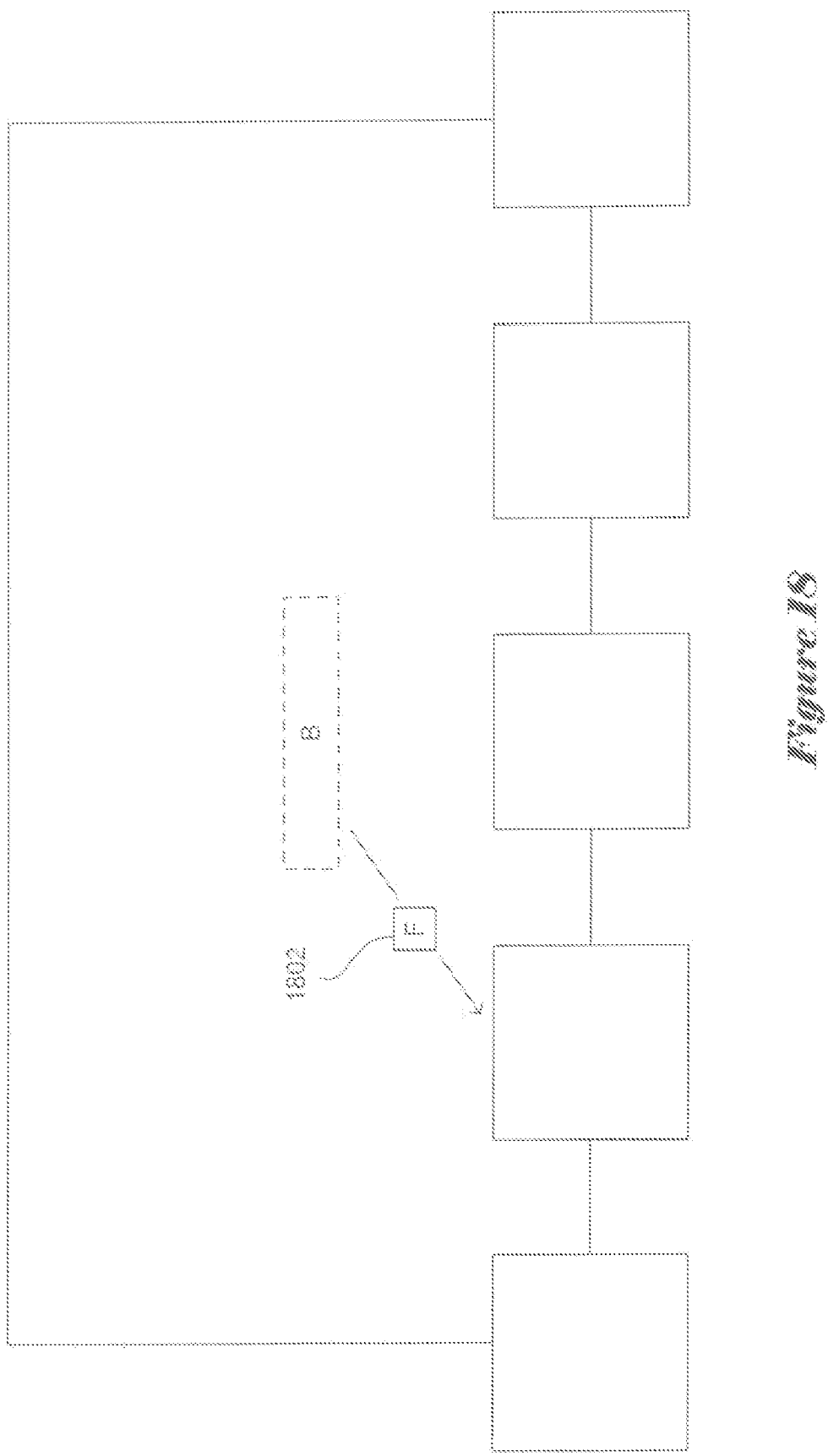

A process may also write a value to the distributed storage register. In FIG. 16, a process directs a WRITE message 1602 to the distributed storage register 1202, the WRITE message 1602 including a new value "X" to be written to the distributed storage register 1202. If the value transmitted to the distributed storage register successfully overwrites whatever value is currently stored in the distributed storage register, as shown in FIG. 17, then a Boolean value "TRUE" is returned 1702 to the process that directed the WRITE request to the distributed storage register. Otherwise, as shown in FIG. 18, the WRITE request fails, and a Boolean value "FALSE" is returned 1802 to the process that directed the WRITE request to the distributed storage register, the value stored in the distributed storage register unchanged by the WRITE request. In certain implementations, the distributed storage register returns binary values "OK" and "NOK," with OK indicating successful execution of the WRITE request and NOK indicating that the contents of the distributed storage register are indefinite, or, in other words, that the WRITE may or may not have succeeded.

Figure 19:
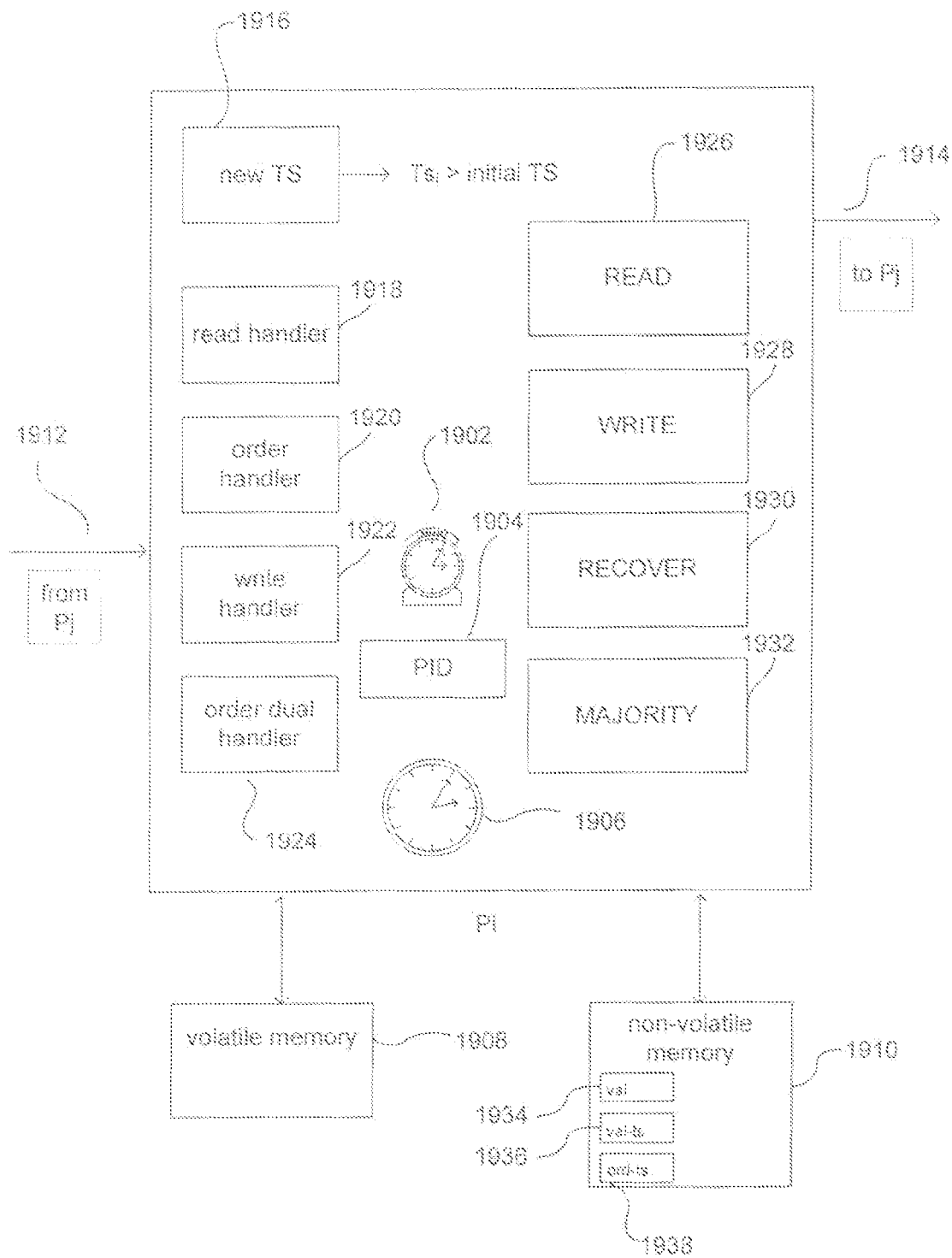
FIG. 19 shows the components used by a process or processing entity $P_i$ that implements, along with a number of other processes and/or processing entities, $P_{j \ne i}$, a distributed storage register.

FIG. 19 shows the components used by a process or processing entity $P_i$ that implements, along with a number of other processes and/or processing entities, $P_{j \neq i}$, a distributed storage register. A processor or processing entity uses three low level primitives: a timer mechanism 1902, a unique ID 1904, and a clock 1906. The processor or processing entity $P_i$ uses a local timer mechanism 1902 that allows $P_i$ to set a timer for a specified period of time, and to then wait for that timer to expire, with $P_i$ notified on expiration of the timer in order to continue some operation. A process can set a timer and continue execution, checking or polling the timer for expiration, or a process can set a timer, suspend execution, and be re-awakened when the timer expires. In either case, the timer allows the process to logically suspend an operation, and subsequently resume the operation after a specified period of time, or to perform some operation for a specified period of time, until the timer expires. The process or processing entity $P_i$ also has a reliably stored and reliably retrievable local process ID ("PID") 1904. Each processor or processing entity has a local PID that is unique with respect to all other processes and/or processing entities that together implement the distributed storage register. Finally, the processor processing entity $P_i$ has a real-time clock 1906 that is roughly coordinated with some absolute time. The real-time clocks of all the processes and/or processing entities that together collectively implement a distributed storage register need not be precisely synchronized, but should be reasonably reflective of some shared conception of absolute time. Most computers, including personal computers, include a battery-powered system clock that reflects a current, universal time value. For most purposes, including implementation of a distributed storage register, these system clocks need not be precisely synchronized, but only approximately reflective of a current universal time.

Each processor or processing entity $P_i$ includes a volatile memory 1908 and, in some embodiments, a non-volatile memory 1910. The volatile memory 1908 is used for storing instructions for execution and local values of a number of variables used for the distributed-storage-register protocol. The non-volatile memory 1910 is used for persistently storing the variables used, in some embodiments, for the distributed-storage-register protocol. Persistent storage of variable values provides a relatively straightforward resumption of a process's participation in the collective implementation of a distributed storage register following a crash or communications interruption. However, persistent storage is not required for resumption of a crashed or temporally isolated processor's participation in the collective implementation of the distributed storage register. Instead, provided that the variable values stored in dynamic memory, in non-persistent-storage embodiments, if lost, are all lost together, provided that lost variables are properly re-initialized, and provided that a quorum of processors remains functional and interconnected at all times, the distributed storage register protocol correctly operates, and progress of processes and processing entities using the distributed storage register is maintained. Each process $P_i$ stores three variables: (1) val 1934, which holds the current, local value for the distributed storage register; (2) val-ts 1936, which indicates the time-stamp value associated with the current local value for the distributed storage register; and (3) ord-ts 1938, which indicates the most recent timestamp associated with a WRITE operation. The variable val is initialized, particularly in non-persistent-storage embodiments, to a value NIL that is different from any value written to the distributed storage register by processes or processing entities, and that is, therefore, distinguishable from all other distributed-storage-register values. Similarly, the values of variables val-ts and ord-ts are initialized to the value "initialTS," a value less than any time-stamp value returned by a routine "newTS" used to generate time-stamp values. Providing that val, val-ts, and ord-ts are together re-initialized to these values, the collectively implemented distributed storage register tolerates communications interruptions and process and processing entity crashes, provided that at least a majority of processes and processing entities recover and resume correction operation.

Each processor or processing entity $P_i$ may be interconnected to the other processes and processing entities $P_{j \neq i}$ via a message-based network in order to receive 1912 and send 1914 messages to the other processes and processing entities $P_{j \neq i}$. Each processor or processing entity $P_i$ includes a routine "newTS" 1916 that returns a timestamp $TS_i$ when called, the timestamp $TS_i$ greater than some initial value "initialTS." Each time the routine "newTS" is called, it returns a timestamp $TS_i$ greater than any timestamp previously returned. Also, any timestamp value $TS_i$ returned by the newTS called by a processor or processing entity $P_i$ should be different from any timestamp $TS_j$ returned by newTS called by any other processor processing entity $P_j$. One practical method for implementing newTS is for newTS to return a timestamp TS comprising the concatenation of the local PID 1904 with the current time reported by the system clock 1906. Each processor or processing entity $P_i$ that implements the distributed storage register includes four different handler routines: (1) a READ handler 1918; (2) an ORDER handler 1920; (3) a WRITE handler 1922; and (4) an ORDER&READ handler 1924. It is important to note that handler routines may need to employ critical sections, or code sections single-threaded by locks, to prevent race conditions in testing and setting of various local data values. Each processor or processing entity $P_i$ also has four operational routines: (1) READ 1926; (2) WRITE 1928; (3) RECOVER 1930; and (4) MAJORITY 1932. Both the four handler routines and the four operational routines are discussed in detail, below.

Correct operation of a distributed storage register, and liveness, or progress, of processes and processing entities using a distributed storage register depends on a number of assumptions. Each process or processing entity $P_i$ is assumed to not behave maliciously. In other words, each processor or processing entity $P_i$ faithfully adheres to the distributed-storage-register protocol. Another assumption is that a majority of the processes and/or processing entities $P_i$ that collectively implement a distributed storage register either never crash or eventually stop crashing and execute reliably. As discussed above, a distributed storage register implementation is tolerant to lost messages, communications interruptions, and process and processing-entity crashes. When a number of processes or processing entities are crashed or isolated that is less than sufficient to break the quorum of processes or processing entities, the distributed storage register remains correct and live. When a sufficient number of processes or processing entities are crashed or isolated to break the quorum of processes or processing entities, the system remains correct, but not live. As mentioned above, all of the processes and/or processing entities are fully interconnected by a message-based network. The message-based network may be asynchronous, with no bounds on message-transmission times. However, a fair-loss property for the network is assumed, which essentially guarantees that if $P_i$ receives a message m from $P_j$, then $P_j$ sent the message m, and also essentially guarantees that if $P_i$ repeatedly transmits the message m to $P_j$, $P_j$ will eventually receive message m, if $P_j$ is a correct process or processing entity. Again, as discussed above, it is assumed that the system clocks for all processes or processing entities are all reasonably reflective of some shared time standard, but need not be precisely synchronized.

These assumptions are useful to prove correctness of the distributed-storage-register protocol and to guarantee progress. However, in certain practical implementations, one or more of the assumptions may be violated, and a reasonably functional distributed storage register obtained. In addition, additional safeguards may be built into the handler routines and operational routines in order to overcome particular deficiencies in the hardware platforms and processing entities.

Operation of the distributed storage register is based on the concept of a quorum. FIG. 20 illustrates determination of the current value of a distributed storage register by means of a quorum. FIG. 20 uses similar illustration conventions as used in FIGS. 12-18. In FIG. 20, each of the processes or processing entities 2002-2006 maintains the local variable, val-ts, such as local variable 2007 maintained by process or processing entity 2002, that holds a local time-stamp value for the distributed storage register. If, as in FIG. 16, a majority of the local values maintained by the various processes and/or processing entities that collectively implement the distributed storage register currently agree on a time-stamp value val-ts, associated with the distributed storage register, then the current value of the distributed storage register 2008 is considered to be the value of the variable val held by the majority of the processes or processing entities. If a majority of the processes and processing entities cannot agree on a time-stamp value val-ts, or there is no single majority-held value, then the contents of the distributed storage register are undefined. However, a minority-held value can be then selected and agreed upon by a majority of processes and/or processing entities, in order to recover the distributed storage register. Alternatively, the distributed-storage-register value associated with the highest val-ts value may be considered to be the current value of the distributed storage register, provided that this value is distributed to a majority of the processes and/or processing entities using the recover operation prior to use of the distributed-storage-register value.

FIG. 21 shows pseudocode implementations for the routine handlers and operational routines shown diagrammatically in FIG. 19. It should be noted that these pseudocode implementations omit detailed error handling and specific details of low-level communications primitives, local locking, and other details that are well understood and straightforwardly implemented by those skilled in the art of computer programming. The routine "majority" 2102 sends a message, on line 2, from a process or processing entity $P_i$ to itself and to all other processes or processing entities $P_{j \ne i}$ that, together with $P_i$, collectively implement a distributed storage register. The message is periodically resent, until an adequate number of replies are received, and, in many implementations, a timer is set to place a finite time and execution limit on this step. Then, on lines 3-4, the routine "majority" waits to receive replies to the message, and then returns the received replies on line 5. The assumption that a majority of processes are correct, discussed above, essentially guarantees that the routine "majority" will eventually return, whether or not a timer is used. In practical implementations, a timer facilitates handling error occurrences in a timely manner. Note that each message is uniquely identified, generally with a timestamp or other unique number, so that replies received by process $P_i$ can be correlated with a previously sent message.

The routine "read" 2104 reads a value from the distributed storage register. On line 2, the routine "read" calls the routine "majority" to send a READ message to itself and to each of the other processes or processing entities $P_{j \ne i}$. The READ message includes an indication that the message is a READ message, as well as the time-stamp value associated with the local, current distributed storage register value held by process $P_i$, val-ts. If the routine "majority" returns a set of replies, all containing the Boolean value "TRUE," as determined on line 3, then the routine "read" returns the local current distributed-storage-register value, val. Otherwise, on line 4, the routine "read" calls the routine "recover."

The routine "recover" 2106 seeks to determine a current value of the distributed storage register by a quorum technique. First, on line 2, a new timestamp ts is obtained by calling the routine "newTS." Then, on line 3, the routine "majority" is called to send ORDER&READ messages to all of the processes and/or processing entities. If any status in the replies returned by the routine "majority" are "FALSE," then "recover" returns the value NIL, on line 4. Otherwise, on line 5, the local current value of the distributed storage register, val, is set to the value associated with the highest value timestamp in the set of replies returned by routine "majority." Next, on line 6, the routine "majority" is again called to send a WRITE message that includes the new timestamp ts, obtained on line 2, and the new local current value of the distributed storage register, val. If the status in all the replies has the Boolean value "TRUE," then the WRITE operation has succeeded, and a majority of the processes and/or processing entities now concur with that new value, stored in the local copy val on line 5. Otherwise, the routine "recover" returns the value NIL.

The routine "write" 2108 writes a new value to the distributed storage register. A new timestamp, ts, is obtained on line 2. The routine "majority" is called, on line 3, to send an ORDER message, including the new timestamp, to all of the processes and/or processing entities. If any of the status values returned in reply messages returned by the routine "majority" are "FALSE," then the value "NOK" is returned by the routine "write," on line 4. Otherwise, the value val is written to the other processes and/or processing entities, on line 5, by sending a WRITE message via the routine "majority." If all the status vales in replies returned by the routine "majority" are "TRUE," as determined on line 6, then the routine "write" returns the value "OK." Otherwise, on line 7, the routine "write" returns the value "NOK." Note that, in both the case of the routine "recover" 2106 and the routine "write," the local copy of the distributed-storage-register value val and the local copy of the timestamp value val-ts are both updated by local handler routines, discussed below.

Next, the handler routines are discussed. At the onset, it should be noted that the handler routines compare received values to local-variable values, and then set local variable values according to the outcome of the comparisons. These types of operations may need to be strictly serialized, and protected against race conditions within each process and/or processing entity for data structures that store multiple values. Local serialization is easily accomplished using critical sections or local locks based on atomic test-and-set instructions. The READ handler routine 2110 receives a READ message, and replies to the READ message with a status value that indicates whether or not the local copy of the timestamp val-ts in the receiving process or entity is equal to the timestamp received in the READ message, and whether or not the timestamp ts received in the READ message is greater than or equal to the current value of a local variable ord-ts. The WRITE handler routine 2112 receives a WRITE message determines a value for a local variable status, on line 2, that indicates whether or not the local copy of the timestamp val-ts in the receiving process or entity is greater than the timestamp received in the WRITE message, and whether or not the timestamp ts received in the WRITE message is greater than or equal to the current value of a local variable ord-ts. If the value of the status local variable is "TRUE," determined on line 3, then the WRITE handler routine updates the locally stored value and timestamp, val and val-ts, on lines 4-5, both in dynamic memory and in persistent memory, with the value and timestamp received in the WRITE message. Finally, on line 6, the value held in the local variable status is returned to the process or processing entity that sent the WRITE message handled by the WRITE handler routine 2112.

The ORDER&READ handler 2114 computes a value for the local variable status, on line 2, and returns that value to the process or processing entity from which an ORDER&READ message was received. The computed value of status is a Boolean value indicating whether or not the timestamp received in the ORDER&READ message is greater than both the values stored in local variables val-ts and ord-ts. If the computed value of status is "TRUE," then the received timestamp ts is stored into both dynamic memory and persistent memory in the variable ord-ts.

Similarly, the ORDER handler 2116 computes a value for a local variable status, on line 2, and returns that status to the process or processing entity from which an ORDER message was received. The status reflects whether or not the received timestamp is greater than the values held in local variables val-ts and ord-ts. If the computed value of status is "TRUE," then the received timestamp ts is stored into both dynamic memory and persistent memory in the variable ord-ts.

Using the distributed storage register method and protocol, discussed above, shared state information that is continuously consistently maintained in a distributed data-storage system can be stored in a set of distributed storage registers, one unit of shared state information per register. The size of a register may vary to accommodate different natural sizes of units of shared state information. The granularity of state information units can be determined by performance monitoring, or by analysis of expected exchange rates of units of state information within a particular distributed system. Larger units incur less overhead for protocol variables and other data maintained for a distributed storage register, but may result in increased communications overhead if different portions of the units are accessed at different times. It should also be noted that, while the above pseudocode and illustrations are directed to implementation of a single distributed storage register, these pseudocode routines can be generalized by adding parameters identifying a particular distributed storage register, of unit of state information, to which operations are directed, and by maintaining arrays of variables, such as val-ts, val, and ord-ts, indexed by the identifying parameters.

Generalized Storage Register Model

The storage register model is generally applied, by a FAB system, at the block level to maintain consistency across segments distributed according to mirroring redundancy schemes. In other words, each block of a segment can be considered to be a storage register distributed across multiple bricks, and the above-described techniques involving quorums and message passing are used to maintain data consistency across the mirror copies. However, the storage-register scheme may be extended to handle erasure coding redundancy schemes. First, rather than a quorum consisting of a majority of the bricks across which a block is distributed, as described in the above section and as used for mirroring redundancy schemes, erasure-coding redundancy schemes employ quorums of m+[(n−m)/2] bricks, so that the intersection of any two quorums contain at least m bricks. This type of quorum is referred to as an "m-quorum." Second, rather than writing newly received values in the second phase of a WRITE operation to blocks on internal storage, bricks instead may log the new values, along with a timestamp associated with the values. The logs may then be asynchronously processed to commit the logged WRITEs when an m-quorum of logged entries have been received and logged. Logging is used because, unlike in mirroring redundancy schemes, data cannot be recovered due to brick crashes unless an m-quorum of bricks have received and correctly executed a particular WRITE operation. FIG. 22 shows modified pseudocode, similar to the pseudocode provided in FIG. 17, which includes extensions to the storage-register model that handle distribution of segments across bricks according to erasure coding redundancy schemes within a FAB system that represent one embodiment of the present invention. In the event that m bricks have failed to log a most recently written value, for example, the most recently written value is rolled back to a previous value that is present in at least m copies within the logs or stored within at least m bricks.

FIG. 23 illustrates the large dependence on timestamps by the data consistency techniques based on the storage-register model within a FAB system that represents one embodiment of the present invention. In FIG. 23, a block 2302 is shown distributed across three bricks 2304-2306 according to a triple mirroring redundancy scheme, and distributed across five bricks 2308-2312 according to a 3+2 erasure coding scheme. In the triple mirroring redundancy scheme, each copy of the block, such as block 2314, is associated with two timestamps 2316-2317, as discussed in the previous subsection. In the erasure coding redundancy scheme, each block, such as the first block 2318, is associated with at least two timestamps. The checksum bits computed from the block 2320-2321, and from other blocks in the block's stripe, are associated with two timestamps, but a block, such as block 2324 may, in addition, be associated with log entries (shown below and overlain by the block), such as log entry 2326, each of which is also associated with a timestamp, such as timestamp 2328. Clearly, the data consistency techniques based on the storage-register model potentially involve storage and maintenance of a very large number of timestamps, and the total storage space devoted to timestamps may be a significant fraction of the total available storage space within a FAB system. Moreover, message traffic overhead may arise from passing timestamps between bricks during the above-described READ and WRITE operations directed to storage registers.

Figure 24A:
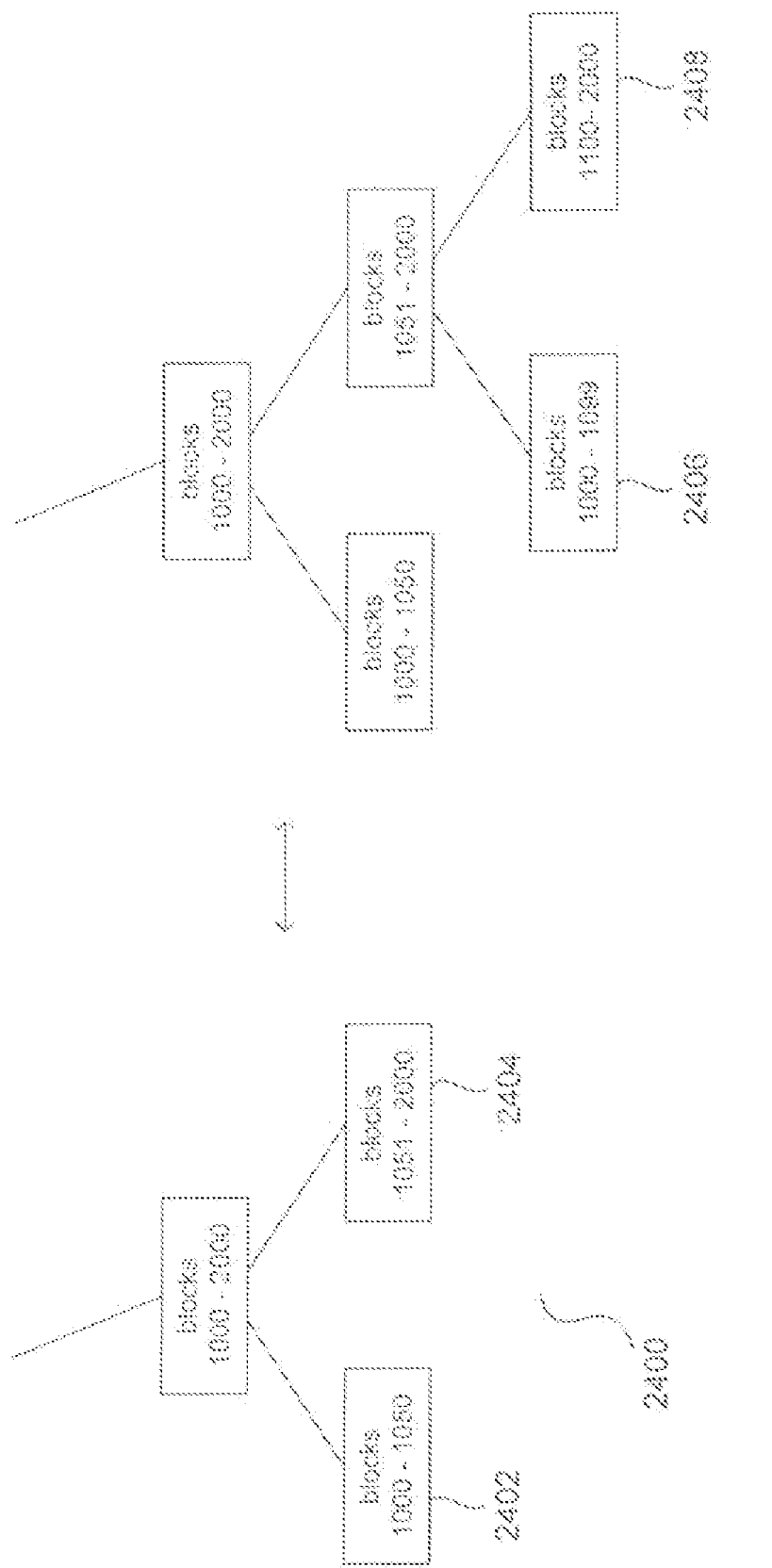
FIG. 24 illustrates hierarchical time-stamp management that represents one embodiment of the present invention.

Because of the enormous potential overhead related to timestamps, a FAB system may employ a number of techniques to ameliorate the storage and messaging overheads related to timestamps. First, timestamps may be hierarchically stored by bricks in non-volatile random access memory, so that a single timestamp may be associated with a large, contiguous number of blocks written in a single WRITE operation. FIG. 24 illustrates hierarchical timestamp management that represents one embodiment of the present invention. In FIG. 24, timestamps are associated with leaf nodes in a type of large acyclic graph known as an "interval tree," only a small portion of which is shown in FIG. 24. In the displayed portion of the graph, the two leaf nodes 2402 and 2404 represent timestamps associated with blocks 1000-1050 and 1051-2000, respectively. If, in a subsequent WRITE operation, a WRITE is directed to blocks 1051-1099, then leaf node 2404 in the original acyclic graph is split into two, lower-level blocks 2406 and 2408 in a modified acyclic graph. Separate timestamps can be associated with each of the new, leaf node blocks. Conversely, if blocks 1051-2000 are subsequently written in a single WRITE operation, the two blocks 2406 and 2408 can be subsequently coalesced, returning the acyclic graph to the original acyclic graph 2400. Associating timestamps with groups of blocks written in single WRITE operations can significantly decrease the number of timestamps maintained by a brick.

Another way to decrease the number of timestamps maintained by a brick is to aggressively garbage collect timestamps. As discussed in the previous subsection, timestamps may be associated with blocks to facilitate the quorum-based consistency methods of the storage-register model. However, when all bricks across which a block is distributed have been successfully updated, the timestamps associated with the blocks are no longer needed, since the blocks are in a completely consistent and fully redundantly stored state. Thus, a FAB system may further extend the storage-register model to include aggressive garbage collection of timestamps following full completion of WRITE operations. Further methods employed by the FAB system for decreasing timestamp-related overheads may include piggybacking timestamp-related messages within other messages and processing related timestamps together in combined processing tasks, including hierarchical demotion, discussed below.

Figure 25:
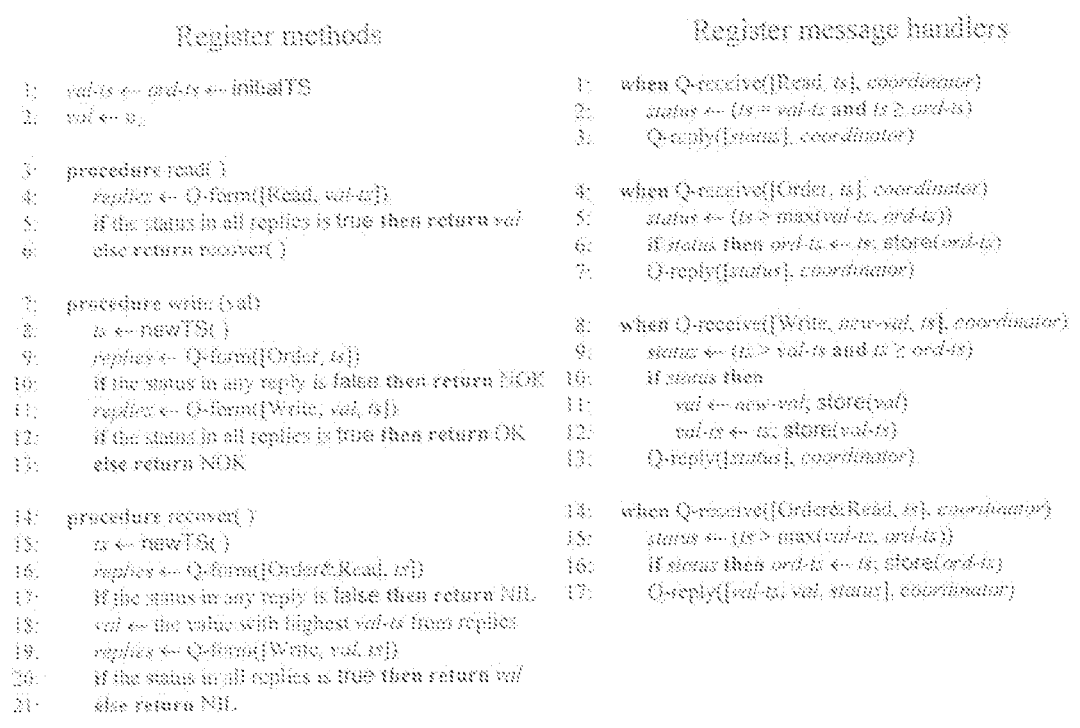
Figure 26:
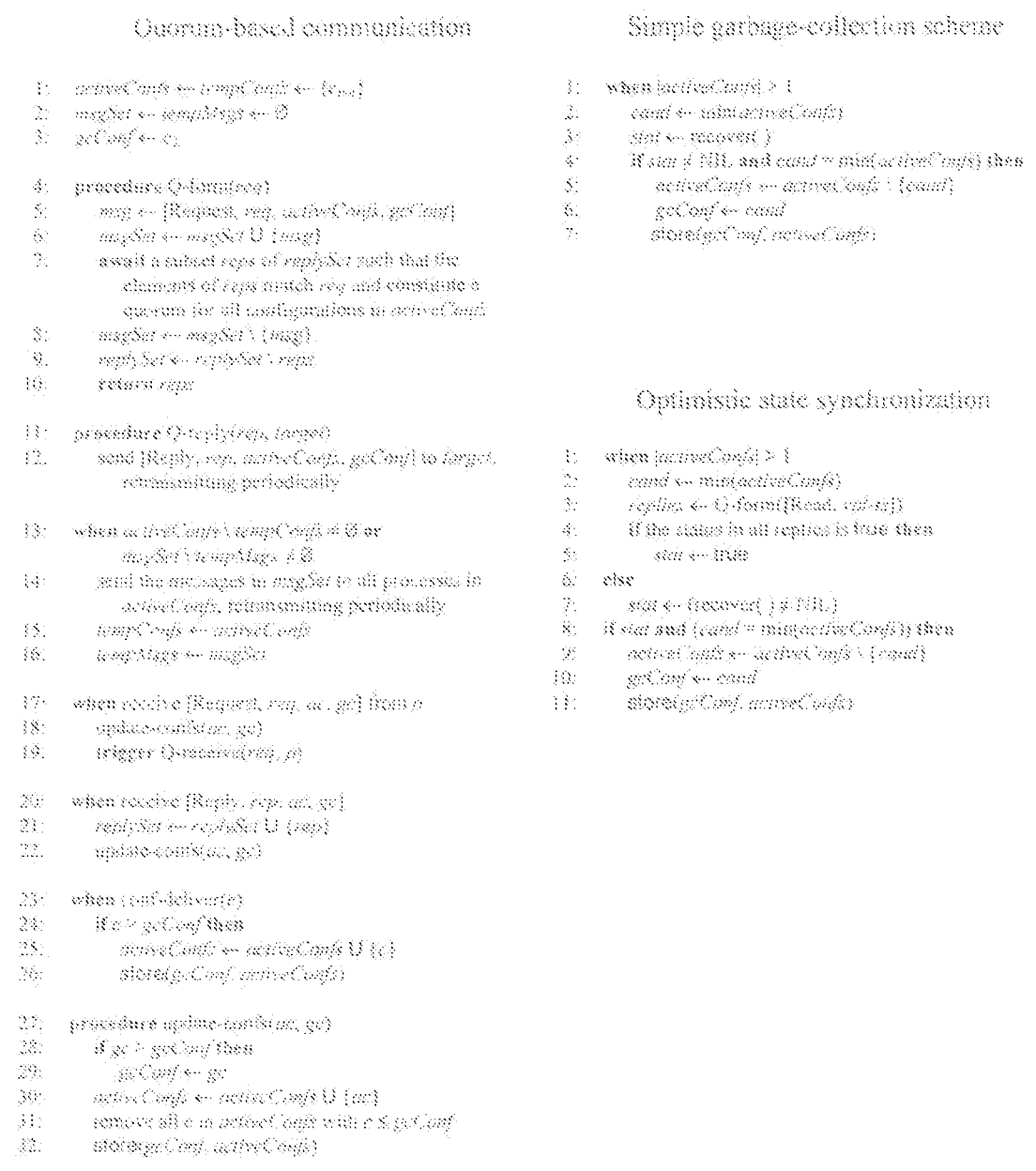

The quorum-based, storage-register model may be further extended to handle reconfiguration and migration, discussed above in a previous subsection, in which layouts and redundancy schemes are changed. As discussed in that subsection, during reconfiguration operations, two or more different configurations may be concurrently maintained while new configurations are synchronized with previously existing configurations, prior to removal and garbage collection of the previous configurations. WRITE operations are directed to both configurations during the synchronization process. Thus, a higher-level quorum of configurations need to successfully complete a WRITE operation before the cfg group or SCN-level control logic considers a received WRITE operation to have successfully completed. FIGS. 25-26 provide pseudocode for a further extended storage-register model that includes the concept of quorum-based writes to multiple, active configurations that may be present due to reconfiguration of a distributed segment within a FAB system that represent one embodiment of the present invention.

Unfortunately, migration is yet another level of reconfiguration that may require yet a further extension to the storage-register model. Like the previously discussed reconfiguration scenario, migration involves multiple active configurations to which SCN-level control logic directs WRITE operations during synchronization of a new configuration with an old configuration. However, unlike the reconfiguration level, the migration level requires that a WRITE directed to active configurations successfully completes on all configurations, rather than a quorum of active configurations, since the redundancy schemes are different for the active configurations, and a failed WRITE on one redundancy scheme may not be recoverable from a different active configuration using a different redundancy scheme. Therefore, at the migration level, a quorum of active configurations consists of all of the active configurations. Extension of the storage-register model to the migration level therefore results in a more general storage-register-like model. FIG. 27 shows high-level pseudocode for extension of the storage-register model to the migration level within a FAB system that represents one embodiment of the present invention. Yet different considerations may apply at the replication level, in which WRITES are directed to multiple replicates of a virtual disk. However, the most general storage-register-model extension discussed above, with reference to FIG. 27, is sufficiently general for application at the VDI and virtual disk levels when VDI-level considerations are incorporated in the general storage-register model.

Figure 28:
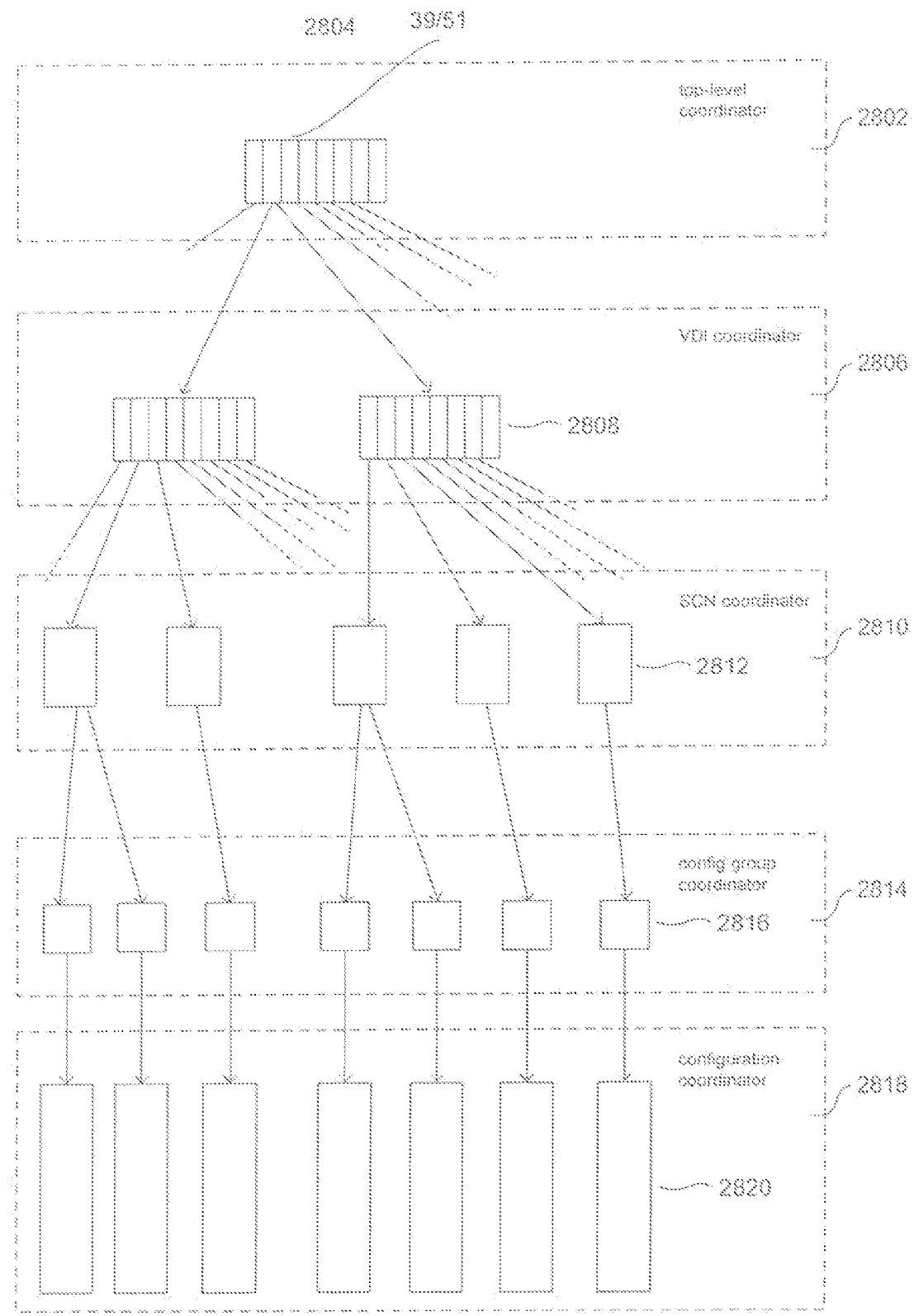
FIG. 28 illustrates the overall hierarchical structure of both control processing and data storage within a FAB system that represents one embodiment of the present invention.

As a result of the storage-register model extensions and considerations discussed above, a final, high-level description of the hierarchical control logic and hierarchical data storage within a FAB system is obtained. FIG. 28 illustrates the overall hierarchical structure of both control processing and data storage within a FAB system that represents one embodiment of the present invention. Top level coordinator logic, referred to as the "top-level coordinator" 2802, may be associated with the virtual-disk level 2804 of the hierarchical data-storage model. VDI-level control logic, referred to as the "VDI-level coordinator" 2806, may be associated with the VDI level 2808 of the data-storage model. SCN-level control logic, referred to as the "SCN coordinator" 2810, may be associated with the SCN level 2812 of the data-storage model. Configuration-group-level control logic, referred to as the "configuration-group coordinator" 2814, may be associated with the configuration group level 2816 of the data-storage model. Finally, configuration-level control logic, referred to as the "configuration coordinator" 2818, may be associated with the configuration level of the data storage model 2820. Note in FIG. 28, and subsequent figures that employ the illustration conventions used in FIG. 28, the cfg and layout data-structure elements are combined together in one data-storage-model node. Each of the coordinators in the hierarchical organization of coordinators carries out an extended storage-register-model consistency method appropriate for the hierarchical level of the coordinator. For example, the cfg-group coordinator employs quorum-based techniques for mirroring redundancy schemes and m-quorum-based techniques for erasure coding redundancy schemes. By contrast, the SCN coordinator employs an extended storage-register model requiring completion of a WRITE operation by all referenced configuration groups in order for the WRITE operation to be considered to have succeeded.

EMBODIMENTS OF THE PRESENT INVENTION

Figure 29:
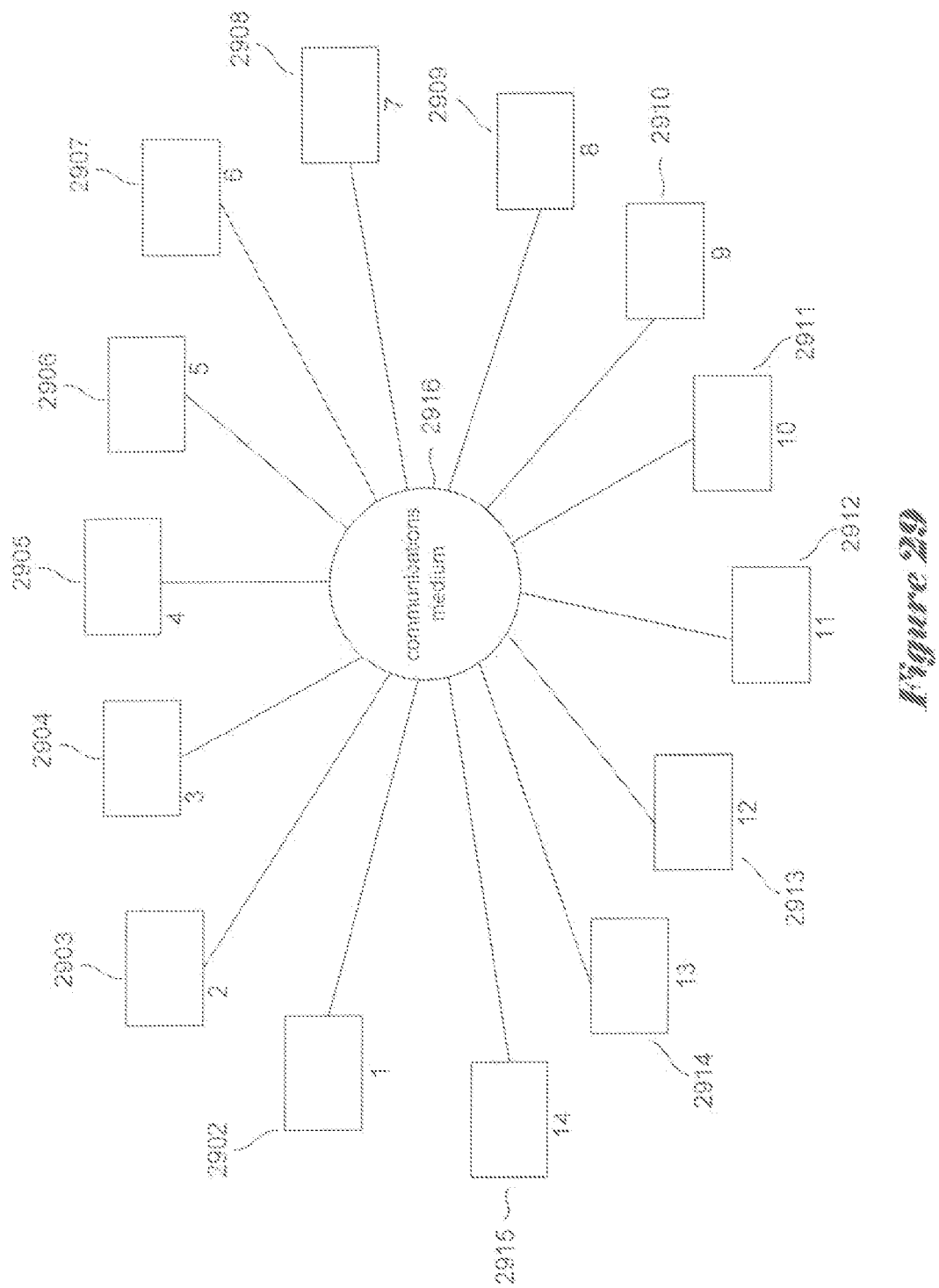
Figure 30:
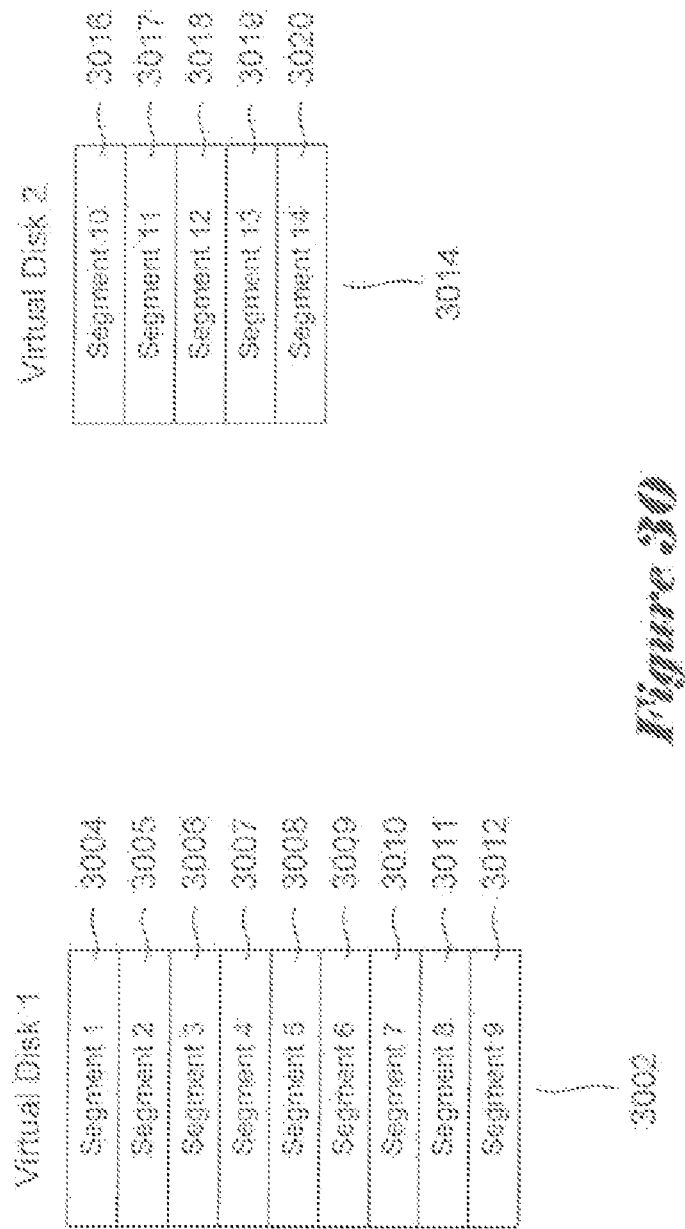
Figure 31:
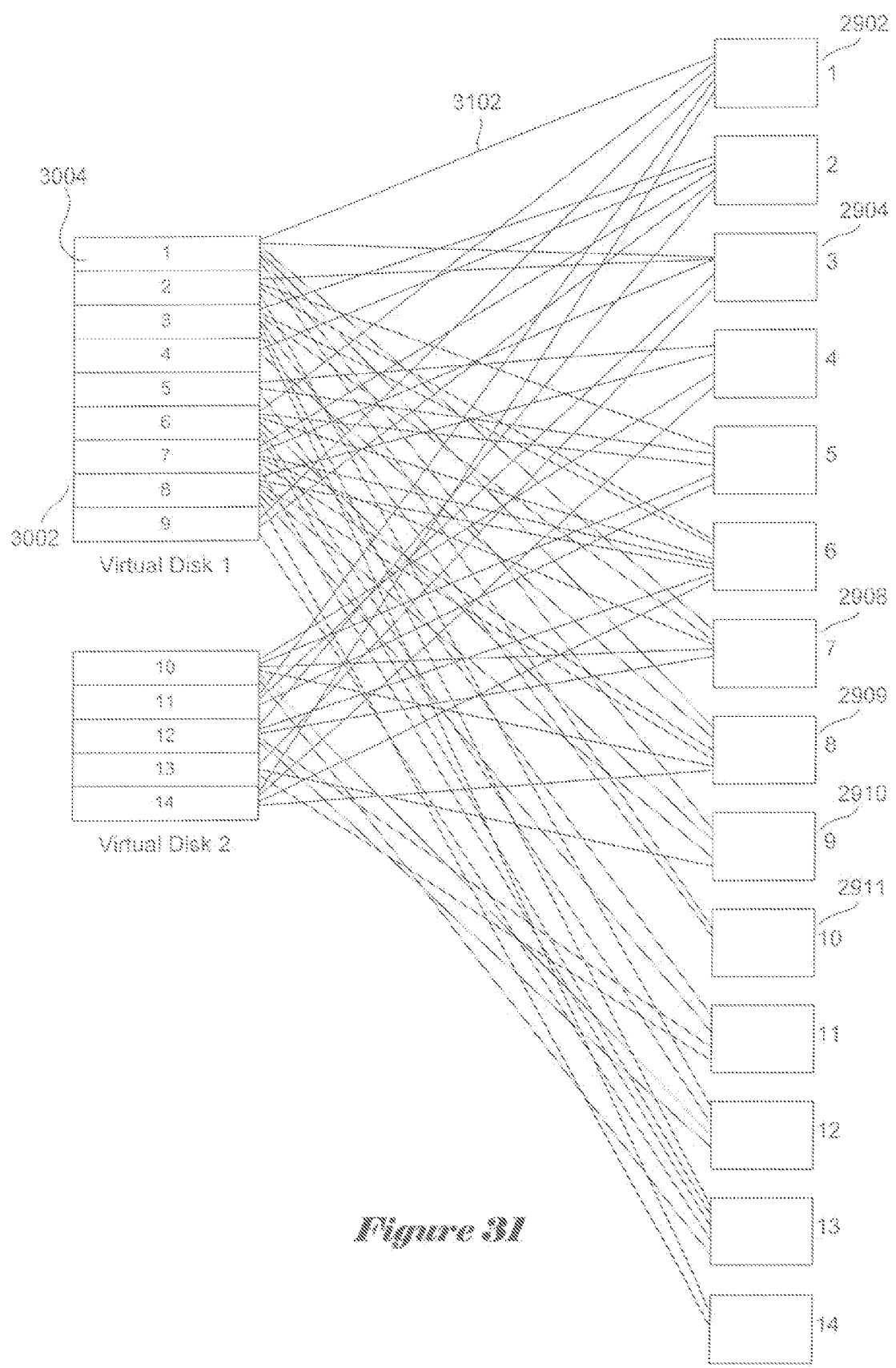
Figure 96:
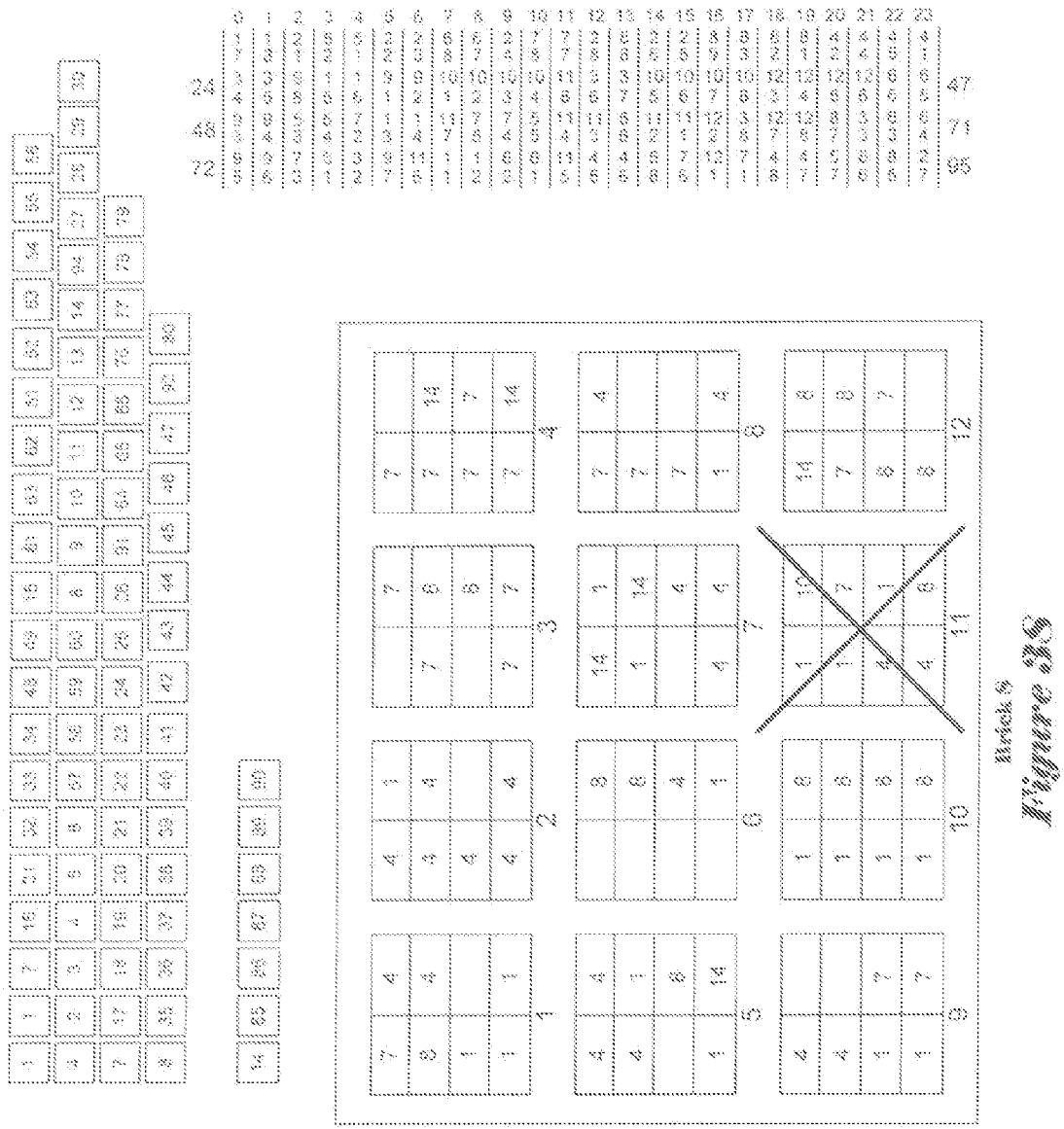

Embodiments of the present invention are directed to redundancy-recovery methods invoked within a component data-storage system, or brick, of a distributed data-storage system when the brick detects failure of one or more internal mass-storage devices, such as magnetic disk drives. FIGS. 29-33 illustrate a hypothetical distributed data-storage system used as a context for a detailed description of the redundancy-recovery methods that represent embodiments of the present invention. FIG. 29 illustrates, at a highest overview level, the hypothetical distributed data-storage system. The distributed data-storage system comprises 14 bricks 2902-2915 that intercommunicate through a communications medium 2916. FIG. 30 illustrates, at a highest overview level, the organization of the data stored within the hypothetical distributed data-storage system. As shown in FIG. 30, the data stored within the distributed data-storage system includes a first virtual disk 3002 comprising nine segments 3004-3012 and a second virtual disk 3014 comprising five segments 3016-3020. The segments of the first virtual disk 3002 are referred to as "segment 1," "segment 2," . . . , "segment 9," while the segments of the second virtual disk are referred to as "segment 10," "segment 11," . . . , "segment 14." FIG. 31 illustrates a current mapping of the segments of the two virtual disks to individual bricks within the distributed data-storage system shown in FIG. 29. Lines, such as line 3102, interconnect segments with bricks on which a portion of the segment is stored. For example, segment 1 (3004) of the first virtual disk 3002 is stored on brick 1 (2902), brick 3 (2904), brick 7 (2908), brick 8 (2909), brick 9 (2910), and brick 10

(2911). Of course, as described in previous subsections, segments are mobile within the distributed data-storage system, migrating from one set of bricks to another for various reasons.

FIG. 32 shows a block diagram of a 12-mass-storage-device brick along with three different levels of mappings employed by control logic within the brick to map segments to data-storage units within the 12 mass-storage devices contained in the brick. In FIG. 32, and in subsequent figures, a brick is represented by a large rectangle 3202 containing 12 smaller squares, such as square 3204, each square representing a mass-storage device contained within the brick. Of course, as discussed in previous subsections, a given brick may contain a wide range of numbers of mass-storage devices, of different types. The block diagram is simplistic, in that the mappings portrayed about the perimeter of the brick in the block diagram are actually stored within memory and mass-storage devices within the brick. For simplicity of illustration, the 12 mass-storage devices are shown, in subsequent figures, as storing only segment data, rather than administrative data, mappings, and other data stored in real-world brick implementations. As discussed in previous subsections, the brick contains a hierarchical-system-configuration-describing data structure 3206 that describes mappings from virtual disks and virtual-disk segments to bricks within the distributed, mass-storage system. In addition, each brick contains, for those segments or segment portions stored within the brick, a mapping of segments to logical data-storage units. The term "data-storage unit" may refer, in certain systems, to logical or physical pages, in other systems to blocks or sectors, and in still other systems to a variety of other types of data-storage units. Each brick also contains a logical-to-physical mapping 3210 that maps logical data-storage units to physical data-storage units on particular mass-storage devices. Although not shown in FIG. 32, additional mappings are generally present within a brick, including the physical-data-storage-unit-to-mass-storage-device-data-storage-unit mapping in individual mass-storage devices.

FIG. 33 illustrates a hypothetical data-storage state of brick 8 in the hypothetical distributed data-storage system shown in FIGS. 29-31. In FIG. 33, detailed representations of the hierarchical-system-configuration-describing data structure 3206, the segment-to-logical-data-storage-unit map 3208, and the logical-to-physical map 3210 are displayed for a particular hypothetical data state of the distributed data-storage system. In addition, mappings of segments to data-storage units within the mass-storage devices of brick 8 are shown. For clarity of illustration, each mass-storage device, such as mass-storage device 3302, is shown divided into eight data-storage units, with each data-storage unit of each mass-storage device labeled with the number of the segment to which the data belongs. Of course, in real systems, a mass-storage device may generally contain hundreds of thousands, millions, tens of millions, or more data-storage units. When no segment number is included, such as for data-storage unit 3304 in mass-storage device 8 (3306), the data-storage unit is free, or available. The hierarchical-system-configuration-describing data structure 3206 is a simplified representation of the hierarchical data structure discussed in previous subsections, and shown in various ways in FIGS. 9, 10A-B, 11A-H, and 28. The hierarchical data structure 3206 maps virtual disks to segments, and segments to individual bricks of the distributed data-storage system. The segment-to-logical-data-storage-unit map 3208 includes a linked list for each segment, or segment portion, mapped to the brick. The logical-to-physical map 3210 is a two-dimensional table, with cells indexed by logical data-storage-unit number, and the contents of cells indicating the number of the disk and the number of the data-storage unit of the disk corresponding to the logical-data-storage-unit index. Any of a large variety of different data structures and data-structure implementations may be used for each of the mappings 3206, 3208, and 3210. The simple data structures employed in FIG. 33, and in subsequent figures, are used for clarity of illustration.

To better describe the data state represented in FIG. 33, a more detailed description of the mappings is next provided. In the hierarchical data structure 3206, the first segment 3004 of the first virtual disk 3002 is represented by a layout 3308 listing the bricks on which the segment is stored. As seen in the layout 3308, as well as in the mapping diagram shown in FIG. 31, the first segment is stored on bricks 1, 3, 7, 8, 9, and 10. The segment may be stored as a five-way mirror or, more probably, according to a 3+2 erasure-coding redundancy scheme. Each of the six bricks listed in the layout contain either a full copy of the segment, in the case of mirroring redundancy schemes, a portion of an erasure-coded encoding of the segment, or a portion of another redundancy-scheme-determined segment encoding, as discussed in previous subsections. FIG. 33 illustrates the data state of brick 8 2909 in the hypothetical distributed data-storage system shown in FIG. 29. Since brick 8 is listed in the layout 3308 for segment 1 3304, a mapping 3310 of that portion of segment 1 stored in brick 8 occurs within the segment-to-logical-data-storage-unit mapping 3208 included within brick 8. The mapping 3310 indicates that the portion of segment 1 stored in brick 8 is stored within logical data-storage units 1, 7, 16, 31-34, 48, 49, 15, 61, 63, 62, and 51-56, the contents of the nodes of the linked list headed by a node containing the symbol "1" indicating segment 1. For the purposes of the current discussion, it can be assumed that a node within the linked list corresponds to a single data-storage unit, and that the position of the node within the linked list indicates the relative position of the data stored in the data-storage unit within the entire portion of the segment stored on brick 8. To find where the first data-storage-unit-length portion of segment 1 is stored within brick 8, the cell of the logical-to-physical map 3210 indexed by logical-data-storage-unit 1 3212 is accessed to determine that the data-storage unit is the eighth data-storage unit 3314 in the first mass-storage device 3302. Similarly, the second data-storage-unit-length of data from segment 1 is stored in logical-data-storage-unit 7 3316, which corresponds 3318 to the eighth data-storage unit of the sixth mass-storage device 3320.

FIG. 34 illustrates failure of a mass-storage device within brick 8 of the hypothetical distributed data-storage system shown in FIGS. 29-31. In FIG. 34, a large "X" symbol 3402 overlies the representation of mass-storage device 11 3404 to indicate that mass-storage device 11 has failed. As shown in FIG. 34, prior to failure, mass-storage device 11 included data-storage units containing data for segments 1, 4, 7, 8, and 10. As indicated by the small "X" symbols next to linked list head nodes in the segment-to-logical-data-storage-unit map 3208, such as the small "X" symbol 3306, five of the six segments mapped to brick 8 are impacted by the failure of mass-storage-device 11. Thus, following the failure of mass-storage device 11, portions of segments 1, 4, 7, 8, and 10 mapped to brick 8 are now defective. As discussed in previous subsections, segments are stored in multiple copies, under various types of redundancy schemes, within the distributed data-storage system. Therefore, although certain data-storage units within brick 8 have been lost, the lost data can still be recovered from other non-defective data-storage units within other bricks of the distributed data-storage system. Ultimately, it would be desirable for the failed mass-storage device 11 of brick 8 to be repaired or replaced, and for those data-storage units locally lost due to failure of mass-storage device 11 to be restored in the repaired or replaced mass-storage device 11. However, repair or replacement of a failed mass-storage device may take a relatively long period of time, on the order of hours, during which, were no other steps taken, the overall data redundancy within the distributed data-storage system would be significantly decreased, and the distributed data-storage system would therefore be vulnerable to actual data loss due to additional mass-storage-device failures. Therefore, methods are employed in the distributed data-storage system to immediately recover the data-storage units corrupted by mass-storage-device failures in order to as quickly as possible to recover the full, original data redundancy present in the distributed data-storage system prior to the mass-storage-device failures.

FIG. 35 illustrates one method by which redundancy can be recovered within a distributed data-storage system such as the hypothetical distributed data-storage system illustrated in FIGS. 29-31. As discussed in previous subsections, the hierarchical data structure (3206 in FIGS. 32-33) is designed to allow for migration of segments or portions of segments from one brick or set of bricks to another brick or set of bricks. The distributed data-storage system thus provides an efficient segment-migration operation. As part of segment migration, a corrupted segment may be restored to its original form by reconstructing lost or corrupted data-storage units from redundantly stored data-storage units within the distributed data-storage system. Therefore, a first method for immediately restoring full redundancy of segments 1, 4, 7, 8, and 10, corrupted by the failure of mass-storage device 11 in brick 8, is to move those affected segments from brick 8 to other bricks within the distributed data-storage system with sufficient free space available, using the segment-migration operation. A quick review of the segment mapping shown in FIG. 31 reveals that bricks 10 and 14, with only two segments mapped to each, may be likely candidates for having sufficient free space to store additional segments or portions of segments. Additional candidates, to each of which four segments are mapped, include bricks 4 and 9. As shown in FIG. 35 by arrows, such as arrow 3502, the segment-migration operation is invoked to move segments 1, 4, 7, 8, and 10 from brick 8 (2909) to brick 4 (2905), brick 14 (2915), brick 10 (2911), and brick 9 (2910). Segment 7, as indicated by the disk 3504 within arrow 3502, is moved to brick 4. Segments 1 and 10 are moved to brick 14, segment 8 is moved to brick 10, and segment 4 is moved to brick 9.

Following the migration of the mass-storage-device-failure-affected segments to other bricks within the distributed data-storage system, as illustrated in FIG. 35, brick 8, despite having a defective mass-storage device, now has a significant amount of free space. FIG. 36 illustrates the data state of brick 8 following migration of affected segments from brick 8 to other bricks in the distributed data-storage system. Following migration of the affected segments, the segment-to-logical-data-storage-unit map 3208 contains only a single linked list 3602 representing all or a portion of segment 14, and entries 3604-3608 in the layouts within the hierarchical data structure 3206 are updated according to the reorganization effected by segment migration, as indicated in FIG. 35. Of course, the hierarchical data structures of all other component data-storage systems within the distributed data-storage system are also updated. At this point in time, brick 8 can receive segments moved from other bricks, including certain of the segments transferred from brick 8 to other bricks as a result of the failure of mass-storage device 11, or may receive new segments or new data for segment 14.

While segment migration, as shown in FIG. 35, can be employed to restore data redundancy to its pre-mass-storage-device-failure state, segment migration is a relatively expensive process. Segment migration involves transfer of large quantities of data between bricks, as well as additional transfers of data needed to recreate corrupted data-storage units from other bricks. One embodiment of the present invention involves a more efficient method for restoring redundancy following failure of one or more mass-storage units within a brick. FIGS. 37-38 illustrate a second redundancy-restoring method that represents an embodiment of the present invention. In the second redundancy-restoring method, rather than migrating all affected segments from brick 8 to other bricks within the distributed data-storage system, only a sufficient number of segments are migrated to provide sufficient free space within brick 8 to allow the remaining segments affected by the failure of mass-storage device 11 to be reconstructed, in place, within brick 8. In the illustrated example, as shown in FIG. 37, segment 10 (3702) is moved from brick 8 to brick 14, being restored during the migration, as discussed above. FIG. 38 illustrates the data state of brick 8 following migration of segment 10 to brick 14. In this case, a single entry 3802 in a single layout 3804 is updated to indicate migration of that portion of segment 10 stored in brick 8 to brick 14. Of course, the hierarchical data structures of all other component data-storage systems within the distributed data-storage system are also updated. The linked list corresponding to mapping of segment 10 to logical blocks within brick 8 has been removed. All data-storage units within the mass-storage devices of brick 8 formerly occupied by segment-10 data are now free. There are therefore enough free data-storage segments to recover the original redundancy levels for all remaining, affected segments 1, 4, 7, and 8.

FIG. 39 illustrates the data state of brick 8 following recovery of the remaining segments 1, 4, 7, and 8 affected by failure of mass-storage device 11 following migration of segment 10 to brick 14. For segment 1, nodes 3902-3904 in the segment-to-logical-data-storage-unit map 3208 have been changed to refer to data-storage units 3205-3207, respectively. The linked-list nodes 3908 and 3909 in the linked list corresponding to segment 4 have been changed to refer to data-storage units 3910 and 3911, respectively. Node 3912 in the linked list corresponding to segment 7 has been changed to refer to data-storage unit 3913, and node 3914 in the link list corresponding to segment 8 has been changed to refer to data-storage unit 3915. The data for these remapped data-storage units is obtained from other bricks that store the data redundantly within the distributed data-storage system. Thus, all of the segments affected by the failure of mass-storage device 11 that were not moved to other bricks have been restored, in place, within brick 8, despite the continued failure of mass-storage device 11. By restoring the segments within the brick, rather than moving the segments to external bricks, a great deal of data movement is avoided.

Figure 40:
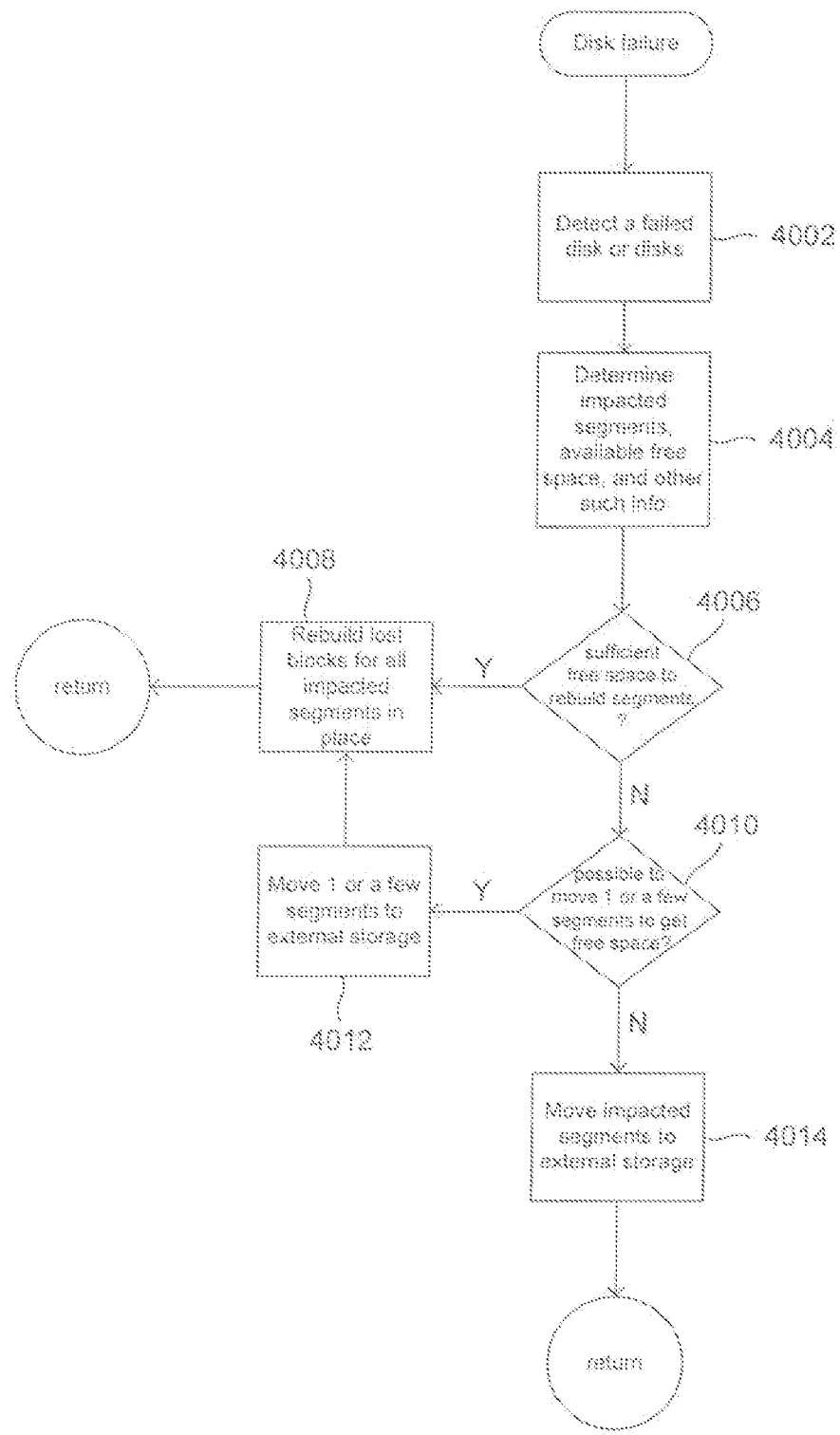
FIG. 40 is a control-flow diagram that describes redundancy restoration in a distributed data-storage system that represents one embodiment of the present invention.

FIG. 40 is a control-flow diagram that describes redundancy restoration in a distributed data-storage system that represents one embodiment of the present invention. In this embodiment of the present invention, it is assumed that a mass-storage-device-failure event within a single brick is detected, and the loss of redundancy resulting from the failure is restored. First, in step 4002, the failure of one or more mass-storage devices within a brick is detected by logic within the brick. Next, in step 4004, logic within the brick determines which of the segments stored in the brick have been affected, the amount of available free space within the brick, and other such administrative information. When, as determined in step 4006, there is sufficient free space available within the brick to restore all segments affected by the mass-storage-device failure or failures, all of the segments are restored, by importing redundantly stored data from other bricks, in step 4008. Otherwise, as determined in step 4010, when it is possible to move one or a few of the affected segments in order to obtain sufficient free space for rebuilding the remaining segments in the brick, as illustrated in FIGS. 37-39, then one or a few segments are chosen and moved to other bricks, in step 4012, and the remaining segments are restored, in step 4008. Otherwise, in step 4014, all segments impacted by the mass-storage-device failure or failures are migrated to other bricks. In alternative embodiments, it may not be the case that there is sufficient space for restoring all affected segments in other bricks, in which case redundancy restoration may fail.

Although the present invention has been described in terms of particular embodiments, it is not intended that the invention be limited to these embodiments. Modifications within the spirit of the invention will be apparent to those skilled in the art. For example, any number of different implementations of the redundancy-restoration methods of the present invention can be obtained using different programming languages and programming parameters and characteristics, including different modular organizations, control structures, data structures, variables, and other such parameters and characteristics. The redundancy-restoration methods of the present invention may be implemented in software, in the combination of firmware and software, or in firmware in various different embodiments of distributed data-storage systems. Many different methods and algorithms can be employed to determine which segments to move to other bricks in order to obtain sufficient free space to rebuild segments corrupted by a mass-storage-device failure. Normally, a variety of considerations are balanced in order to achieve optimal redundancy restoration. For example, one may choose segments for migration that result in the least number of data-storage units transferred during segment migration and redundancy restoration. The number of data-storage units transferred includes transfer of data-storage units that are not corrupted as well as transfer of redundant data-storage units needed to reconstruct corrupted data-storage units. Considerations may also involve data-transfer bandwidth between different bricks within the system, current communications loads and overheads, and other such considerations. Additionally, it may be advantageous to move a larger segment than necessary in order to obtain additional free space beyond that needed for redundancy restoration in a brick, for various reasons.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for restoring redundancy, lost due to a mass-storage-device failure or failures within a component data-storage system of a distributed data-storage system comprising a number of component data-storage systems, each component data-storage system containing a number of mass-storage devices, the method comprising:
   when sufficient free data-storage space is available within the component data-storage system in which the mass-storage-device failure or failures occurred, restoring data-storage units of segments and/or segment portions that were stored on the failed mass-storage device or devices;
   when sufficient free data-storage space can be made available within the component data-storage system in which the mass-storage-device failure or failures occurred by moving one or more numbers of segments and/or segment portions from the component data-storage system to other component data-storage systems of the distributed data-storage system, moving the one or small number of segments and/or segment portions from the component data-storage system to other component data-storage systems and then restoring data-storage units of remaining segments and/or segment portions that were stored on the failed mass-storage device or devices; and
   otherwise, moving segments and/or segment portions that were stored on the failed mass-storage device or devices to other component data-storage systems of the distributed data-storage system.

2. The method of claim 1 wherein each component data-storage system maintains a hierarchical-system-configuration-describing data structure that maps segments of virtual disks to particular component data-storage systems according to a redundancy scheme.

3. The method of claim 2 wherein each component data-storage system maintains a segment-to-logical-data-storage-unit map that maps segments and/or segment portions stored within the component data-storage system to logical data-storage units.

4. The method of claim 3 wherein each component data-storage system maintains a logical-to-physical map that maps logical data-storage units to physical data-storage units within mass-storage devices of the component data-storage system.

5. The method of claim 4 wherein moving the one or more numbers of segments and/or segment portions from the component data-storage system to other component data-storage systems includes updating the hierarchical-system-configuration-describing data structure to indicate the new locations of the segments and/or segment portions and updating the segment-to-logical-data-storage-unit map to remove mappings for moved segments and/or segment portions.

6. The method of claim 4 wherein restoring data-storage units of remaining segments and/or segment portions that were stored on the failed mass-storage device or devices includes importing redundantly stored data-storage units from other component data-storage systems.

7. The method of claim 1 wherein the one or more numbers of segments and/or segment portions are selected for migration in order to optimize redundancy recovery with respect to a set of goals and constraints.

8. The method of claim 7 wherein goals may include:
   minimizing data transfer between component data-storage systems;
   minimizing time required to restore redundancy; and
   maximizing robustness of the distributed data-storage system following redundancy restoration.

9. Computer instruction stored in a computer-readable memory that implements the method of claim 1.

10. A distributed data-storage system comprising:
a number of component data-storage systems, each component data-storage system containing a number of mass-storage devices;
one or more communications media that interconnect the number of component data-storage systems; and
an implementation, within each component data-storage system, of a method for restoring redundancy, lost due to a mass-storage-device failure or failures within the component data-storage system by:
when sufficient free data-storage space is available within the component data-storage system, restoring data-storage units of segments and/or segment portions that were stored on the failed mass-storage device or devices;
when sufficient free data-storage space can be made available within the component data-storage system by moving one or more numbers of segments and/or segment portions from the component data-storage system to other component data-storage systems of the distributed data-storage system, moving the one or small number of segments and/or segment portions from the component data-storage system to other component data-storage systems and then restoring data-storage units of remaining segments and/or segment portions that were stored on the failed mass-storage device or devices; and
otherwise, moving segments and/or segment portions that were stored on the failed mass-storage device or devices to other component data-storage systems of the distributed data-storage system.

11. The distributed data-storage system of claim 10 wherein each component data-storage system maintains a hierarchical-system-configuration-describing data structure that maps segments of virtual disks to particular component data-storage systems according to a redundancy scheme.

12. The distributed data-storage system of claim 11 wherein each component data-storage system maintains a segment-to-logical-data-storage-unit map that maps segments and/or segment portions stored within the component data-storage system to logical data-storage units.

13. The distributed data-storage system of claim 12 wherein each component data-storage system maintains a logical-to-physical map that maps logical data-storage units to physical data-storage units within mass-storage devices of the component data-storage system.

14. The distributed data-storage system of claim 13 wherein moving the one or more numbers of segments and/or segment portions from the component data-storage system to other component data-storage systems includes updating the hierarchical-system-configuration-describing data structure to indicate the new locations of the segments and/or segment portions and updating the segment-to-logical-data-storage-unit map to remove mappings for moved segments and/or segment portions.

15. The distributed data-storage system of claim 13 wherein restoring data-storage units of remaining segments and/or segment portions that were stored on the failed mass-storage device or devices includes importing redundantly stored data-storage units from other component data-storage systems.

16. The distributed data-storage system of claim 10 wherein the one or more numbers of segments and/or segment portions are selected for migration in order to optimize redundancy recovery with respect to a set of goals and constraints.

17. The distributed data-storage system of claim 16 wherein goals may include:
minimizing data transfer between component data-storage systems;
minimizing time required to restore redundancy; and
maximizing robustness of the distributed data-storage system following redundancy restoration.

* * * * *

UNITED STATES PATENT AND TRADEMARK OFFICE
CERTIFICATE OF CORRECTION

PATENT NO. : 7,743,276 B2  Page 1 of 1
APPLICATION NO. : 11/527875
DATED : June 22, 2010
INVENTOR(S) : Michael B. Jacobson et al.

It is certified that error appears in the above-identified patent and that said Letters Patent is hereby corrected as shown below:

In column 32, lines 20-21, in Claim 1, delete "the one or small number" and insert -- one or more numbers --, therefor.

In column 33, lines 23-24, in Claim 10, delete "the one or small number" and insert -- one or more numbers --, therefor.

Signed and Sealed this

Fifth Day of October, 2010

David J. Kappos
*Director of the United States Patent and Trademark Office*